United States Patent [19]
Okuda et al.

[11] Patent Number: 5,734,520
[45] Date of Patent: Mar. 31, 1998

[54] MAGNETIC RECORDING/REPRODUCING APPARATUS

[75] Inventors: Yasuhiro Okuda; Toshiro Tsukahara; Hirofumi Matsuo; Nobuzumi Kurihara; Kiyoshi Yanagiguchi, all of Nagaokakyo, Japan

[73] Assignee: Mitsubishi Denki Kabushiki Kaisha, Tokyo, Japan

[21] Appl. No.: 536,462

[22] Filed: Sep. 29, 1995

[30] Foreign Application Priority Data

| Oct. 5, 1994 | [JP] | Japan | 6-241310 |
| Dec. 15, 1994 | [JP] | Japan | 6-311822 |
| Apr. 10, 1995 | [JP] | Japan | 7-084010 |

[51] Int. Cl.$^6$ .................. G11B 5/027; G11B 5/008
[52] U.S. Cl. .................. 360/85; 360/94
[58] Field of Search .................. 360/85, 94, 95, 360/95.6; 242/336

[56] References Cited

U.S. PATENT DOCUMENTS

| 4,787,572 | 11/1988 | Rademacher | 360/94 X |
| 4,903,149 | 2/1990 | Hasegawa et al. | 360/69 |
| 4,951,164 | 8/1990 | Yasaka et al. | 360/85 |
| 4,984,109 | 1/1991 | Yokoo | 360/94 |
| 5,012,364 | 4/1991 | Hirayama et al. | 360/94 |
| 5,506,736 | 4/1996 | Ota | 360/94 |
| 5,513,052 | 4/1996 | Yamaguchi | 360/85 |

FOREIGN PATENT DOCUMENTS

| 0133822 | 8/1984 | European Pat. Off. . |
| 0395054 | 4/1990 | European Pat. Off. . |
| 0463786A2 | 6/1991 | European Pat. Off. . |
| 2-210648 | 8/1990 | Japan . |
| 5-325347 | 12/1993 | Japan . |
| 6-162726 | 6/1994 | Japan . |

*Primary Examiner*—Stuart S. Levy
*Assistant Examiner*—William J. Klimowicz

[57] ABSTRACT

A magnetic recording/reproducing apparatus being able to use a normal-sized cassette and a small sized cassette according to a user's selection. The apparatus comprises a supply reel stand for engaging with a supply reel; a supply reel stand base for supporting the supply reel stand; a take-up reel stand for engaging with a take-up reel; a take-up reel stand base for supporting the take-up reel stand; a reel stand displacing mechanism for displacing the supply reel stand base and the take-up reel stand base according to a size of the normal-sized cassette and a size of the small sized cassette. The reel stand displacing mechanism displaces the supply reel stand base and the take-up reel stand base by using a drive force transmitted from the tape loading mechanism.

18 Claims, 42 Drawing Sheets

MAGNETIC RECORDING/REPRODUCING APPARATUS

BACKGROUND OF THE INVENTION

This invention relates to a magnetic recording/reproducing apparatus such as a video tape recorder having a displacing mechanism for displacing reel stands supported on reel stand bases according to a size (or an interval between reels) of a tape cassette (referred to hereinafter as "cassette") housing a magnetic tape.

A conventional magnetic recording/reproducing apparatus which can selectively use a normal-sized cassette and a small-sized cassette is disclosed, for example, in Japanese Patent Kokai Publication No. 325347/1993. This document describes a reel stand displacing mechanism for displacing the reel stands which engages with reels of the cassette according to an interval between the reels of the normal-sized cassette or the small-sized cassette. However, a construction of the apparatus was complex and it was difficult to make the apparatus compact.

Another conventional magnetic recording/reproducing apparatus which can selectively use a normal-sized cassette and a small-sized cassette is disclosed, for example, in Japanese Patent Kokai Publication No. 210648/1990. This document discloses reel stands, a drive gear engaging with a gear part formed on the outer circumference of the reel stands, a motor that rotates the drive gear, and a brake mechanism which stops the rotation of the reel stands when it comes into contact with the drive gear. However, as the brake mechanism does not come into direct contact with the reel stands and applies a braking force indirectly via the drive gear, it has inferior braking performance compared to the case when the braking force is applied directly to the reel stands. As a result, there is a large difference between the speed at which the magnetic tape is fed out by the supply reel and the speed at which it is taken up by the take-up reel, causing slack in the magnetic tape when the mechanism stops, excessive stress in the magnetic tape and damage to the magnetic tape. This was especially serious when there is a large amount of play between the gear part of the reel stand and the drive gear.

Yet another conventional magnetic recording/reproducing apparatus which can selectively use a normal-sized cassette and a small-sized cassettes is disclosed, for example, in Japanese Patent Kokai Publication No. 162726/1994. The cassette described in this document comprises a built-in memory for storing information regarding the data recorded on the magnetic tape, and contact terminals for writing information to or reading it from the built-in memory. It has for example been proposed that this type of cassette be used for a home digital video tape recorder. The document further discloses a detecting block or switch block comprising contact members that come into contact with the contact terminals of the cassette, and a detecting pin for detecting a hole of the cassette to prevent accidental erasure of the recorded information. This detecting block moves according to the size of the cassette used. However, this document makes no mention of the mechanism that displaces the detecting block.

SUMMARY OF THE INVENTION

It is therefore an object of this invention to provide a magnetic recording/reproducing apparatus having a simple construction by providing a reel stand displacing mechanism which displaces reel stands base supporting reel stands by using a drive force of a tape loading mechanism for withdrawing a magnetic tape from the cassette.

It is another object of this invention to provide a magnetic recording/reproducing apparatus comprising a reel stand brake mechanism which can prevent slack of the magnetic tape and excessive stress of the magnetic tape by applying a braking force directly to reel stands even when the reel stand bases supporting reel stands are displaced according to the size of the cassette.

It is a further object of this invention to provide a magnetic recording/reproducing apparatus having a simple construction by providing a switch block displacing mechanism that moves a switch block by a drive force of a tape loading mechanism for withdrawing a magnetic tape from the cassette.

According to this invention, a magnetic recording/reproducing apparatus wherein a first tape cassette (60, 302) and a second tape cassette (64, 323) smaller in size than the first tape cassette (60, 302) can be inserted selectively according to a user's selection, comprises: a deck base (1); a head drum (54) provided on the deck base (1); a supply reel stand (70) for engaging with a supply reel of the first tape cassette (60, 302) or the second tape cassette (64, 323); a supply reel stand base (110) for supporting the supply reel stand (70), the supply reel stand base (110) being provided on the deck base (1) such that the supply reel stand base (110) is free to move on the deck base (1); a take-up reel stand (71) for engaging with a take-up reel of the first tape cassette (60, 302) or the second tape cassette (64, 323); a take-up reel stand base (116) for supporting the take-up reel stand (71), the take-up reel stand base (116) being provided on the deck base (1) such that the take-up reel stand (71) is free to move on the deck base (1); a reel stand displacing mechanism (1b) for displacing the supply reel stand base (110) and the take-up reel stand base (116) according to a size of the first tape cassette (60, 302) and a size of the second tape cassette (64, 323); and a tape loading mechanism (1a) for withdrawing a magnetic tape (63, 312) from the first tape cassette (60, 302) or the second tape cassette (64, 323) placed on the deck base (1) and winding the magnetic tape (63, 312) around the head drum (54). The reel stand displacing mechanism (1b) displaces the supply reel stand base (110) and the take-up reel stand base (116) by using a drive force transmitted from the tape loading mechanism (1a).

The tape loading mechanism (1a) may comprise: a loading motor (2, 349); a first gear (7, 348) rotating by a drive force transmitted from the loading motor (2, 349); and a cam gear (10, 218, 344) including teeth (10a) engaging with the first gear (7, 348) and a cam groove (10b) engaging with an engaging pin (13) which transmits the drive force from the loading motor (2, 349) to driven members (12, 15, 19, 23, 27, 31, 36, 44, 50) for withdrawing the magnetic tape (63, 312) from the first tape cassette (60, 302) or the second tape cassette (64, 323). The cam groove (10b) includes a first groove part for transmitting the drive force from the loading motor (2, 349) to the driven members (12, 15, 19, 23, 27, 31, 36, 44, 50) when the engaging pin (13) engages with the first groove part, and a second groove part (10c) for not transmitting the drive force from the loading motor (2, 349) to the driven members (12, 15, 19, 23, 27, 31, 36, 44, 50) when the engaging pin (13) engages with the second groove part (10c).

The reel stand displacing mechanism (1b) may comprise: an intermittent transmission mechanism (82) for transmitting the drive force from the loading motor (2, 349) only when the engaging pin (13) engages with the second groove part (10c); and an one-way transmission mechanism (90) including a second gear (93) being able to rotate both directions by receiving the drive force from the loading motor (2, 349) via the intermittent transmission mechanism (82), a turntable (98), a member (95a, 95b, 101) for causing the turntable (98) to rotate only in a predetermined one-way direction (CCW) by the drive force from the loading motor (2, 349) via the second gear (93).

The reel stand displacing mechanism (1b) may comprise: a drive pin (99) implanted in the turntable (98); a drive lever (122) provided on the deck base (1) so as to free to rotate about a shaft (121), the drive lever (122) including an elongated hole (122a) engaging with the drive pin (99) and rotating when the turntable (98) rotates; a supply side toggle link means (128, 129, 130, 131, 132) for transmitting the drive force from the loading motor (2, 349) via the drive lever (122) to the supply side reel stand base (110) and causing the supply side reel stand base (110) to move on the deck base (1); and a take-up side toggle link means (135, 136, 137, 138, 139) for transmitting the drive force from the loading motor (2, 349) via the drive lever (122) to the take-up reel stand base (116) and causing the take-up side reel stand base (116) to move on the deck base (1).

The magnetic recording/reproducing apparatus may further comprises a reel stand brake mechanism (1c). The reel stand brake mechanism (1c) comprises: a supply side brake mechanism (207a, 208a, 209a, 210a, 211a, 251a) for coming into contact with the supply reel stand (70) so as to stop rotation of the supply reel stand (70), the supply side brake mechanism (207a, 208a, 209a, 210a, 211a, 251a) displacing together with the supply reel stand base (110); a take-up side brake mechanism (207b, 208b, 209b, 210b, 211b, 251b) for coming into contact with the take-up reel stand (71) so as to stop rotation of the take-up reel stand (71), the take-up side brake mechanism (207b, 208b, 209b, 210b, 211b, 251b) displacing together with the take-up reel stand base (116); a supply side slide cam (212a) for sliding a predetermined direction on the deck base (1), the supply side slide cam (212a) including a first contact area (262) for operating the supply side brake mechanism (207a, 208a, 209a, 210a, 211a, 251a) when the supply reel stand base (110) is at a position for the normal-sized cassette (60) and a second contact area (264) for operating the supply side brake mechanism (207a, 208a, 209a, 210a, 211a, 251a) when the supply reel stand base (110) is at a position for the small-sized cassette (64); a take-up side slide cam (212b) for sliding a predetermined direction on the deck base (1), the take-up side slide cam (212b) including a third contact area (263) for operating the take-up side brake mechanism (207b, 208b, 209b, 210b, 211b, 251b) when the take-up reel stand base (116) is at a position for the normal-sized cassette (60) and a fourth contact area (265) for operating the take-up side brake mechanism (207b, 208b, 209b, 210b, 211b, 251b) when the take-up reel stand base (116) is at a position for the small-sized cassette (64); and a slide cam displacing mechanism for displacing the supply side slide cam (212a) and the take-up side slide cam (212b) in the predetermined directions.

The supply side brake mechanism (207a, 208a, 209a, 210a, 211a, 251a) comes into contact with the supply reel stand (70) when the first contact area (262) and the second contact area (264) do not come into contact with the supply side brake mechanism (207a, 208a, 209a, 210a, 211a, 251a), and the supply side brake mechanism (207a, 208a, 209a, 210a, 211a, 251a) separates from the supply reel stand (70) when the first contact area (262) or the second contact area (264) comes into contact with the supply side brake mechanism (207a, 208a, 209a, 210a, 211a, 251a). The take-up side brake mechanism (207b, 208b, 209b, 210b, 211b, 251b) comes into contact with the take-up reel stand (71) when the third contact area (263) and the fourth contact area (265) do not come into contact with the take-up side brake mechanism (207b, 208b, 209b, 210b, 211b, 251b), and the take-up side brake mechanism (207b, 208b, 209b, 210b, 211b, 251b) separates from the take-up reel stand (71) when the third contact area (263) or the fourth contact area (265) comes into contact with the take-up side brake mechanism (207b, 208b, 209b, 210b, 211b, 251b).

The supply side brake mechanism (207a, 208a, 209a, 210a, 211a, 251a) may comprise: a supply side shaft (207a) provided on the supply reel stand base (110); a supply side arm (208a, 273a) provided on the supply side shaft (207a) so as to be free to rotate about the supply side shaft (207a); a supply side brake pad (210a) provided on one end of the supply side arm (208a, 273a); a supply side pin (251a) for coming into contact with the first contact area (262) and the second contact area (264); and a supply side spring (209a, 272a) for applying a force to the supply side arm (208a, 273a) such that the supply side brake pad (210a) pushes the supply reel stand (70). The supply side brake pad (210a) comes into contact with the supply reel stand (70) when the first contact area (262) and the second contact area (264) do not come into contact with the supply side pin (251a), and the supply side brake pad (210a) separates from the supply reel stand (70) when the first contact area (262) or the second contact area (264) comes into contact with the supply side pin (251a). Also, the take-up side brake mechanism (207b, 208b, 209b, 210b, 211b, 251b) may comprise: a take-up side shaft (207b) provided on the take-up reel stand base (116); a take-up side arm (208b, 273b) provided on the take-up side shaft (207b) so as to be free to rotate about the take-up side shaft (207b); a take-up side brake pad (210b) provided on one end of the take-up side arm (208b, 273b); a take-up side pin (251b) for coming into contact with the third contact area (263) and the fourth contact area (265); and a take-up side spring (209b, 272b) for applying a force to the take-up side arm (208b, 273b) such that the take-up side brake pad (210b) pushes the take-up reel stand (71). The take-up side brake pad (210b) comes into contact with the take-up reel stand (71) when the third contact area (263) and the fourth contact area (265) do not come into contact with the take-up side pin (251b), and the take-up side brake pad (210b) separates from the take-up reel stand (71) when the third contact area (263) or the fourth contact area (265) comes into contact with the take-up side pin (251b).

The supply side spring (272a) may be a torsion coil spring, one arm end of which engages with the supply side arm (208a), and the take-up side spring (272b) may be a torsion coil spring, one arm end of which engages with the take-up side arm (208b). The magnetic recording/reproducing apparatus further comprises: a first spring suspension member (270a) provided on the deck base (1) and engaging with the other arm end of the supply side spring (272a) when the supply reel stand base (70) is at the first position; a second spring suspension member (251a) provided on the supply reel stand base (110) and engaging with the other arm end of the supply side spring (272a) when the supply reel stand base (70) is at the second position; a third spring suspension member (270b) provided on the deck base (1) and engaging with the other arm end of the take-up side spring (272b) when the take-up reel stand base (71) is at the first position; and a second spring suspension member (251b) provided on the take-up reel stand base (116) and engaging with the other arm end of the take-up side spring (272b) when the take-up reel stand base (71) is at the second position.

The reel stand brake mechanism (1c) has at least first, second and third states for each of the normal-sized cassette (60) and small-sized cassette (64). The first state is when the supply side brake mechanism (207a, 208a, 209a, 210a, 211a, 251a) separates from the supply reel stand (70) and the take-up side brake mechanism (207b, 208b, 209b, 210b, 211b, 251b) comes into contact with the take-up reel stand (71), the second state is when the supply side brake mechanism (207a, 208a, 209a, 210a, 211a, 251a) separates from the supply reel stand (70) and the take-up side brake mechanism (207b, 208b, 209b, 210b, 211b, 251b) separates from the take-up reel stand (71); and the third state is when the supply side brake mechanism (207a, 208a, 209a, 210a, 211a, 251a) comes into contact with the supply reel stand (70) and the take-up side brake mechanism (207b, 208b, 209b, 210b, 211b, 251b) comes into contact with the take-up reel stand (71).

The magnetic recording/reproducing apparatus may further comprises: a switch block (303) provided on the deck base (1) such that the switch block (303) is free to move and including a contact terminal that comes into contact with a detected point (307, 308, 310) of the first tape cassette (302) or with a detected point (324, 327) of the second tape cassette (323); and a switch block displacing mechanism (1e) for displacing the switch block (303) according to the detected point (307, 308, 310) of the first tape cassette (302) or the detected point (324, 327) of the second tape cassette (323). The switch block displacing mechanism (1e) engages with the reel stand displacing mechanism (1b), and displaces the switch block (303) by using the drive force transmitted from the loading motor (2, 349) via the reel stand displacing mechanism (1b).

The switch block (303) comprises at least one of: a memory switch (304) having a contact terminal (401) that comes into contact with a memory terminal (307) for a built-in memory provided in the first tape cassette (302) or the second tape cassette (323); an accidental erasure prevention switch (305) for preventing an accidental erasure of data recorded on the magnetic tape by detecting presence or absence of a hole (310, 327) provided in the first tape cassette (302) or the second tape cassette (323); and a cassette switch (306) for detecting whether the first tape cassette (302) or the second tape cassette (323) is inserted in the apparatus.

BRIEF DESCRIPTION OF THE INVENTION

The present invention will become more fully understood from the detailed description given hereinbelow and the accompanying drawings which are given by way of illustration only, and thus are not limitative of the present invention, and wherein.

Figure 5:
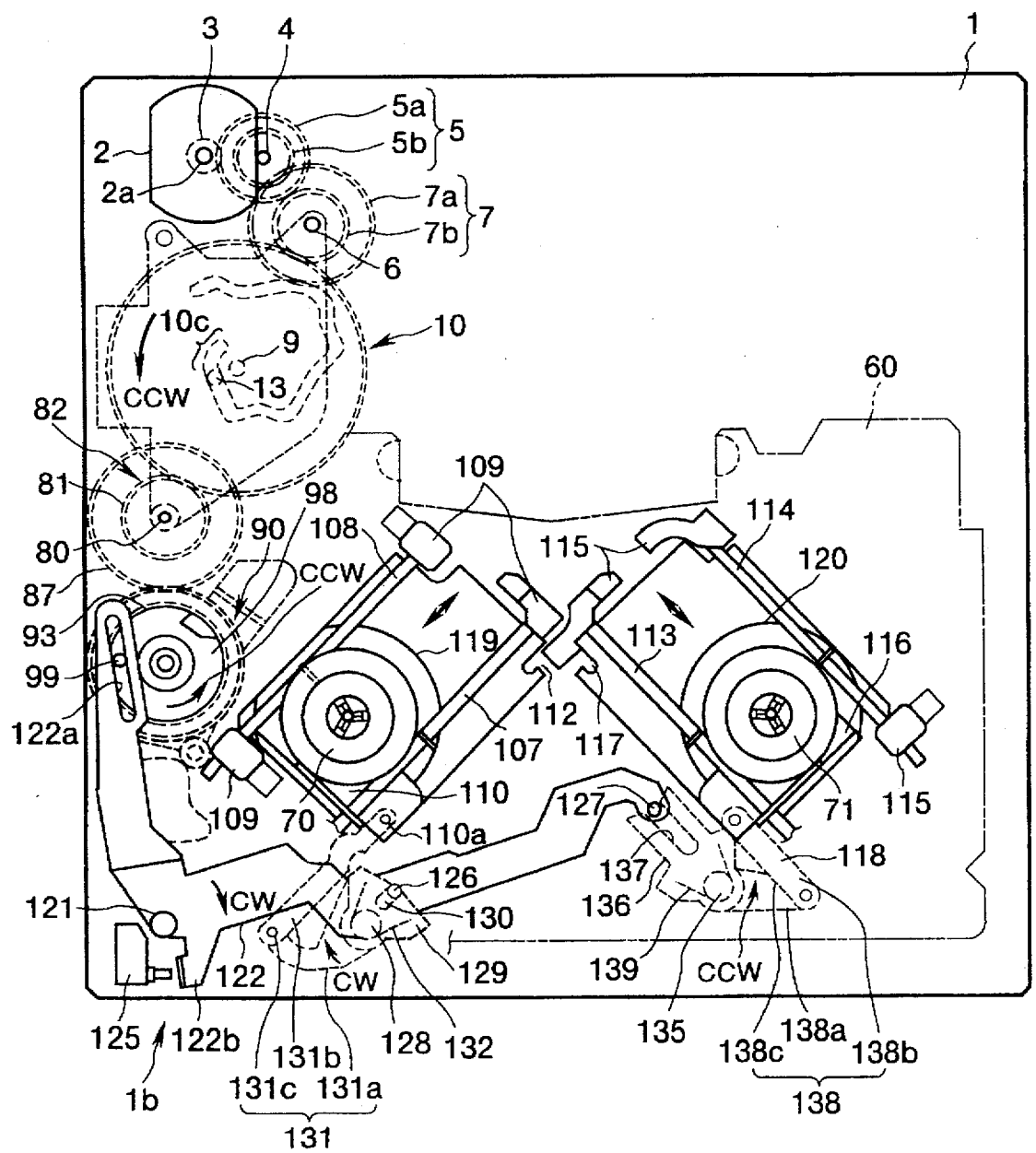
FIG. 5 is a structural diagram showing a reel stand displacing mechanism 1b of the magnetic recording/reproducing apparatus according to the first embodiment, when the reel stands are at a first position (a normal-sized cassette position)
Figure 6:
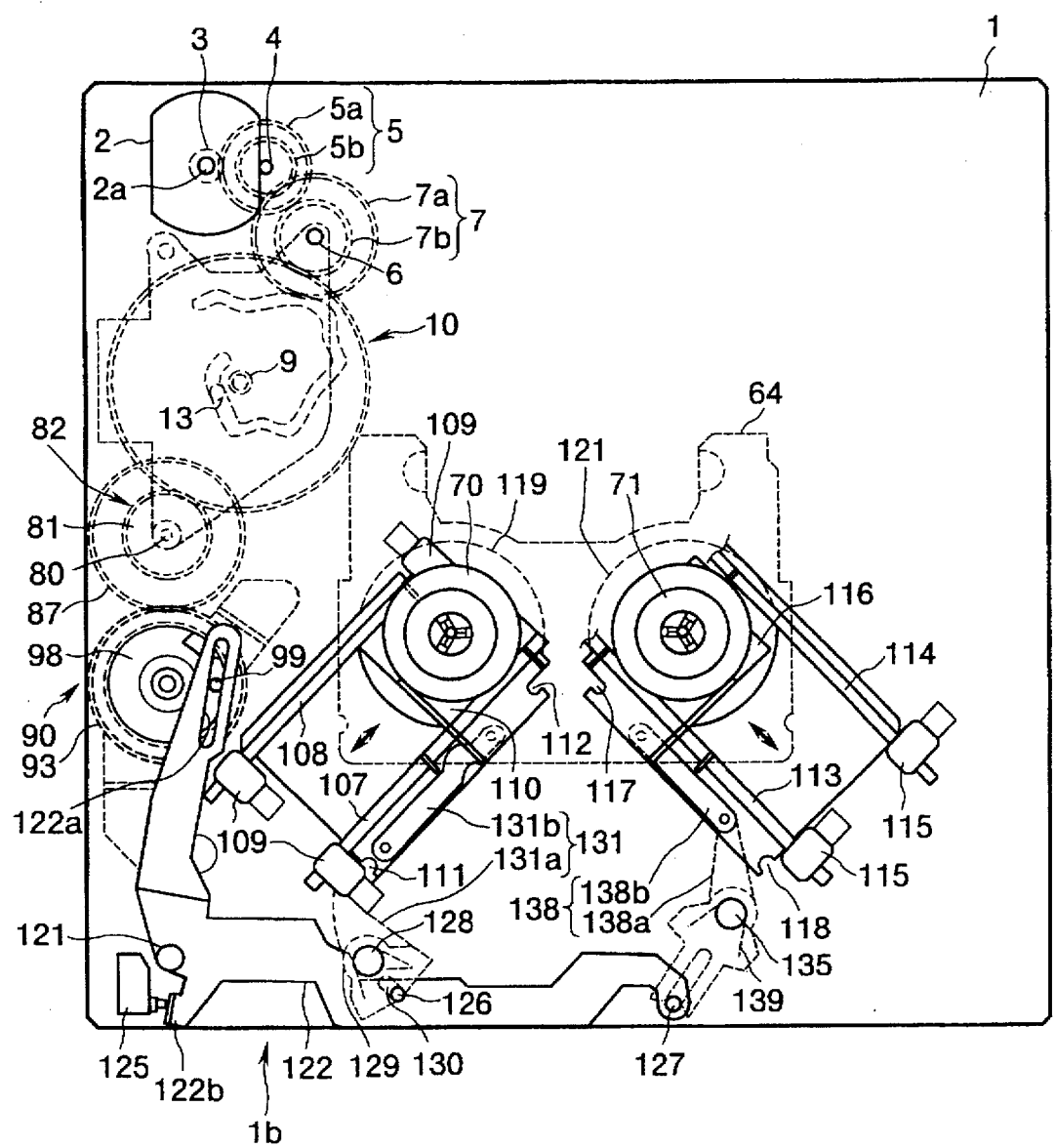
FIG. 6 is a structural diagram showing a reel stand displacing mechanism 1b of the magnetic recording/reproducing apparatus according to the first embodiment, when the reel stands are at a second position (a small-sized cassette position)
Figure 7A:
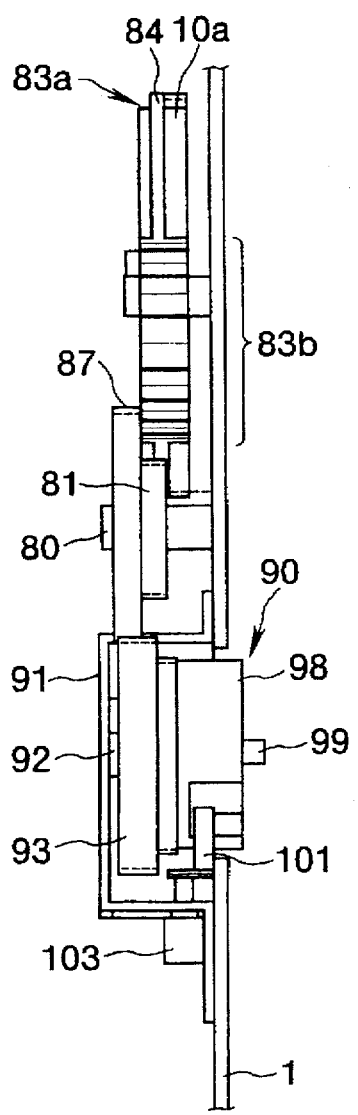
Figure 7B:
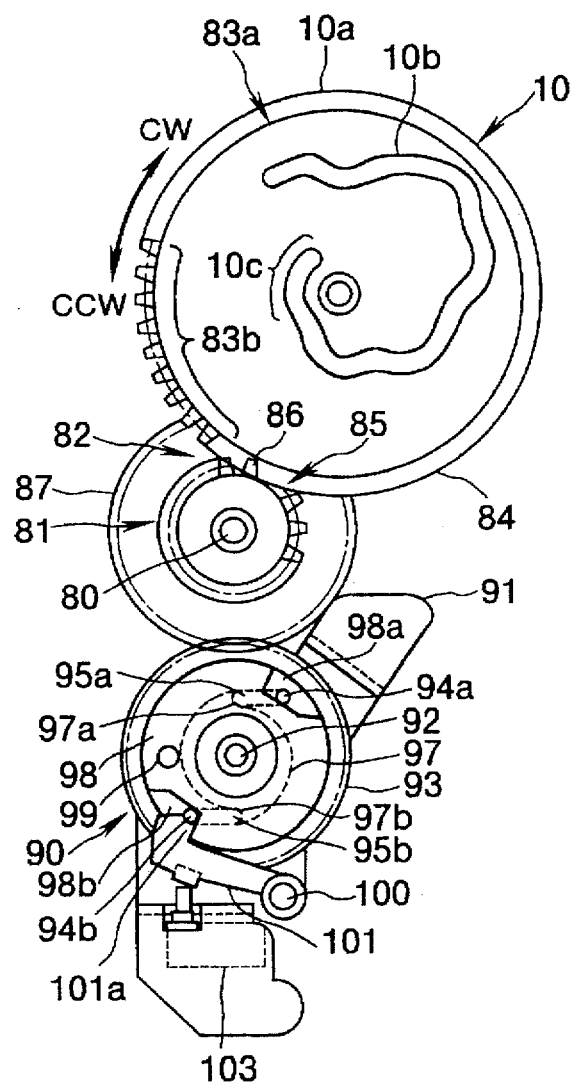
Figure 8:
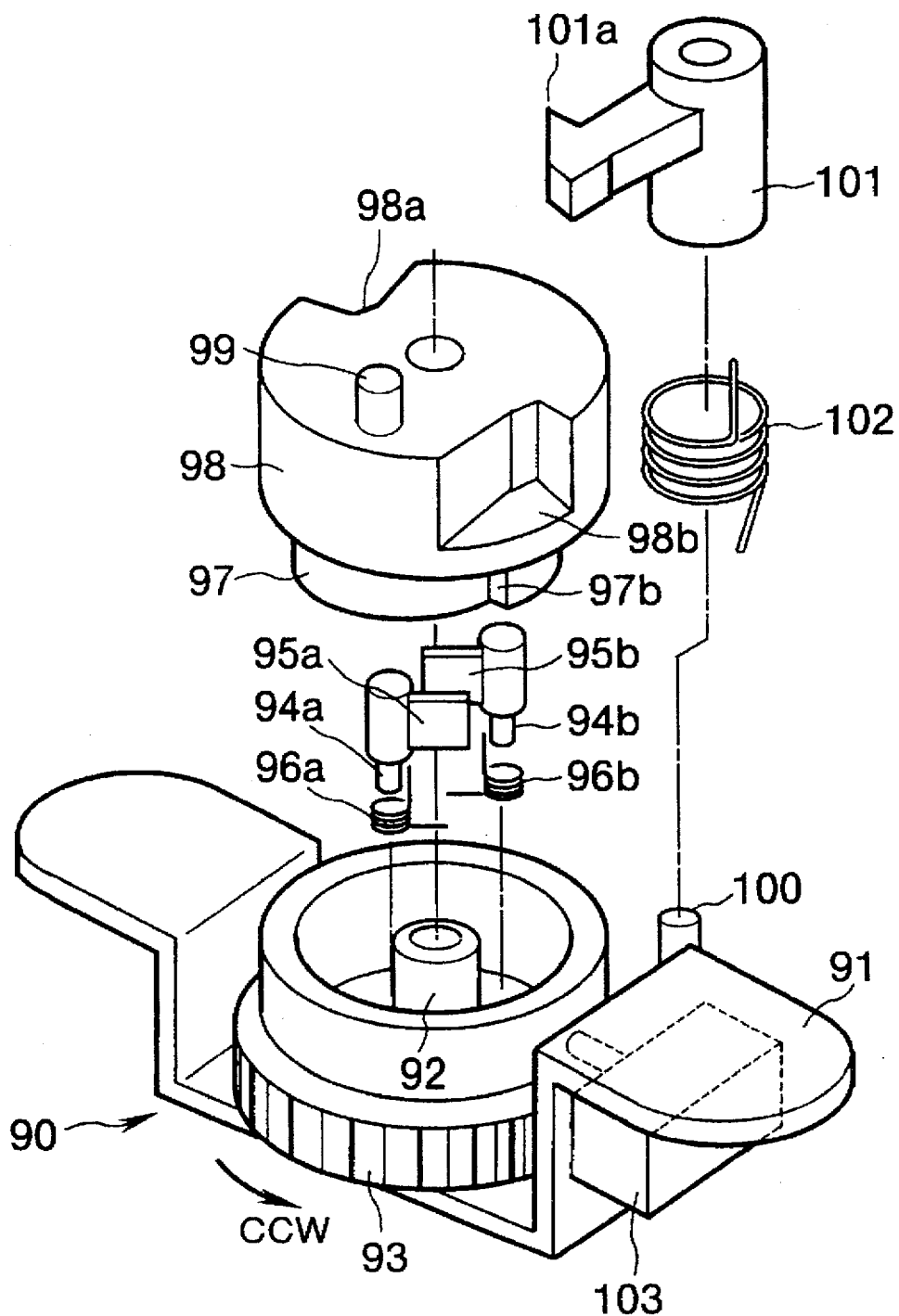
Figure 9A:
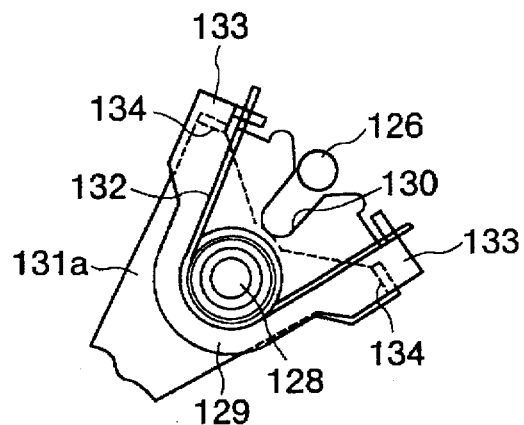
Figure 9B:
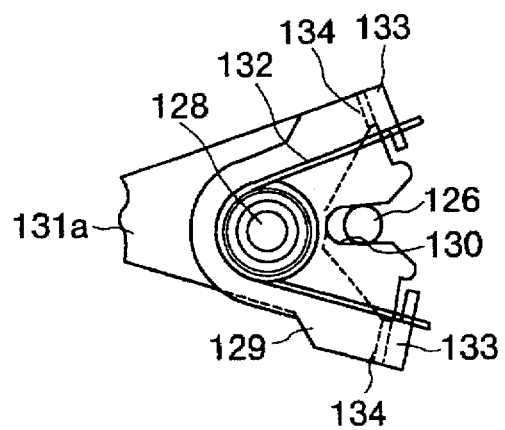
Figure 9C:
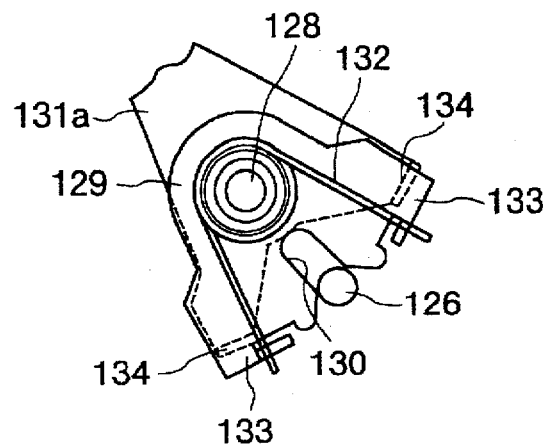
Figure 10:
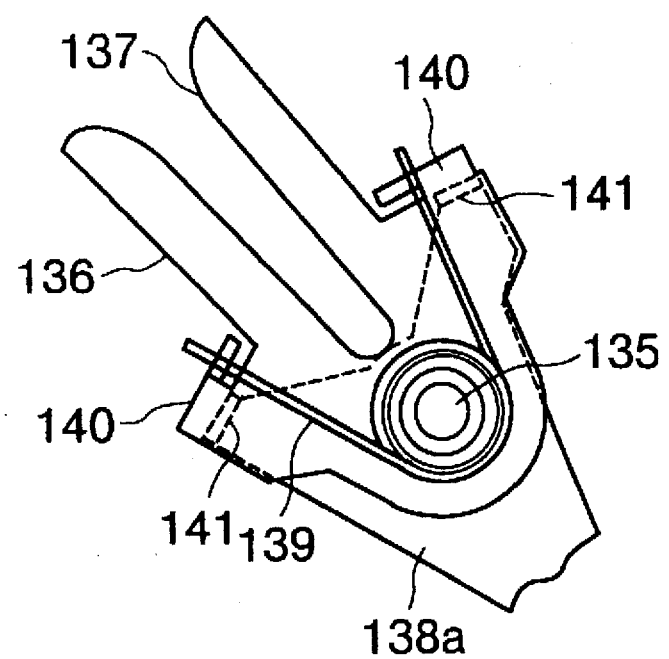
Figure 11A:
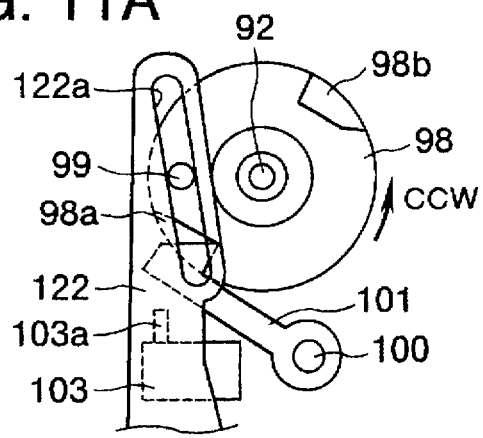
Figure 11B:
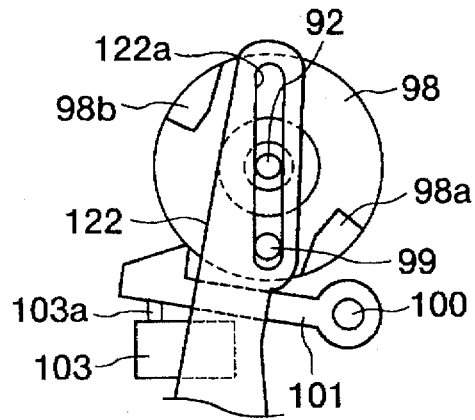
Figure 11C:
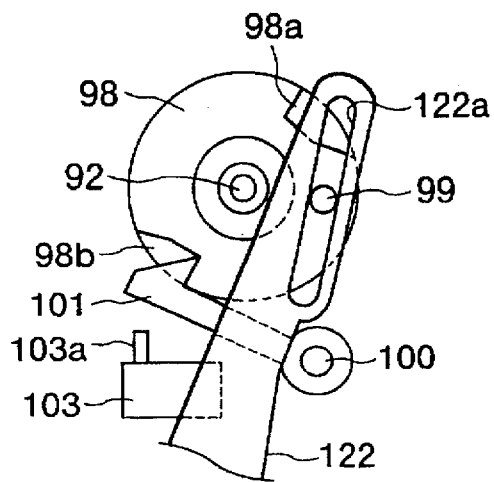
Figure 12:
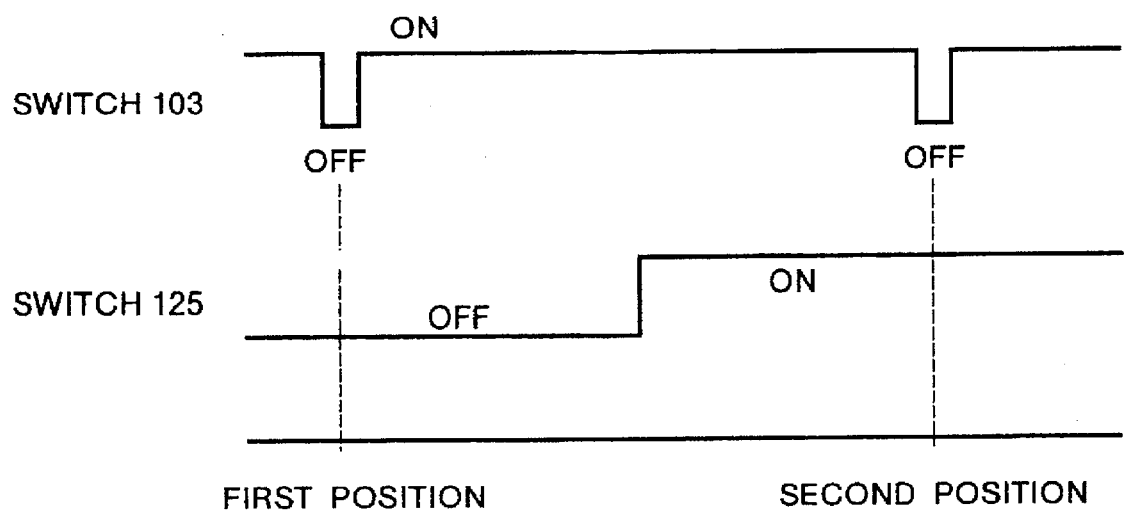
Figure 13:
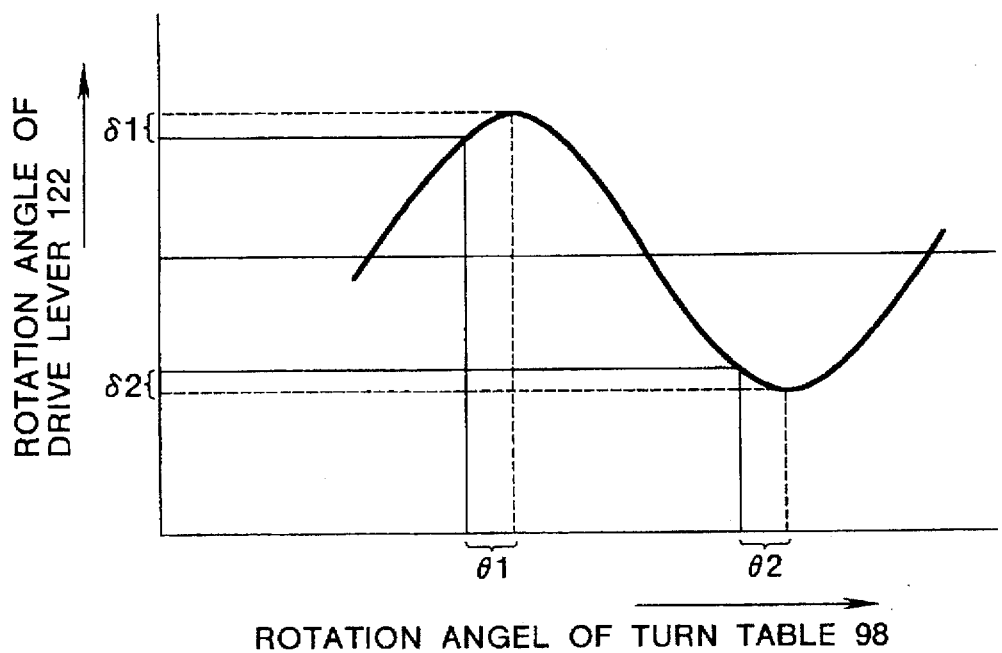
Figure 14:
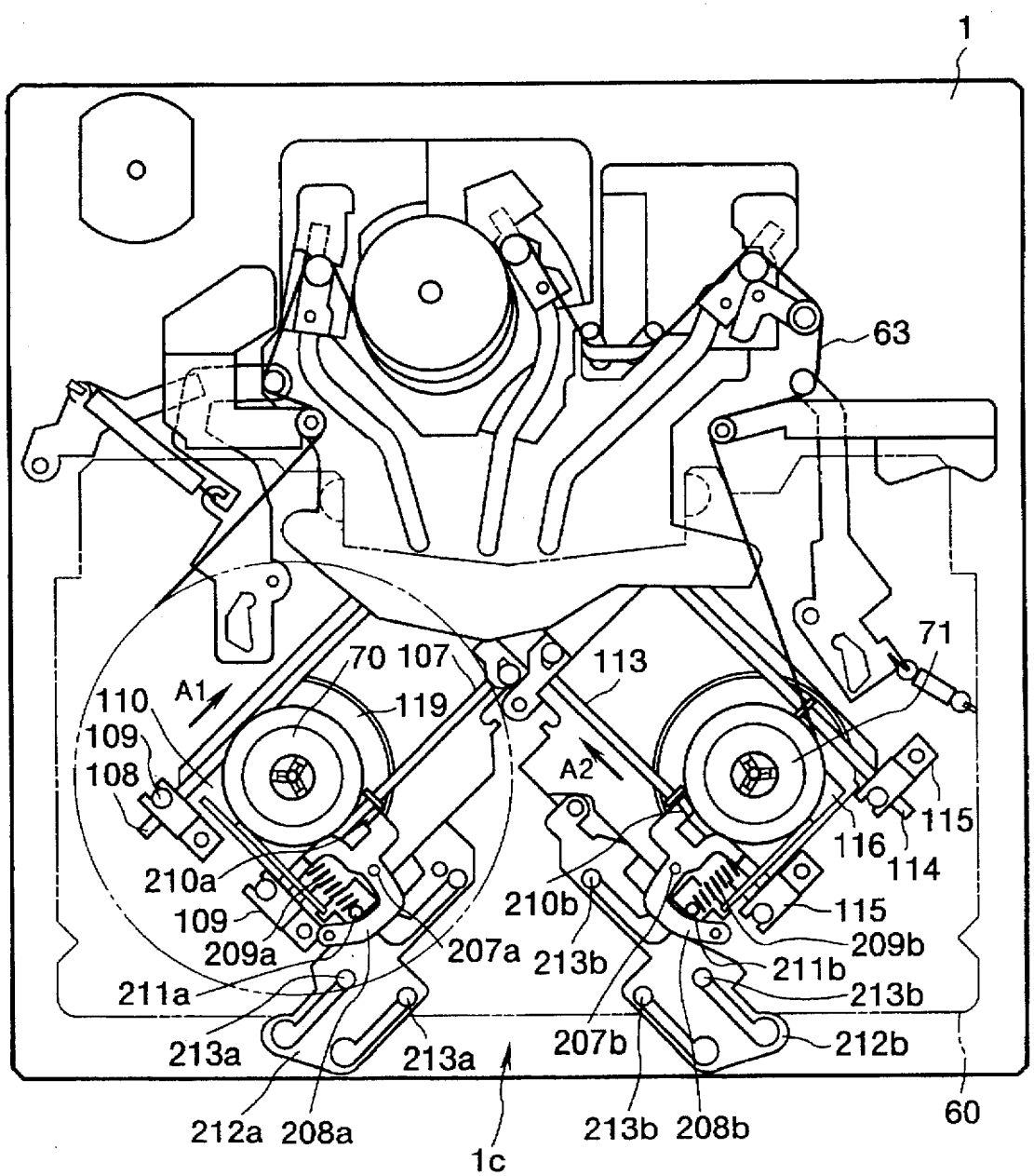
Figure 15:
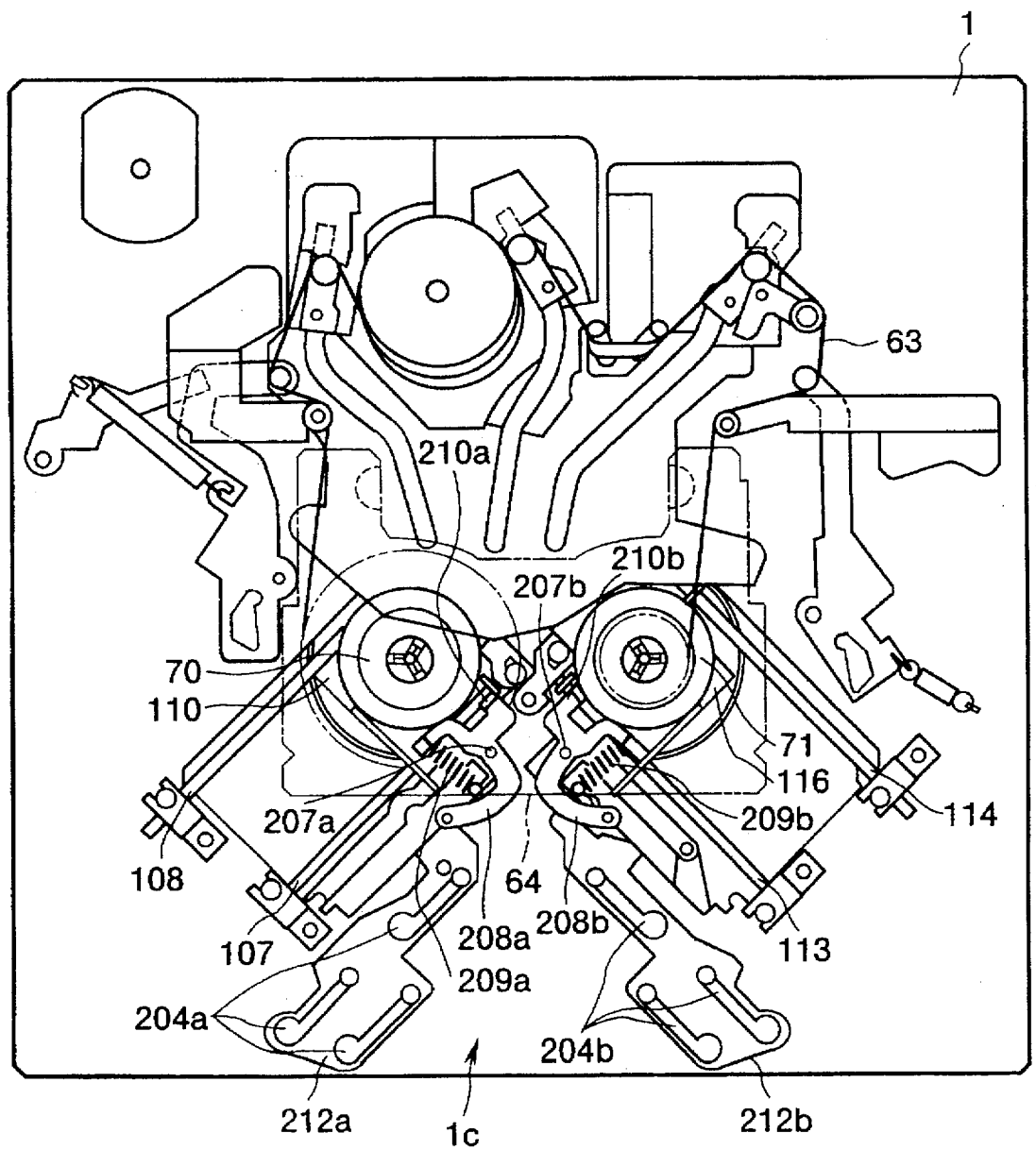
Figure 16:
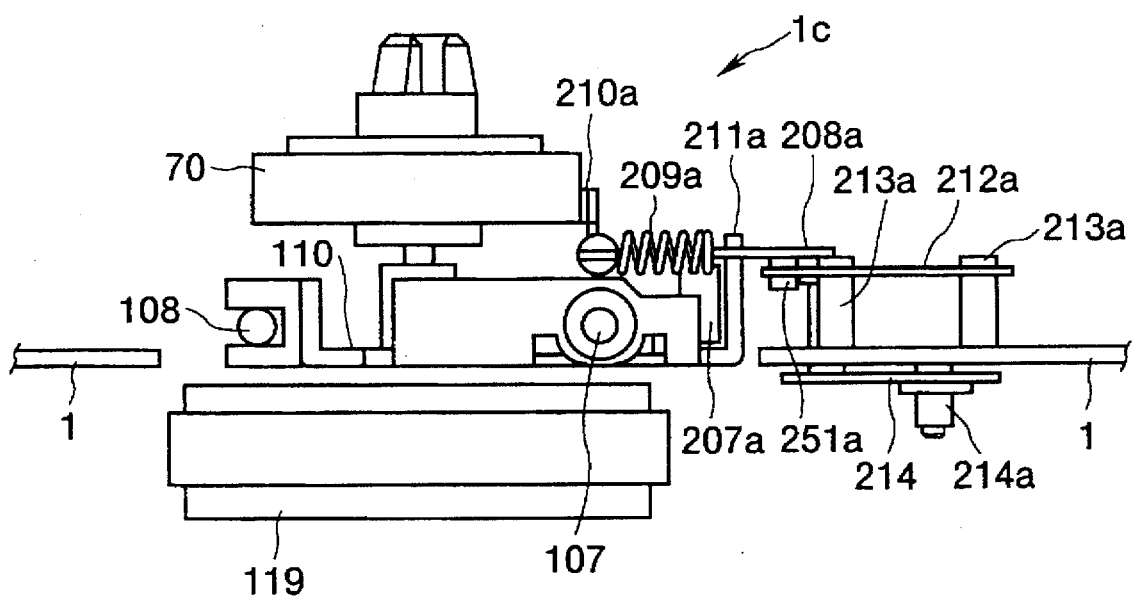
Figure 17:
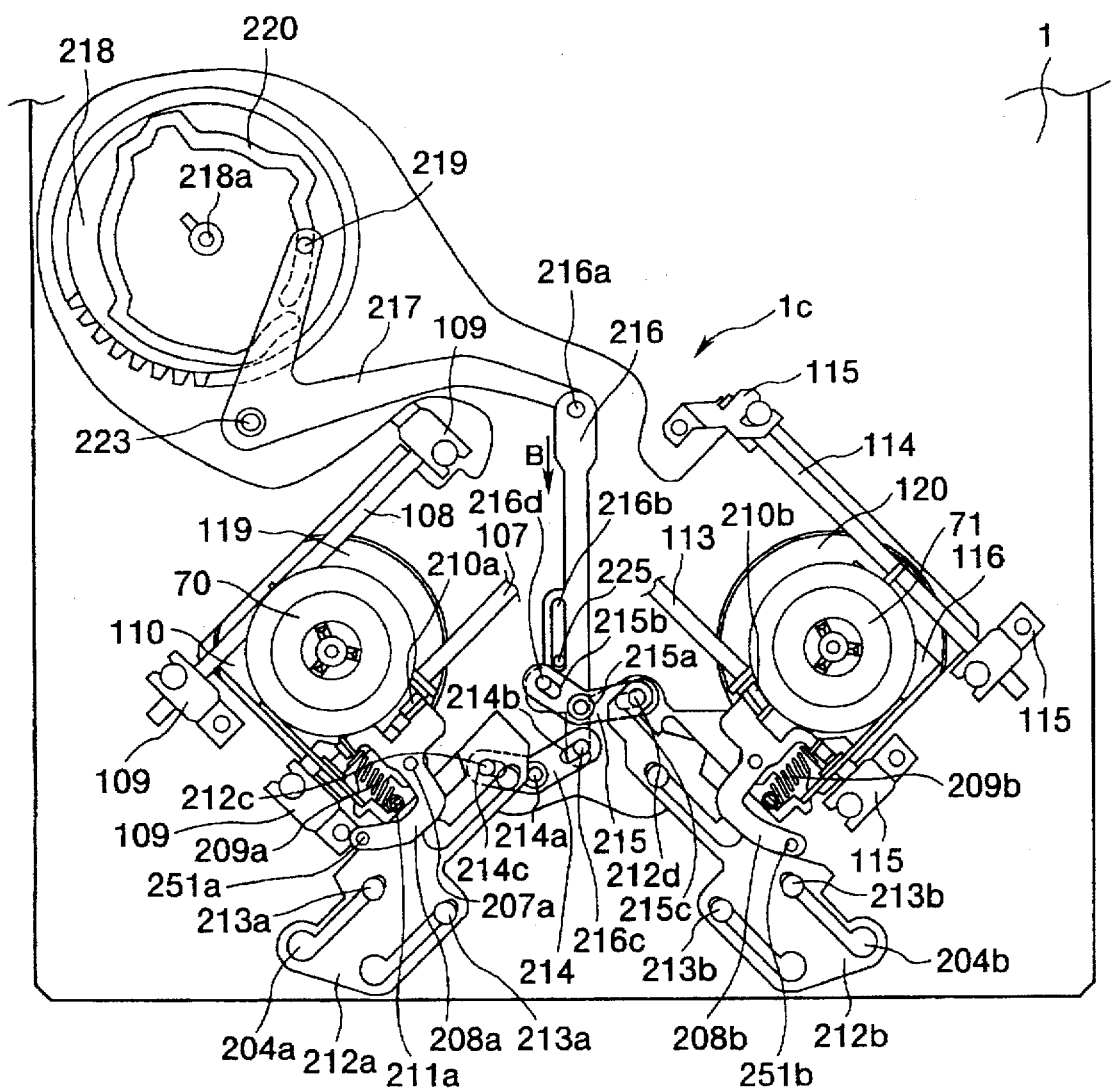
Figure 18:
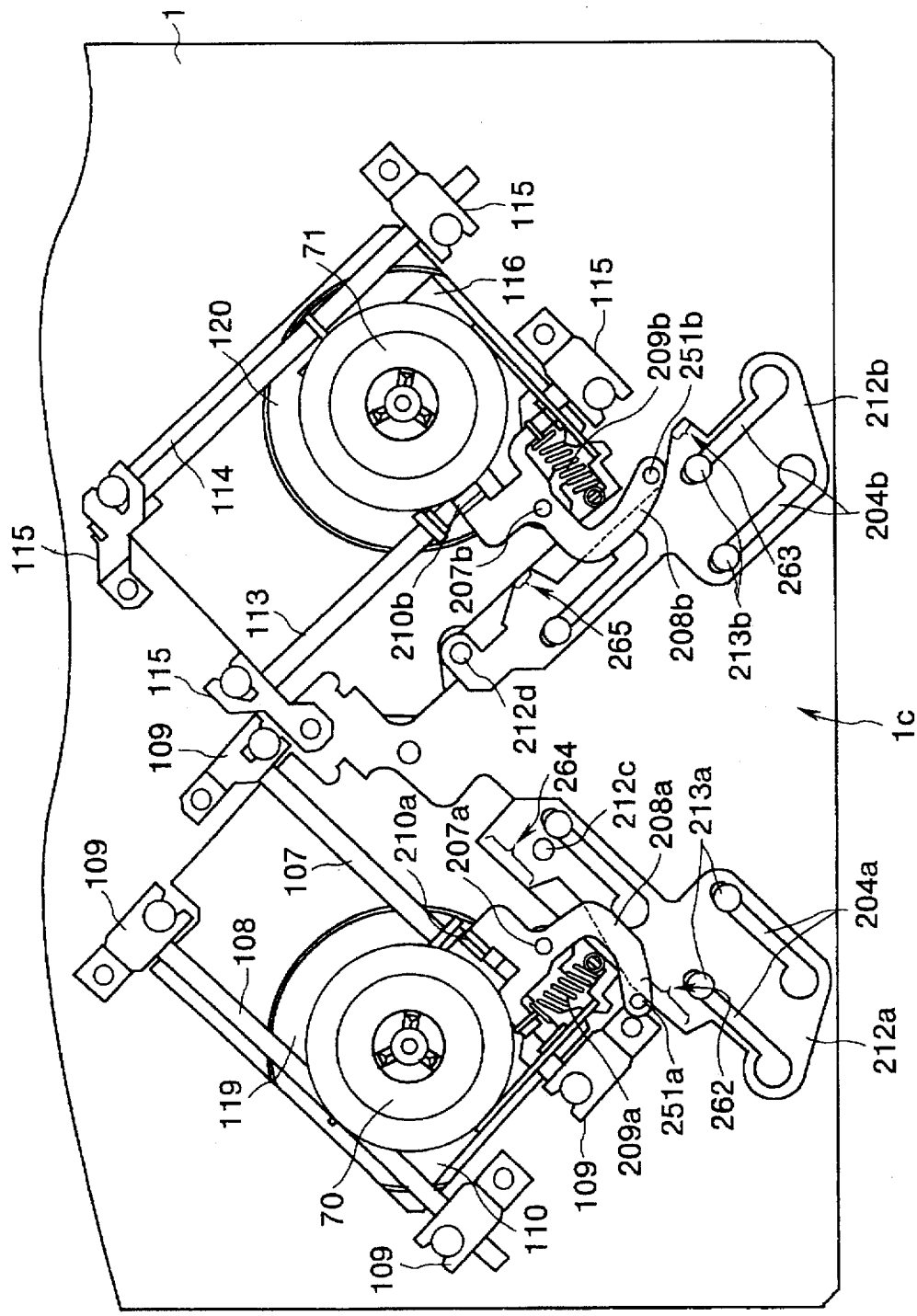
Figure 19:
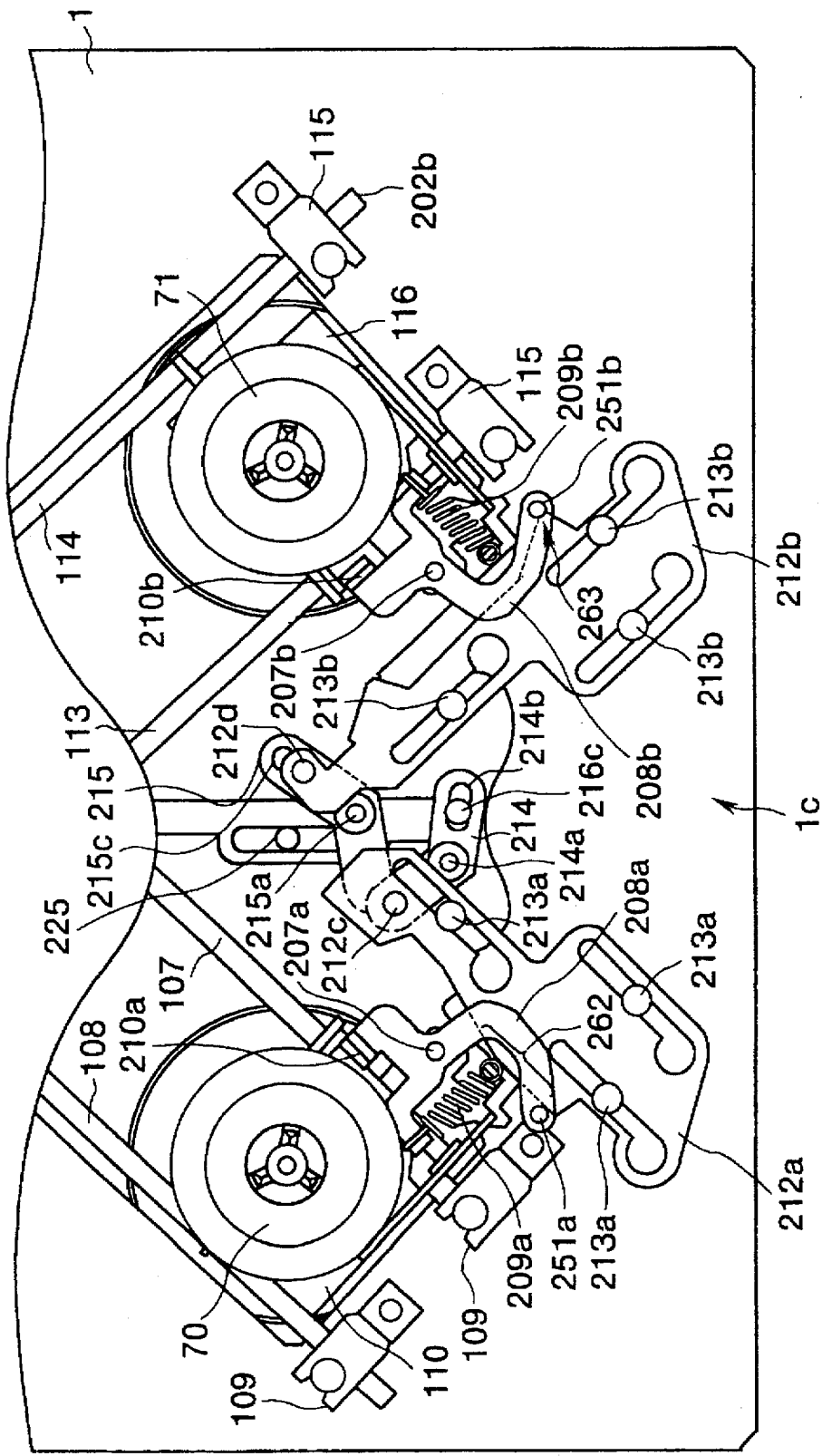
Figure 20:
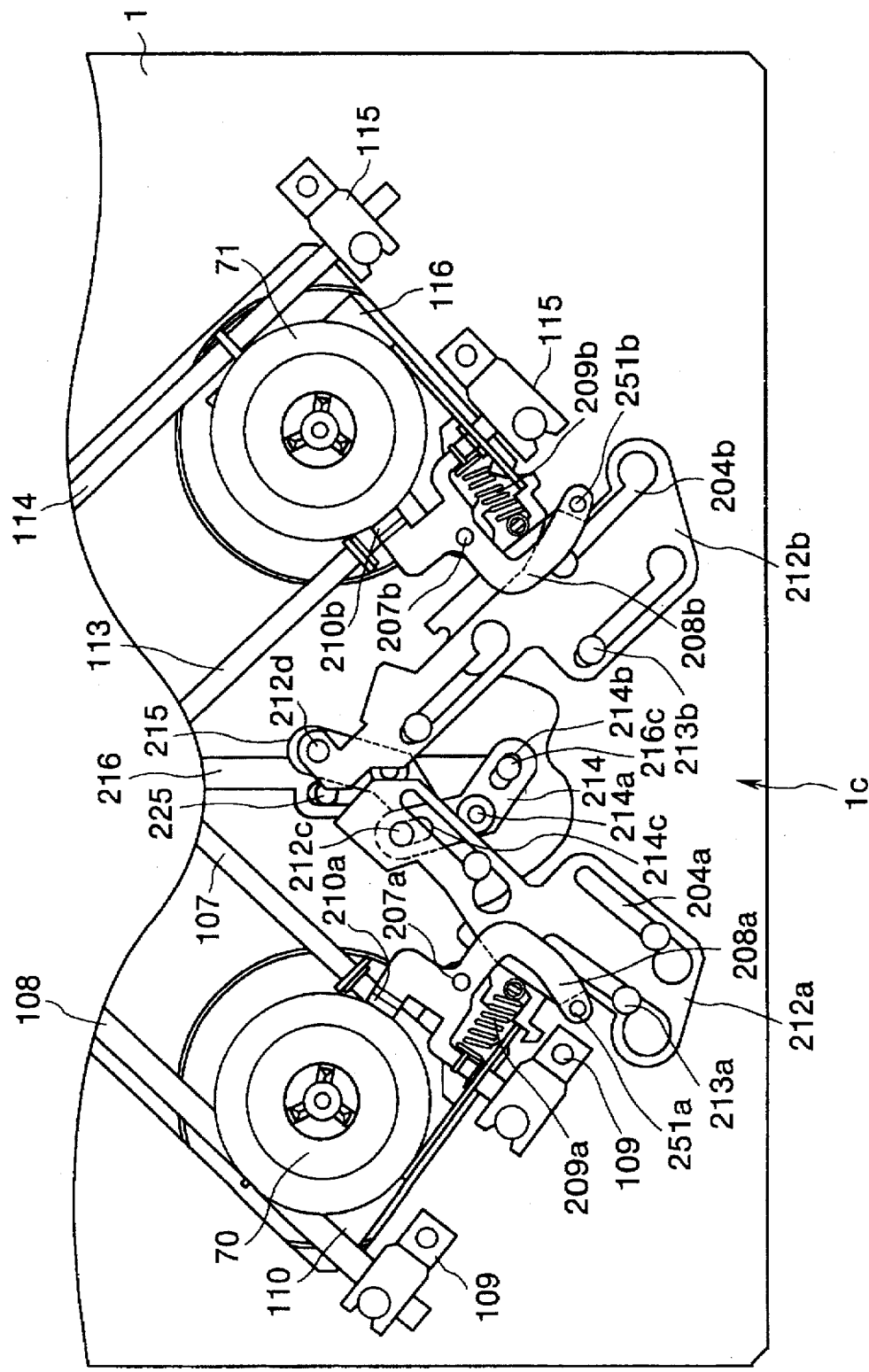
Figure 21:
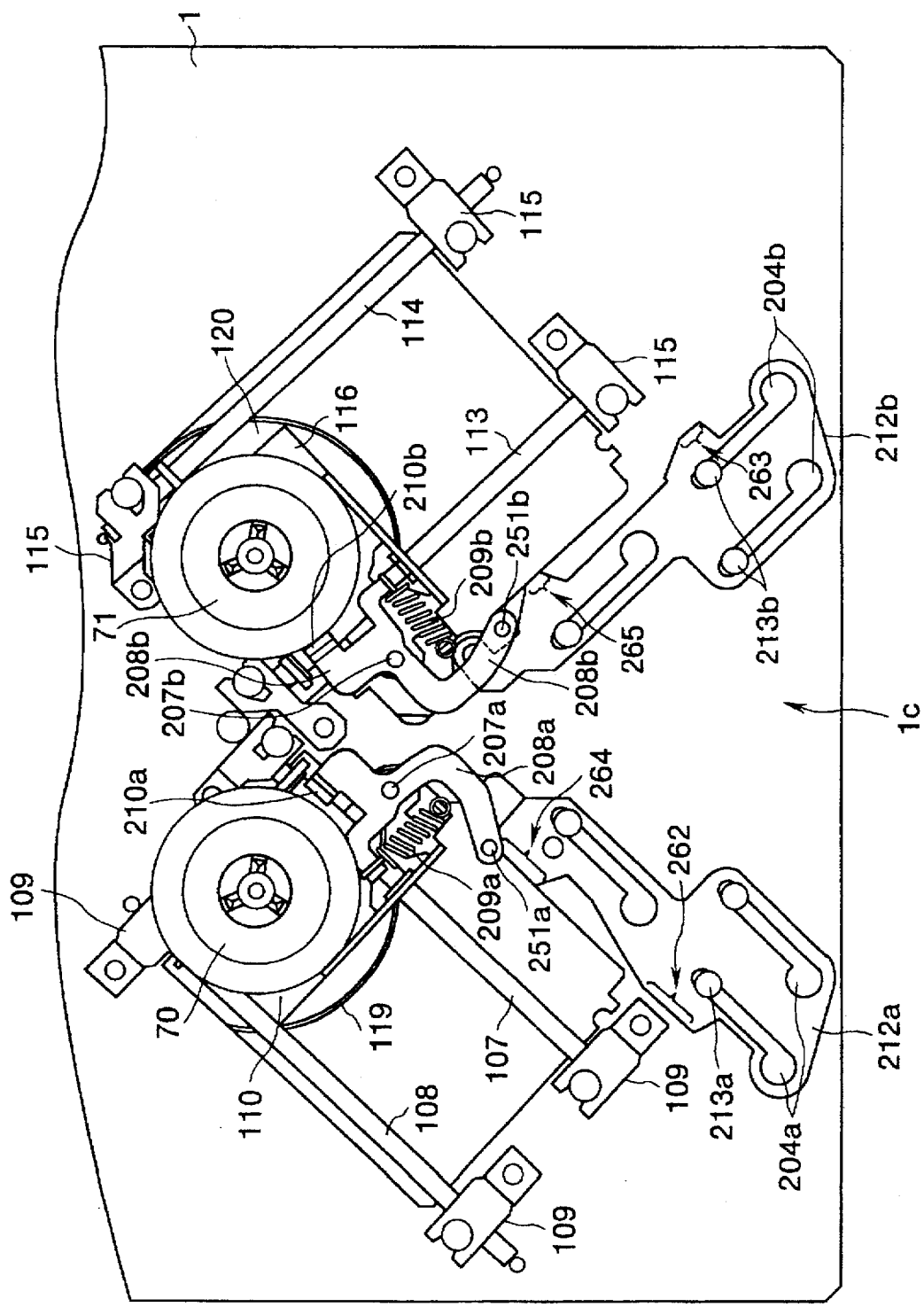
Figure 22:
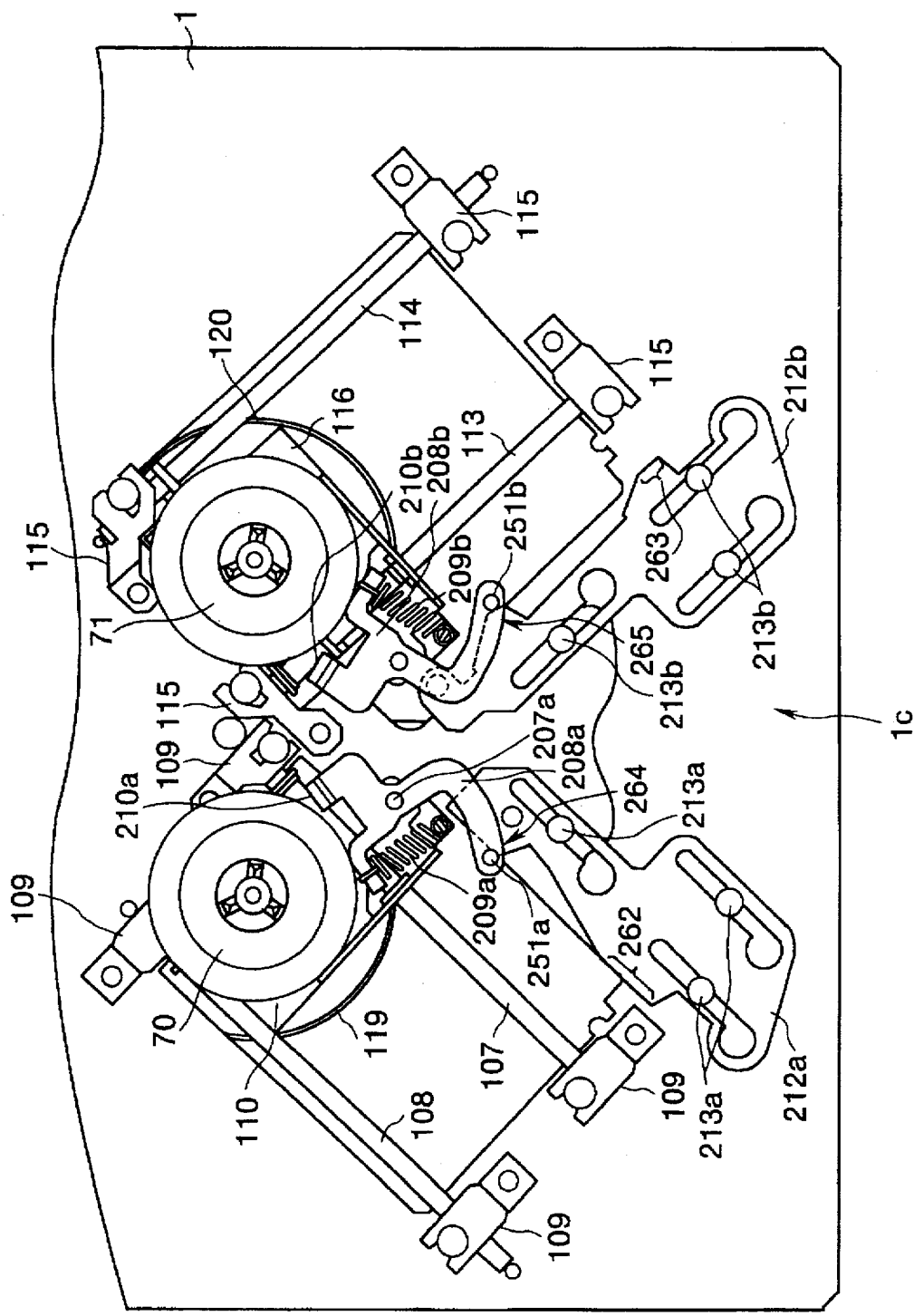
Figure 23:
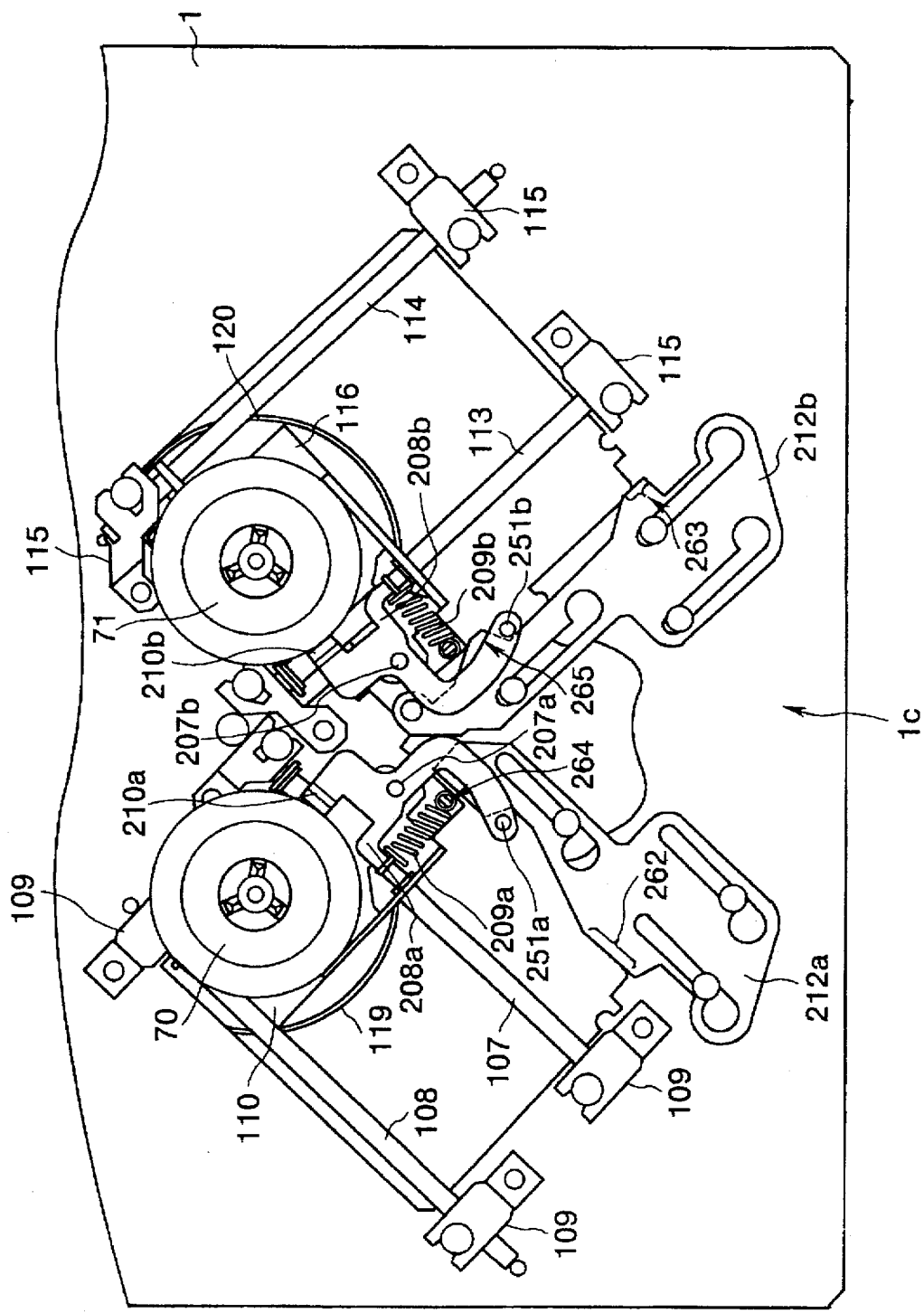
Figure 24:
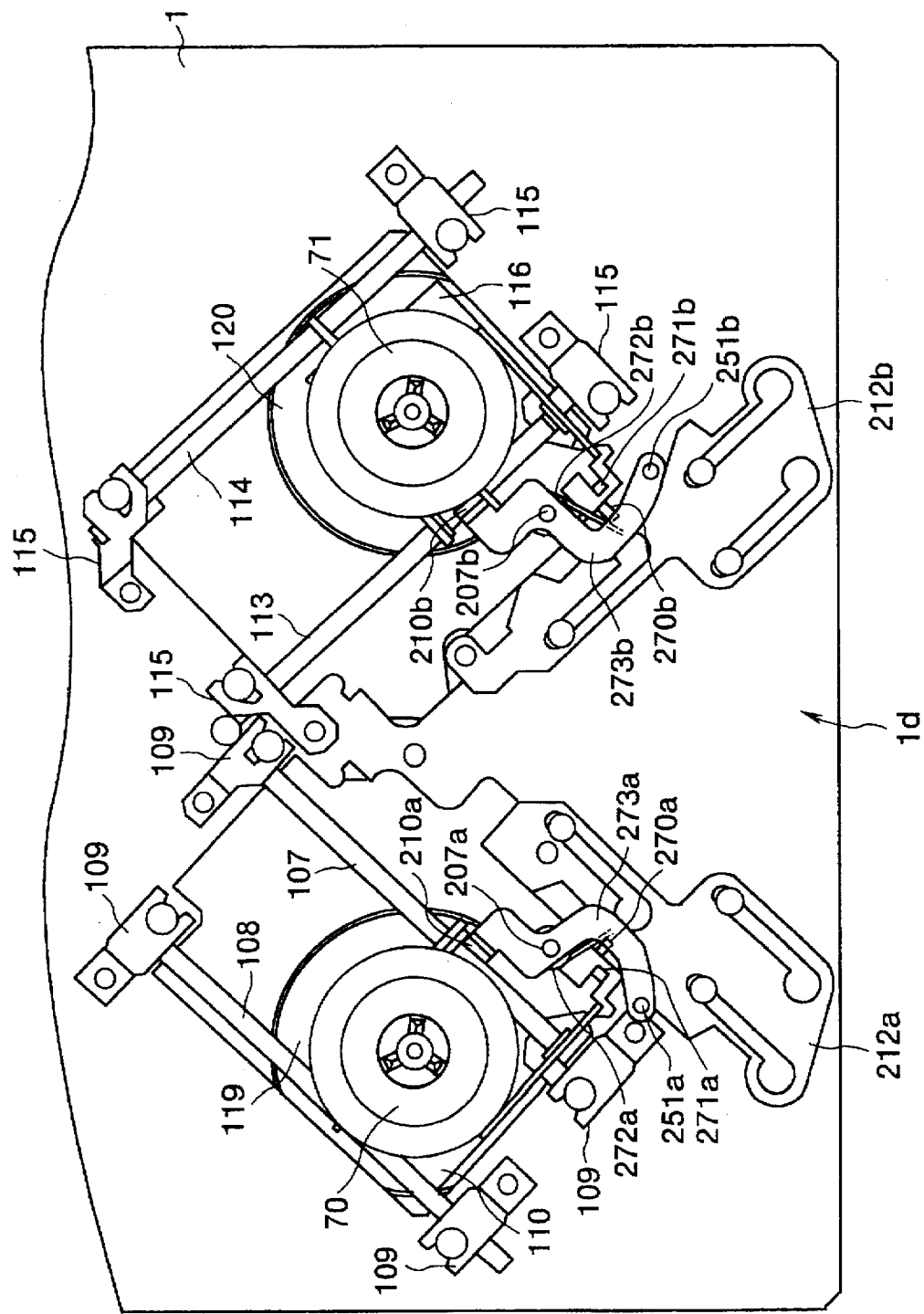
Figure 25:
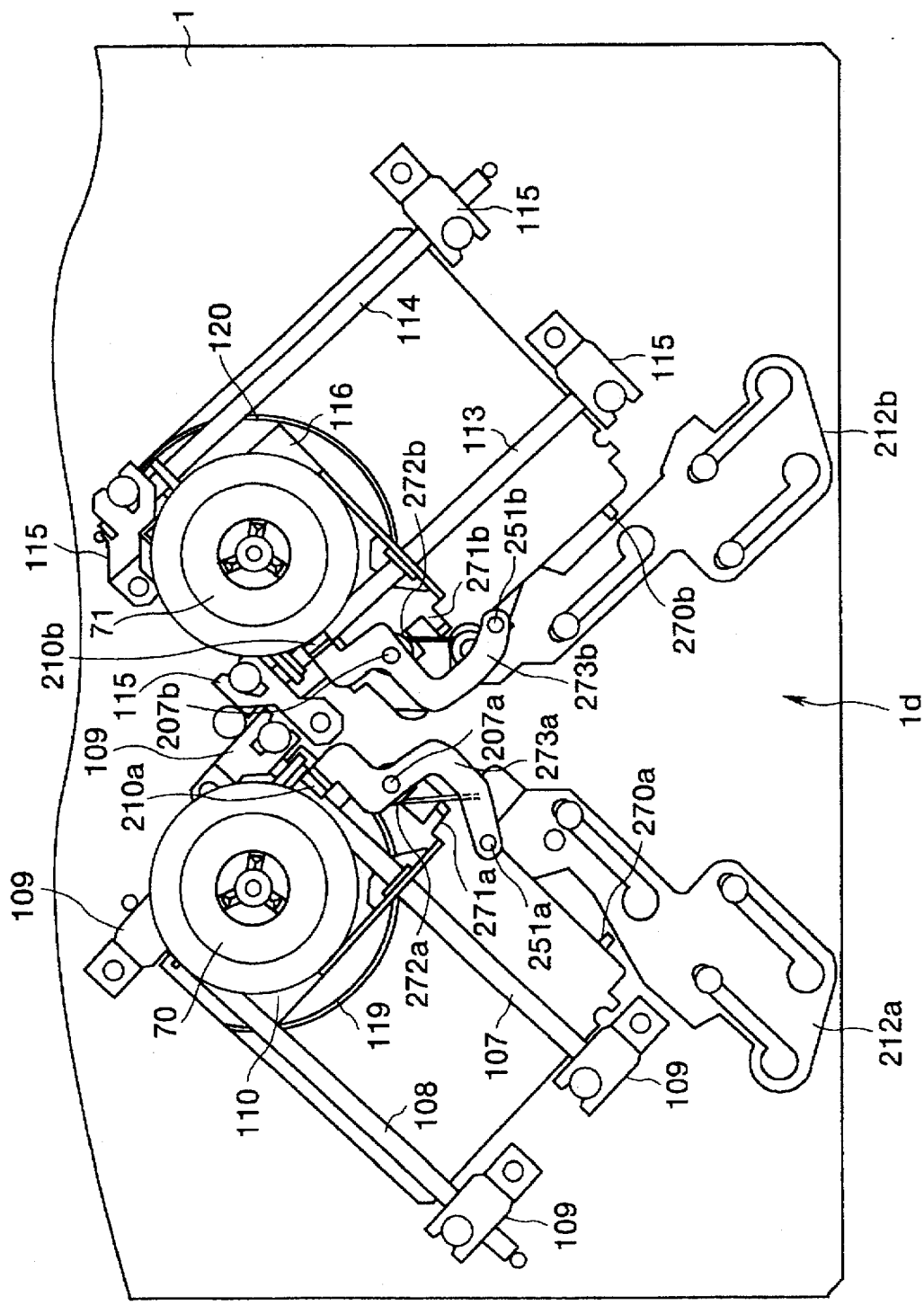
Figure 26:
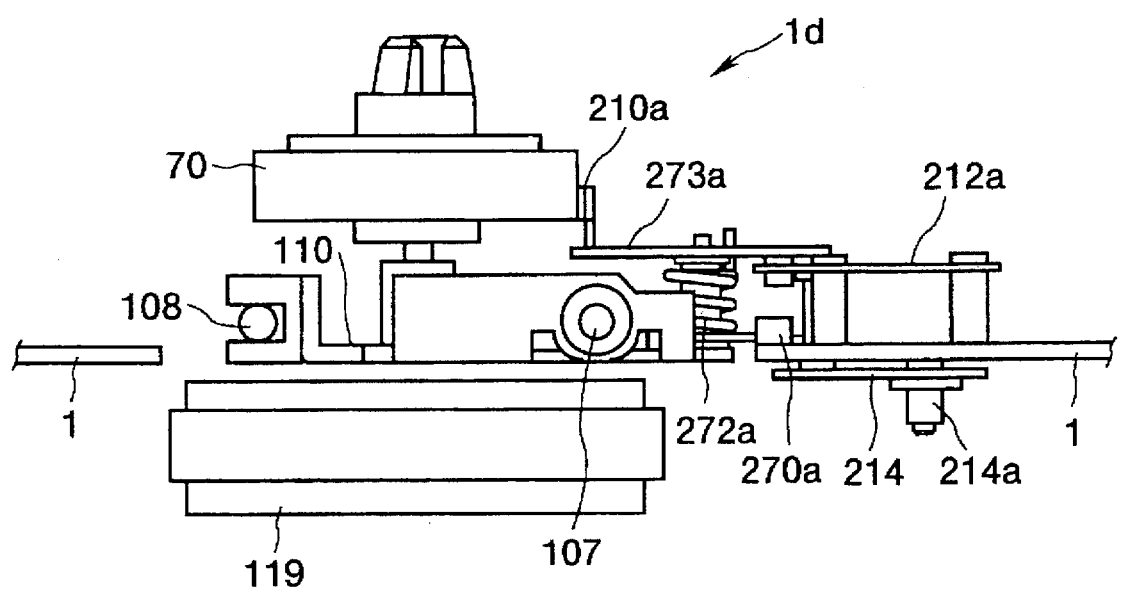
Figure 27:
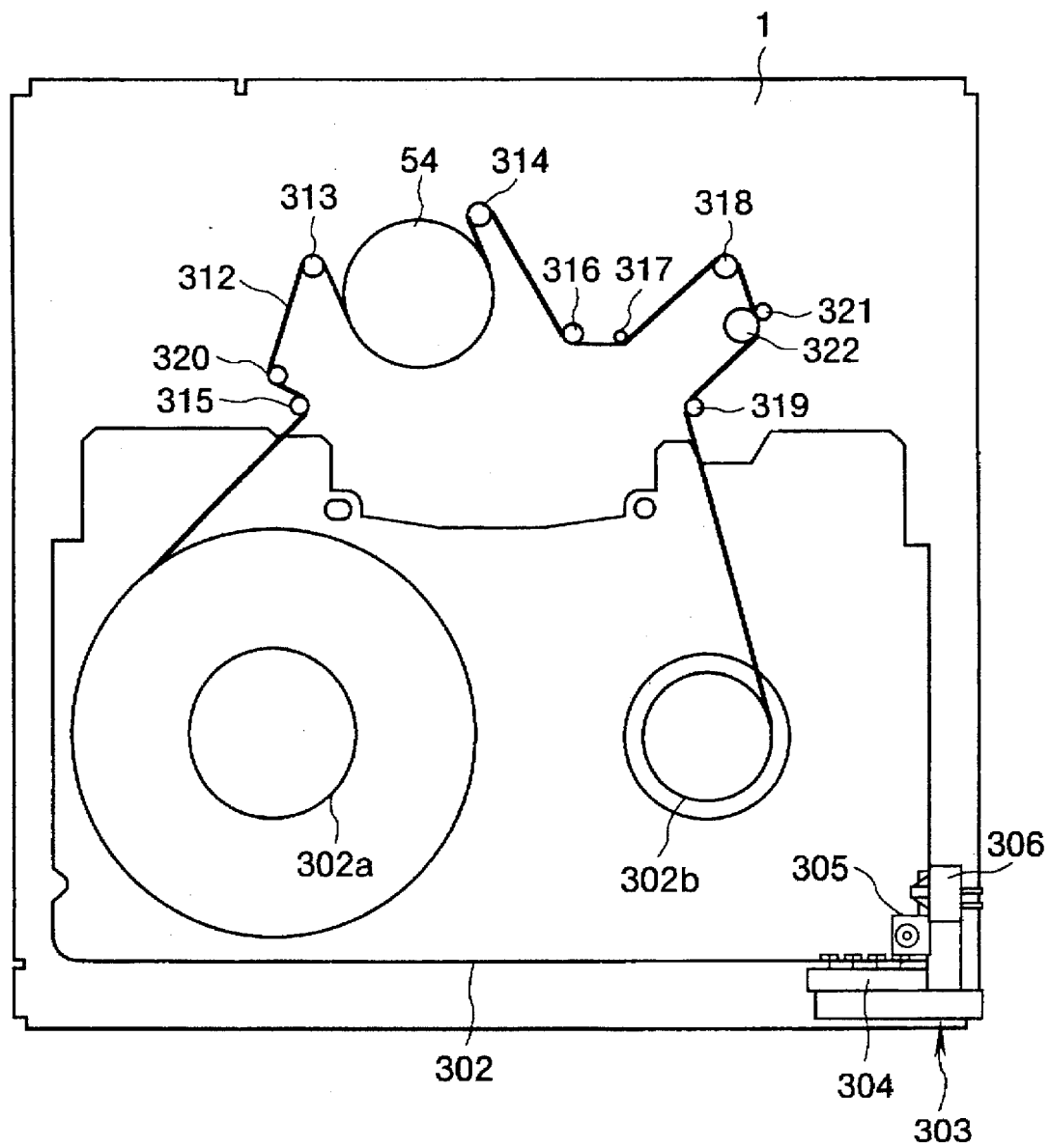
Figure 28:
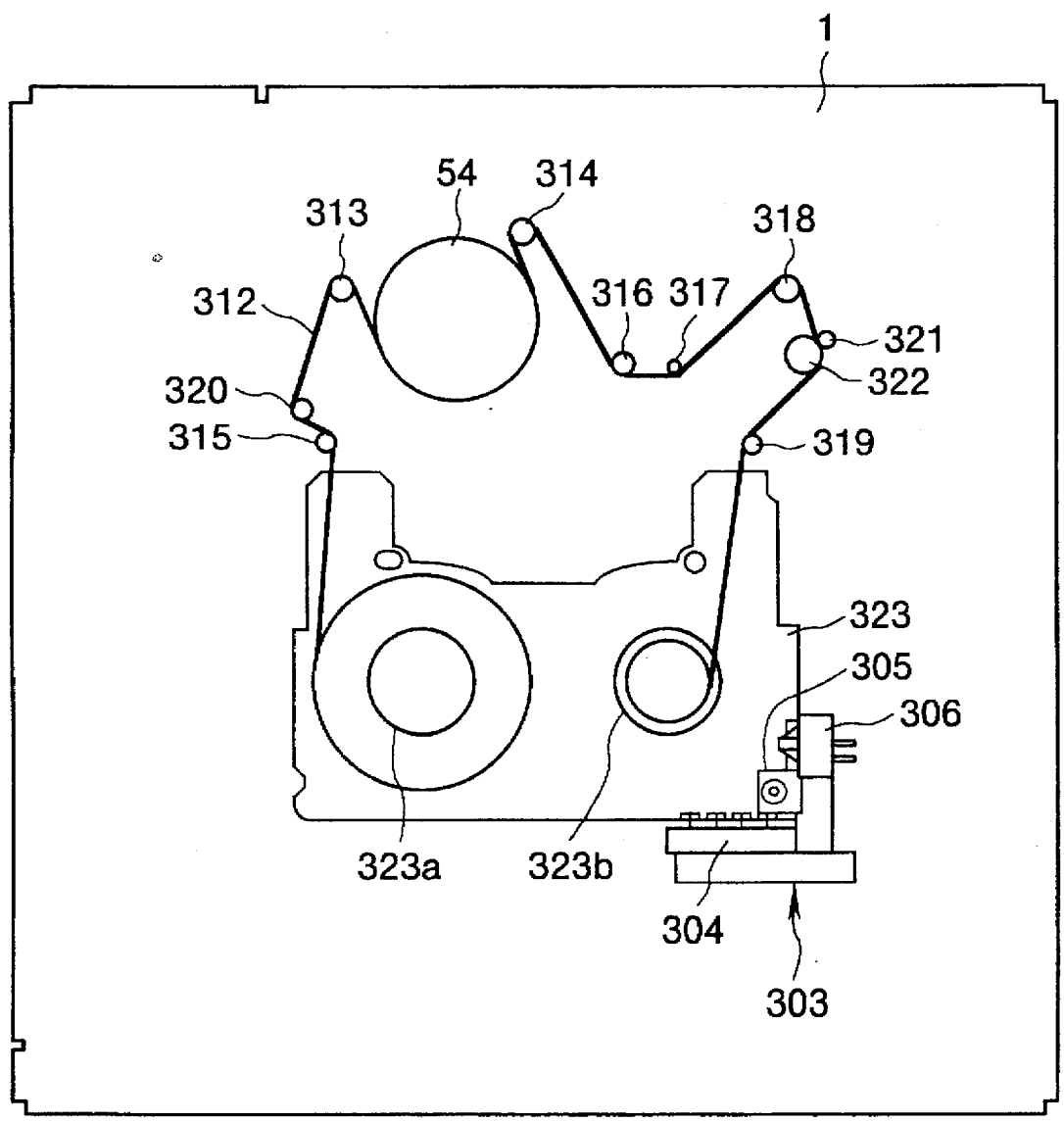
Figure 29A:
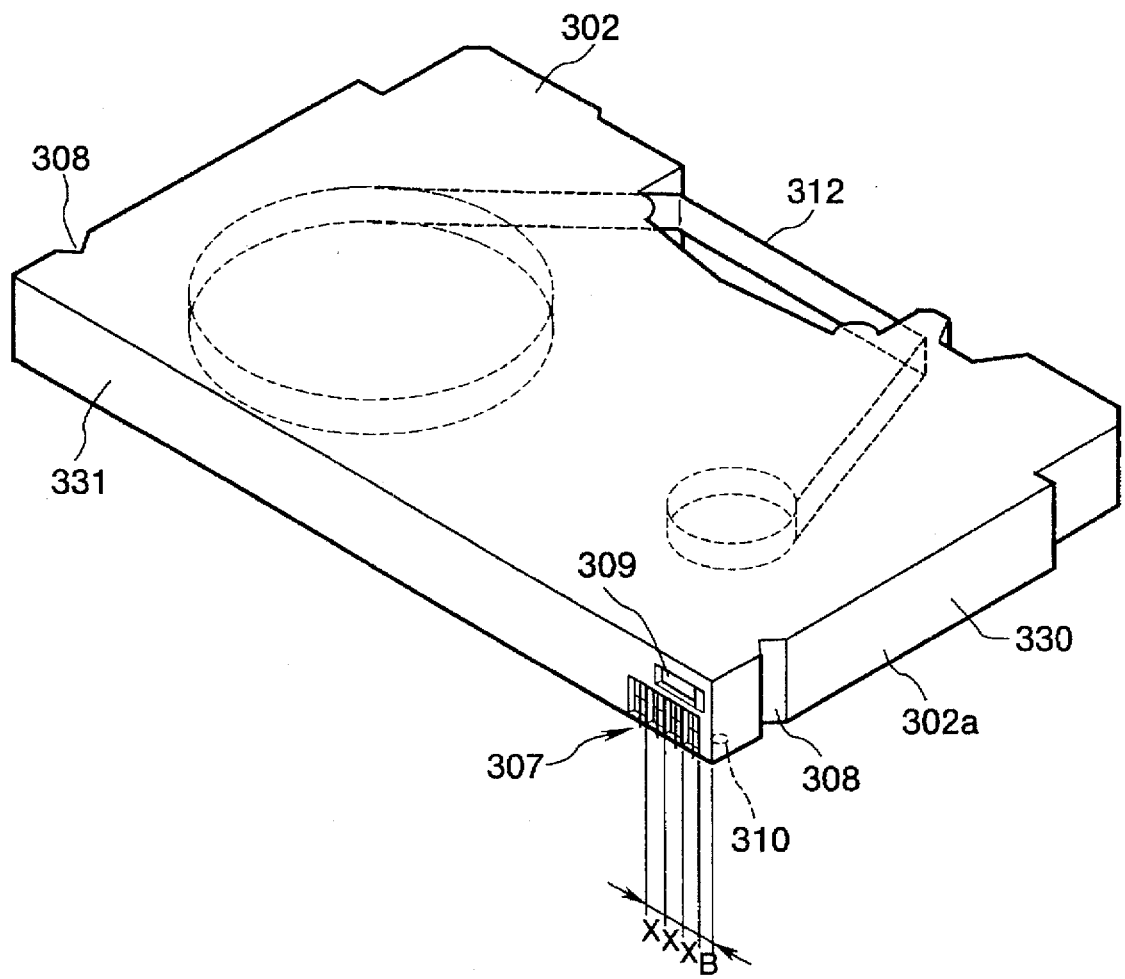
Figure 29B:
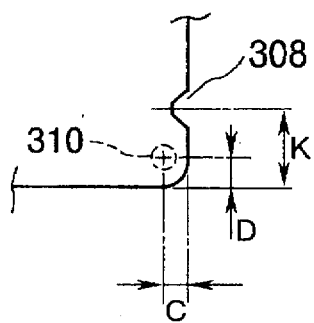
Figure 30A:
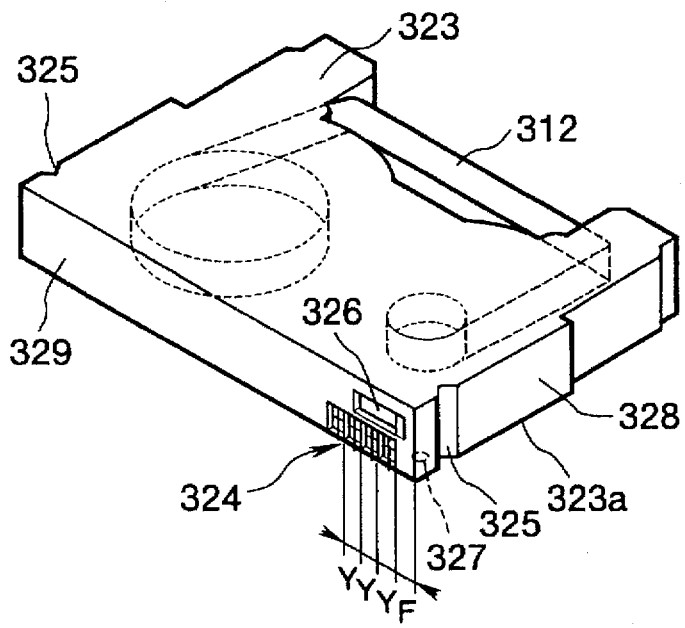
Figure 30B:
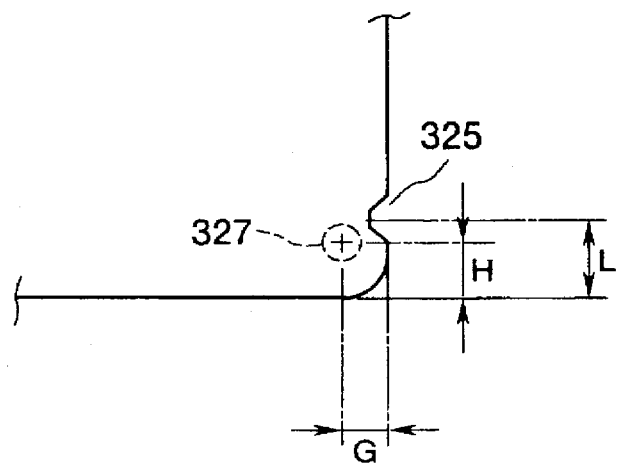
Figure 31:
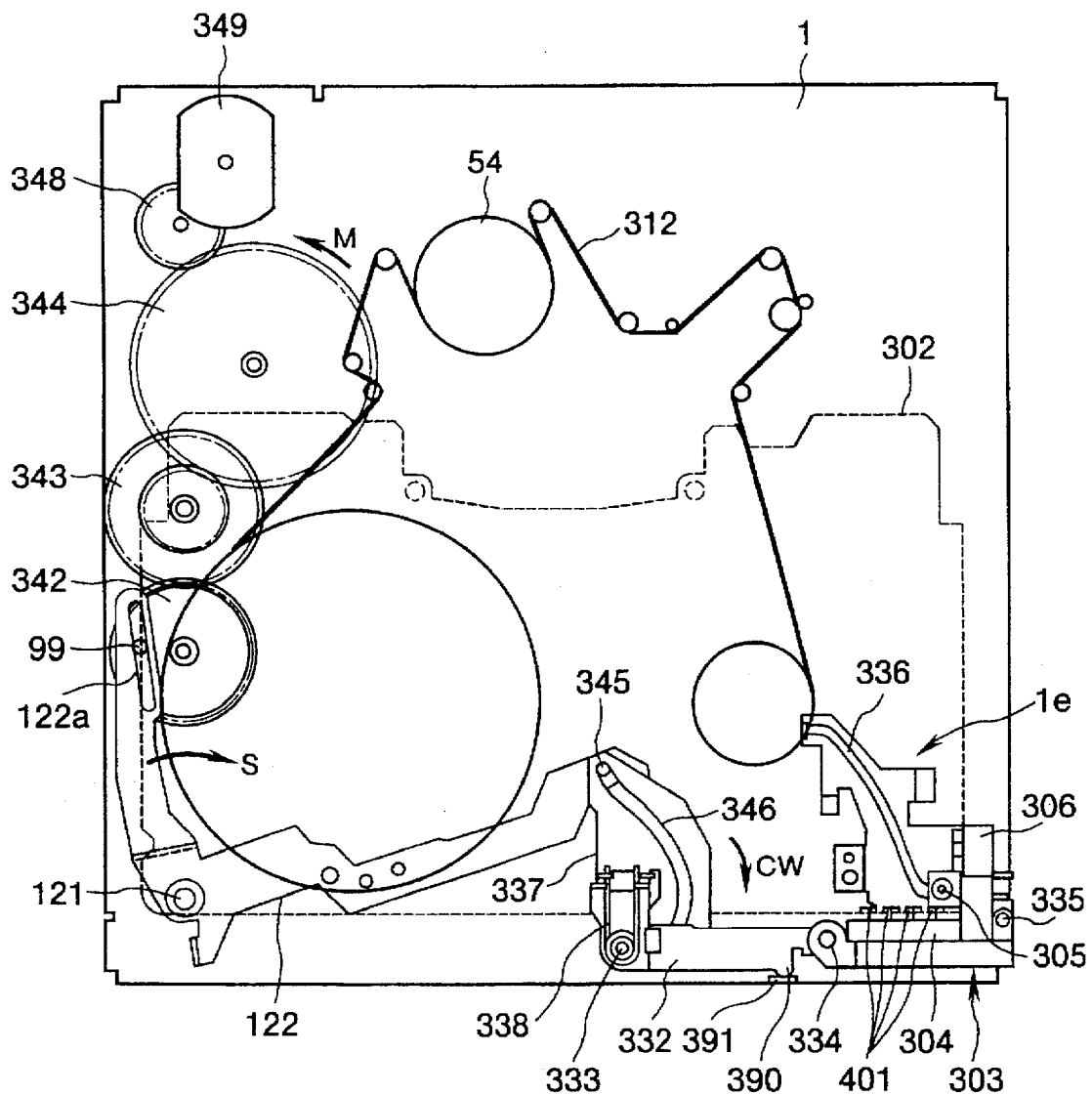
Figure 32:
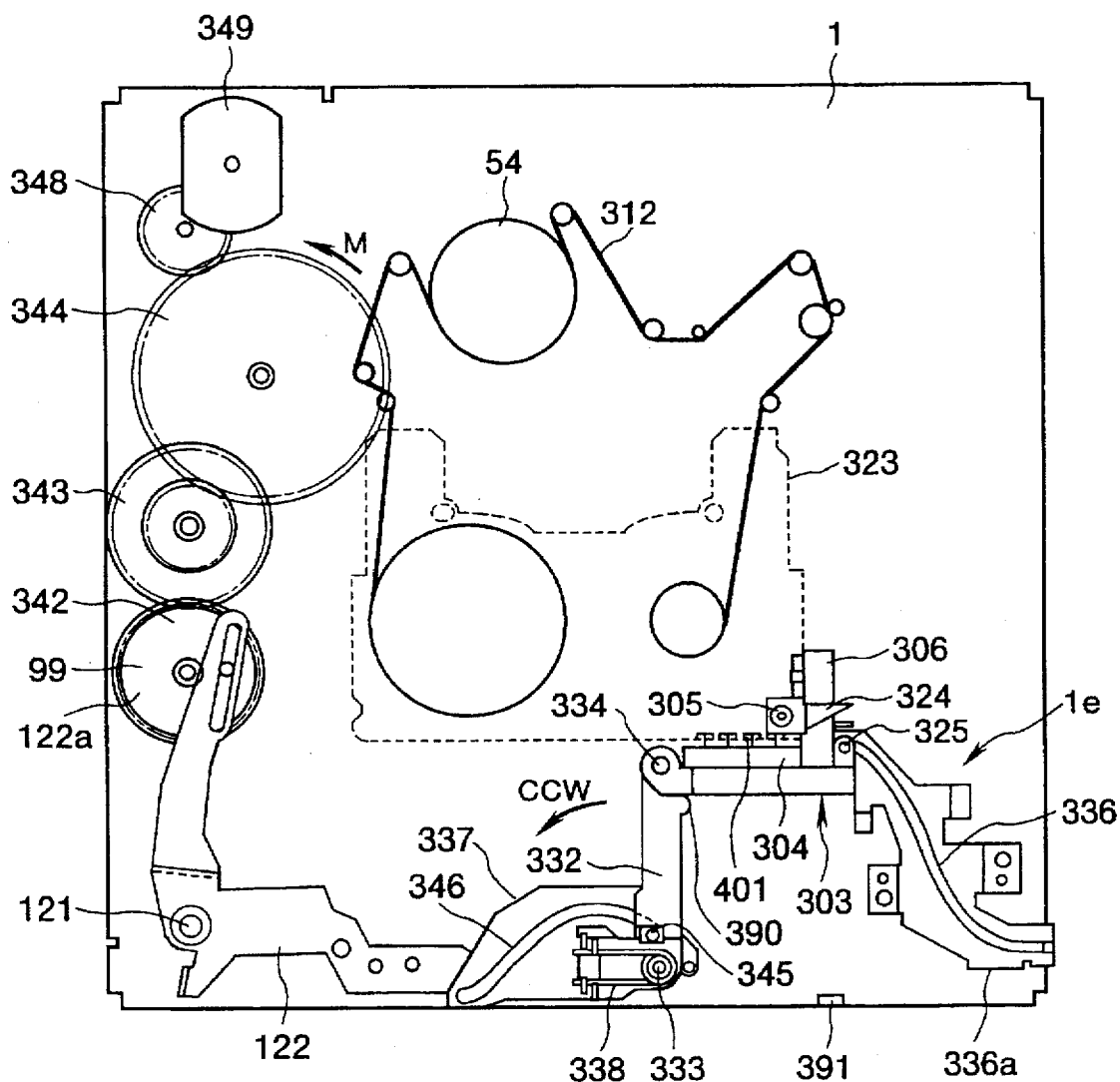
Figure 33:
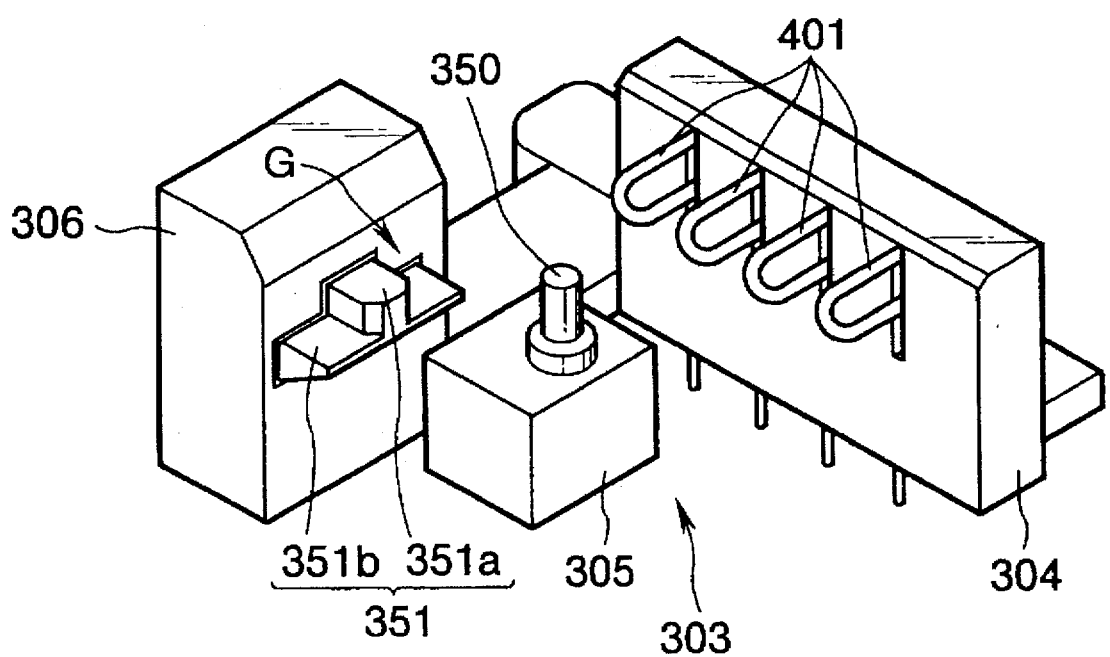
Figure 34A:
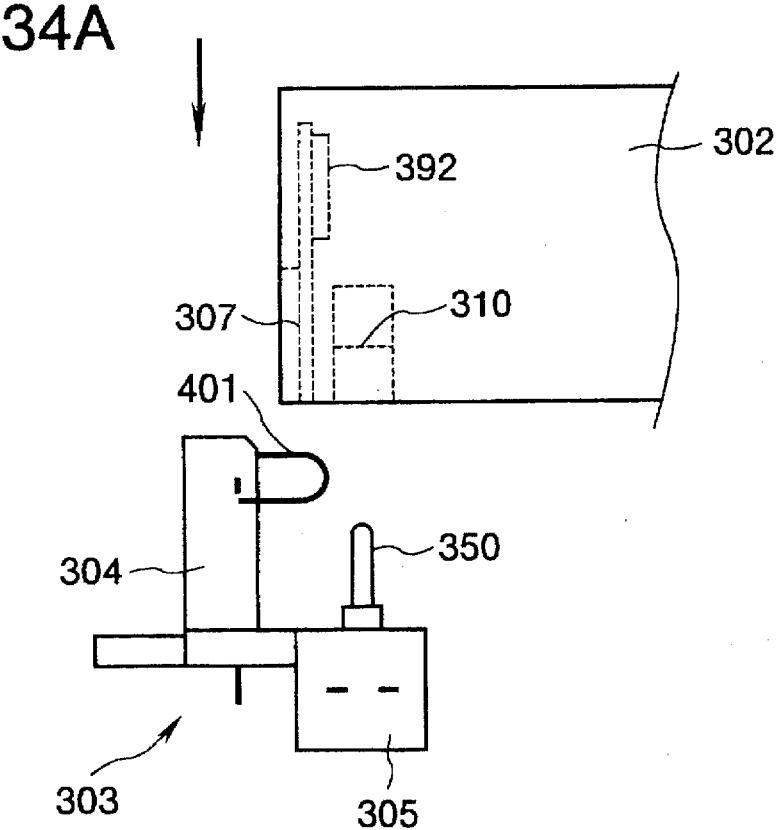
Figure 34B:
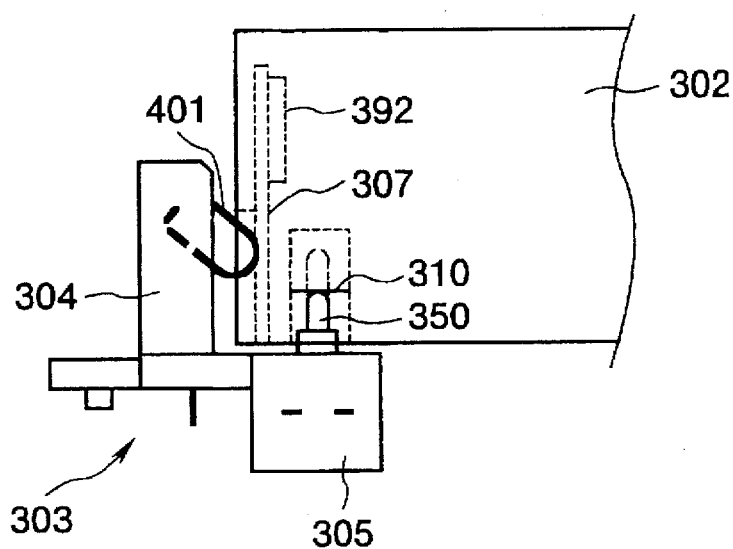
Figure 35:
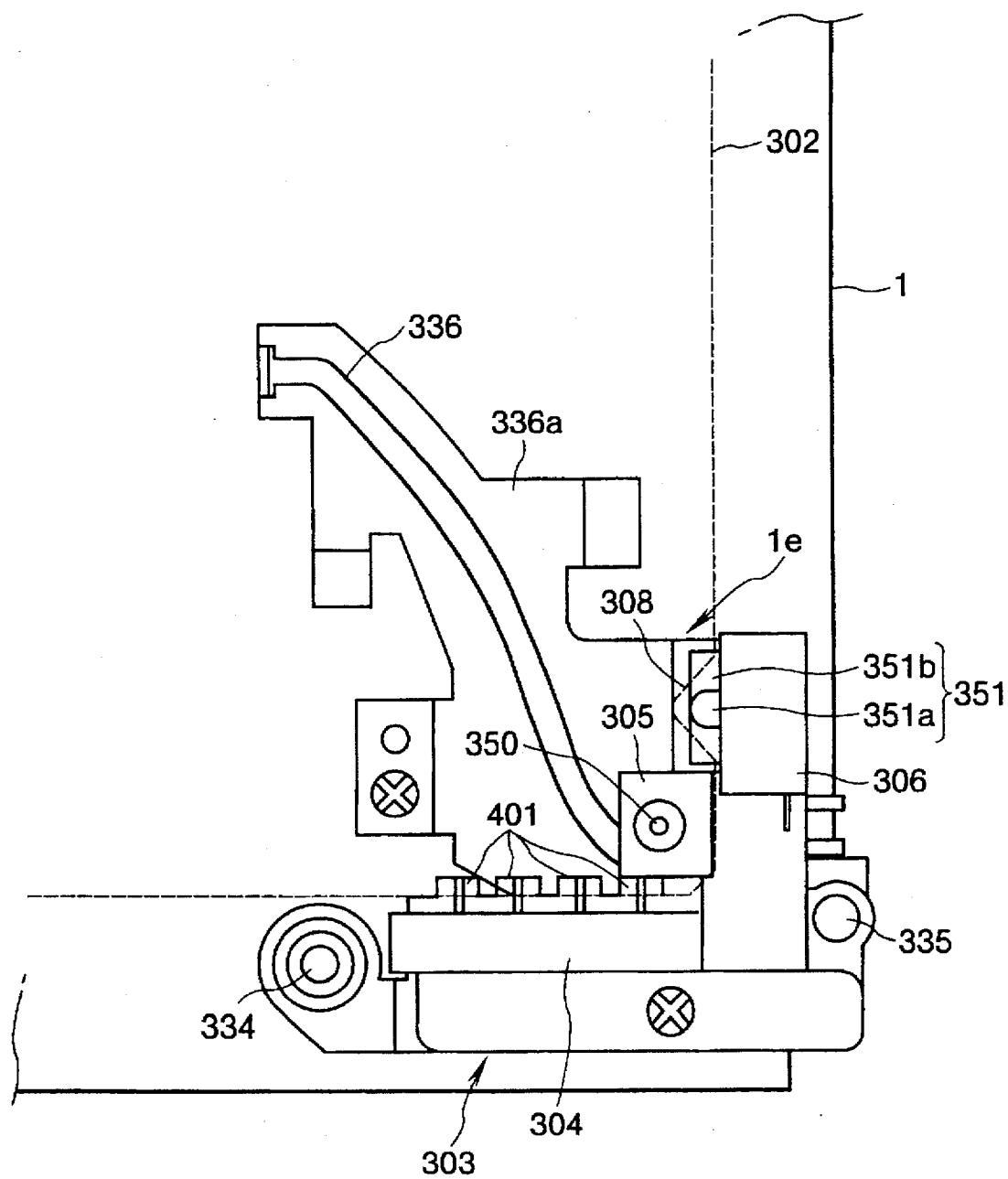
Figure 36:
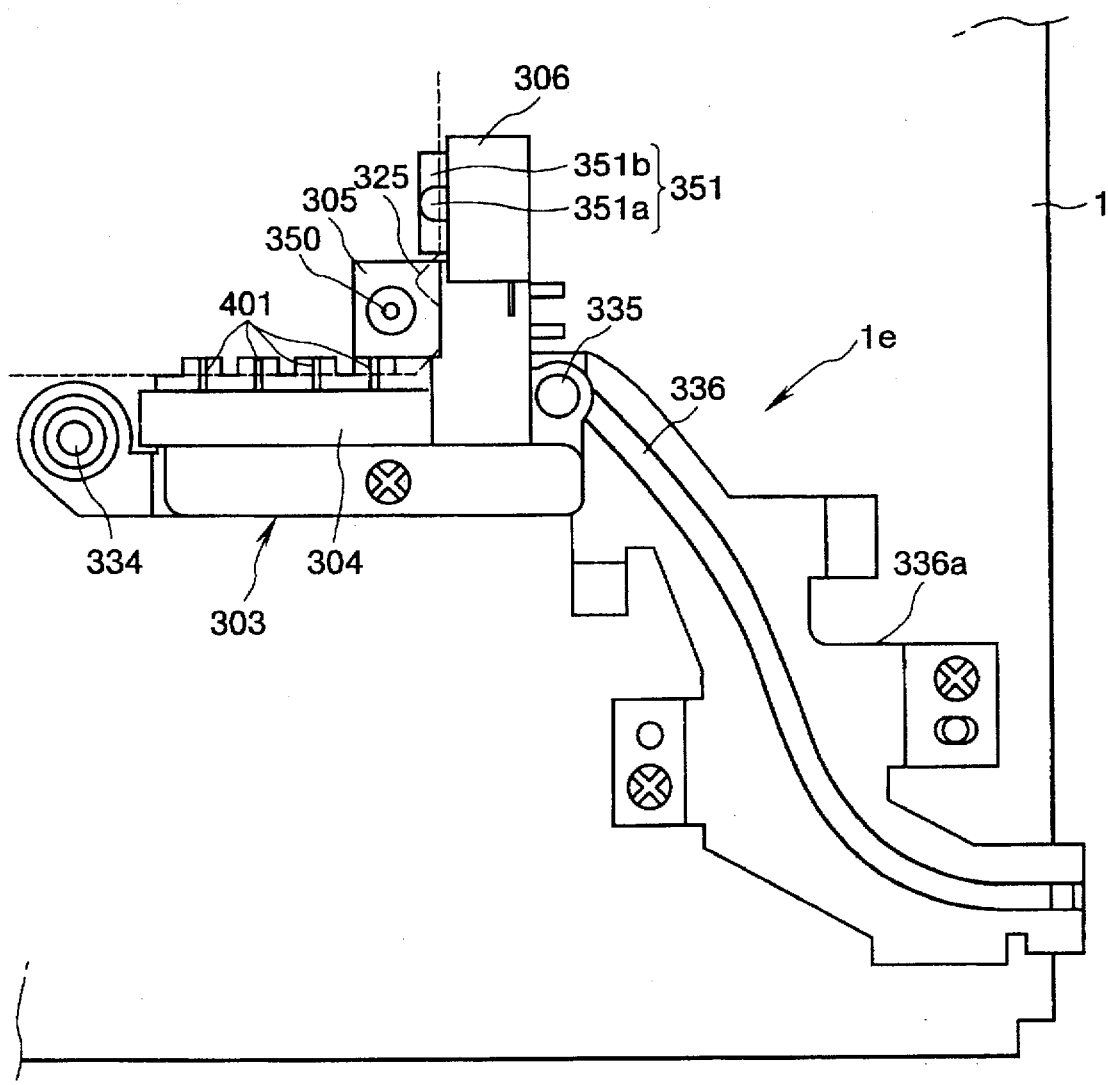
Figure 37A:
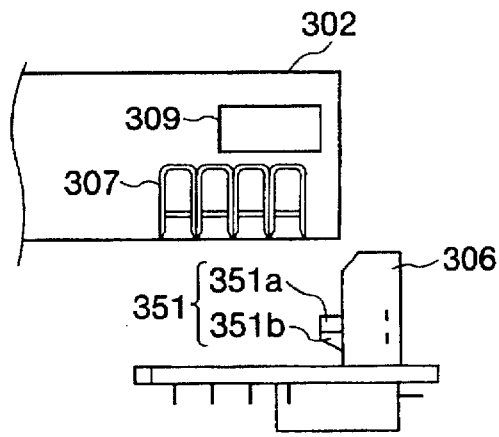
Figure 38A:
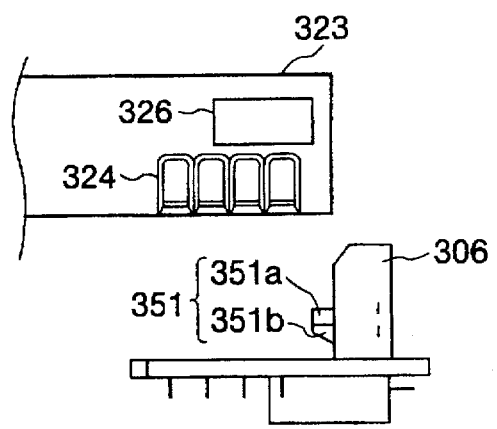
Figure 37B:
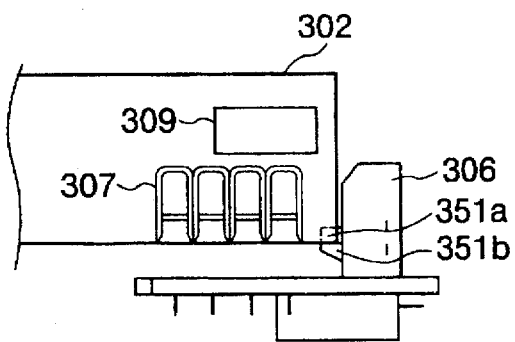
Figure 38B:
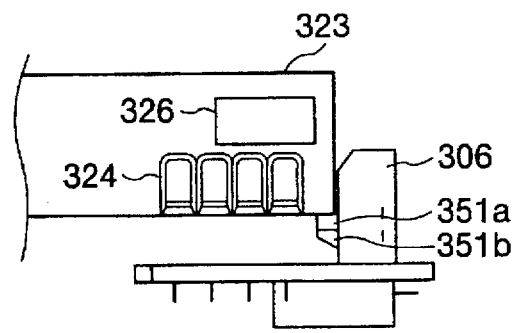
Figure 37C:
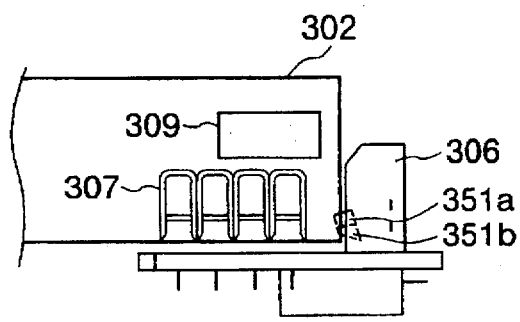
Figure 38C:
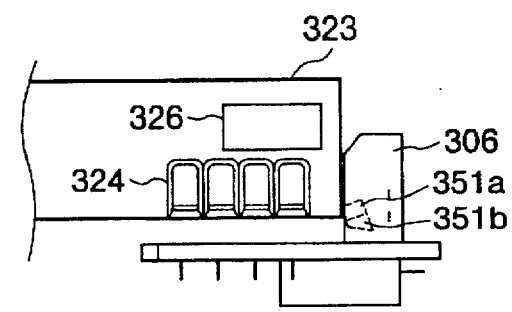
Figure 39:
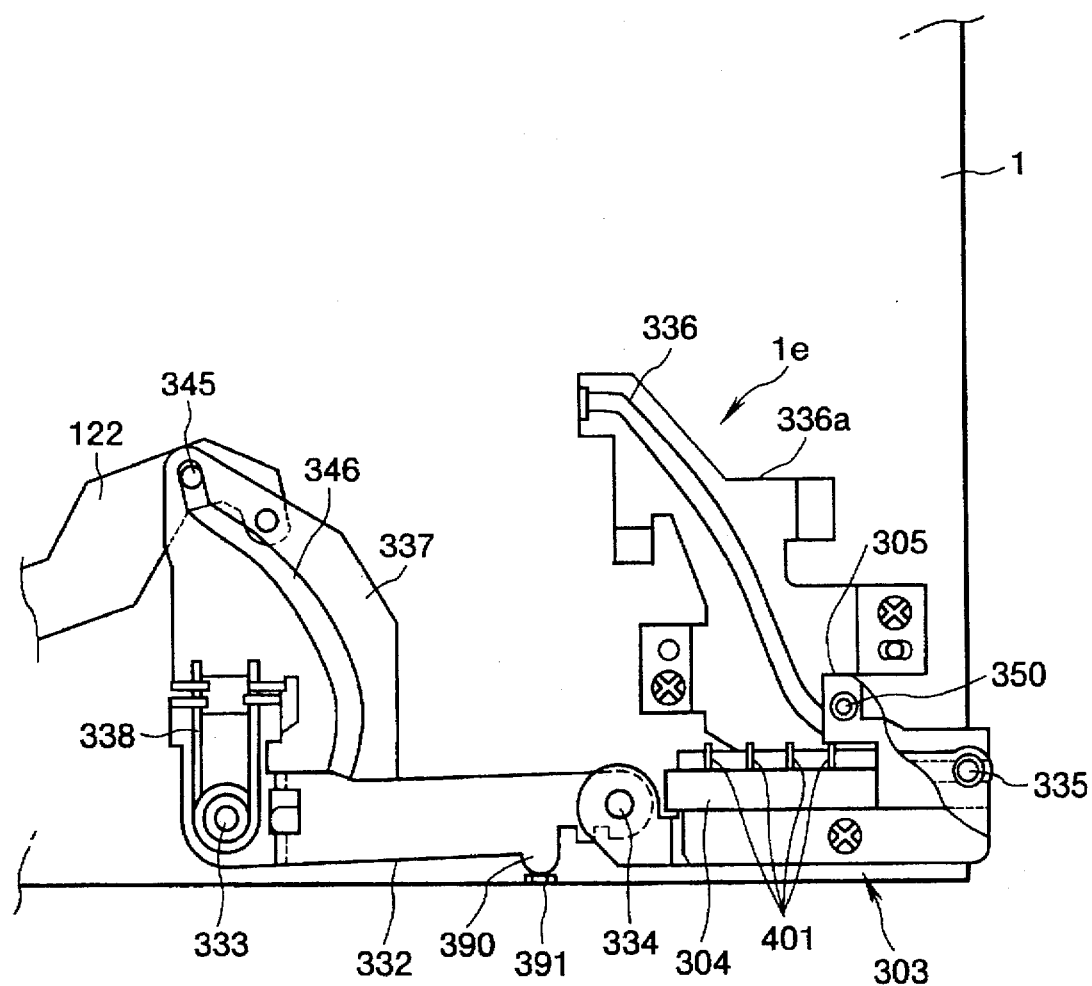
Figure 40:
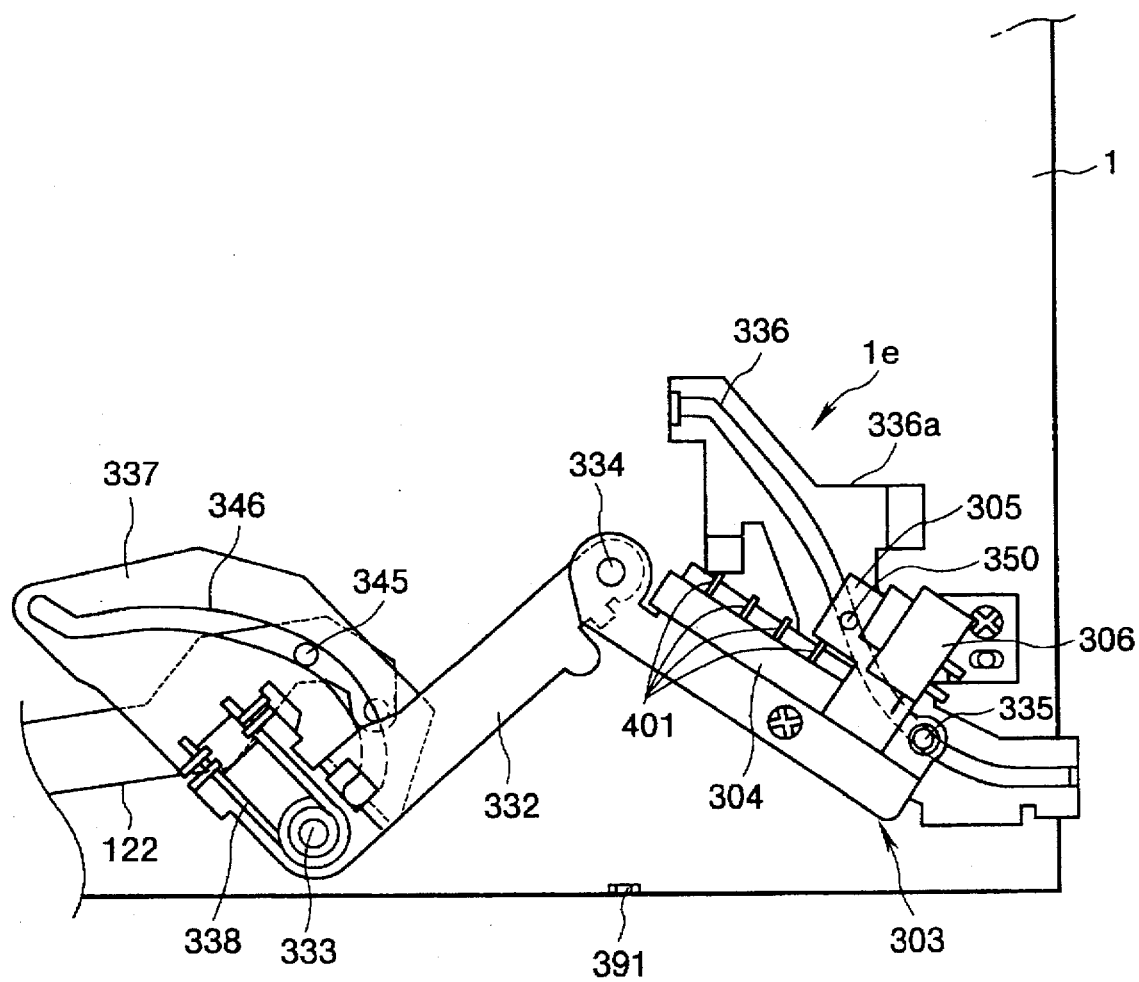
Figure 41:
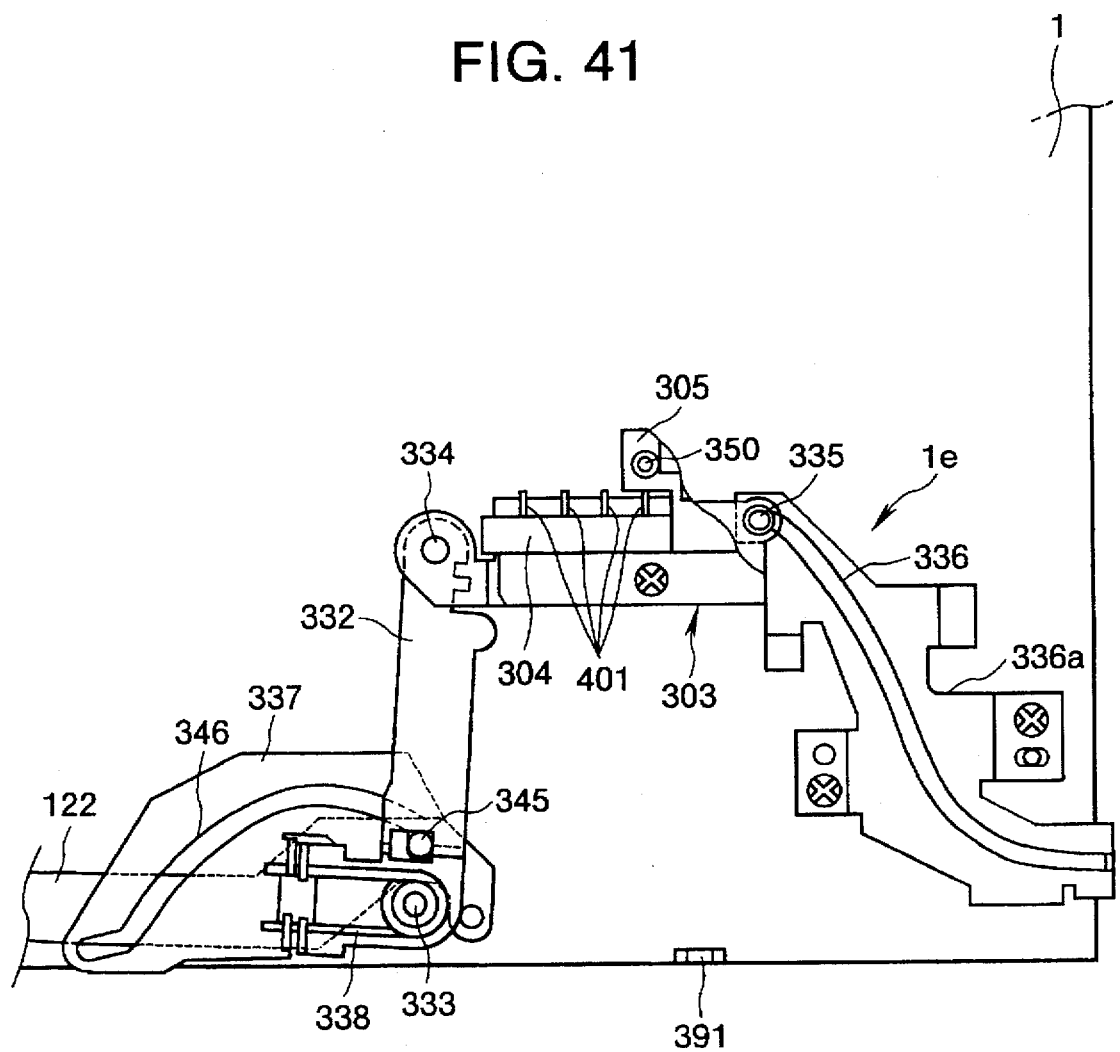
Figure 42:
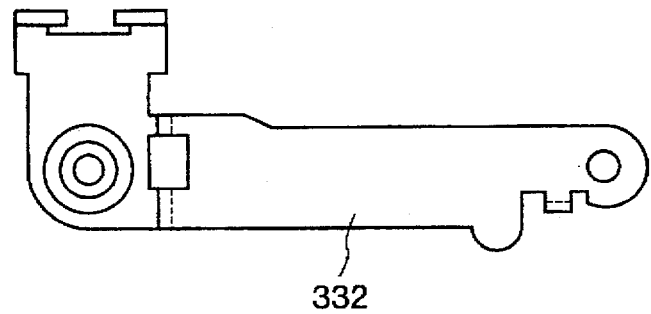
Figure 43:
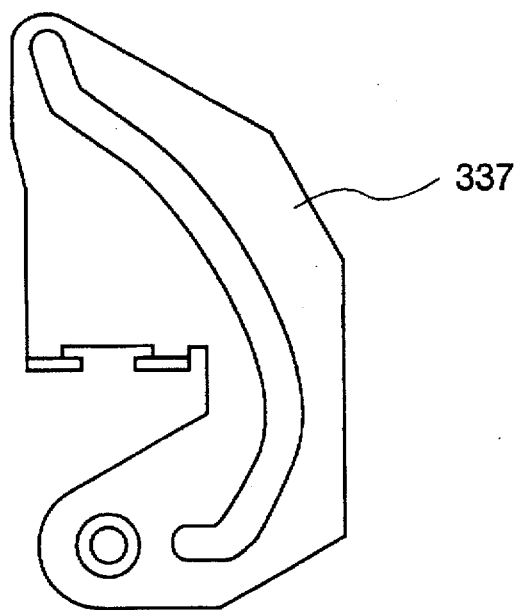
Figure 44:
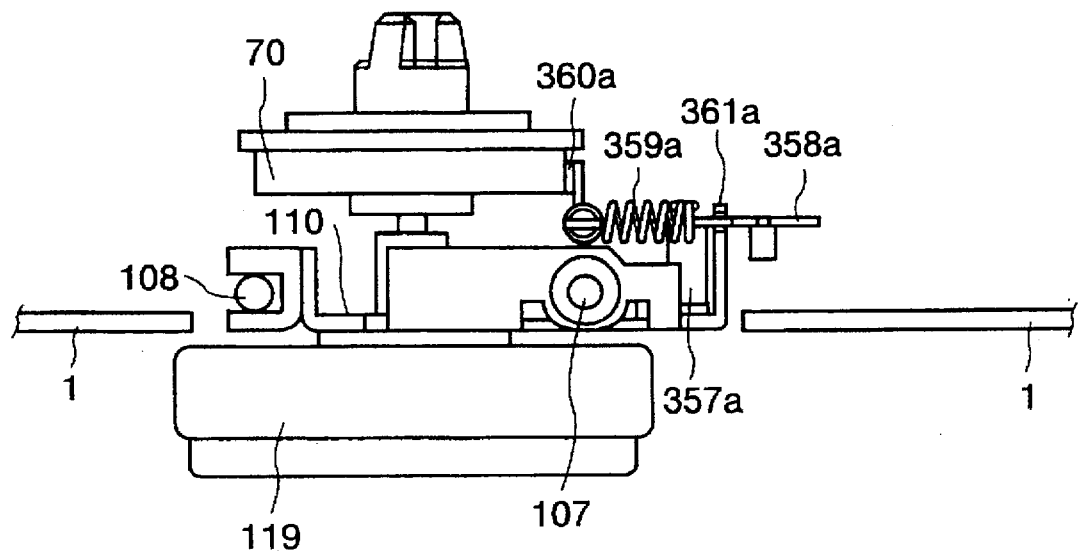
Figure 45:
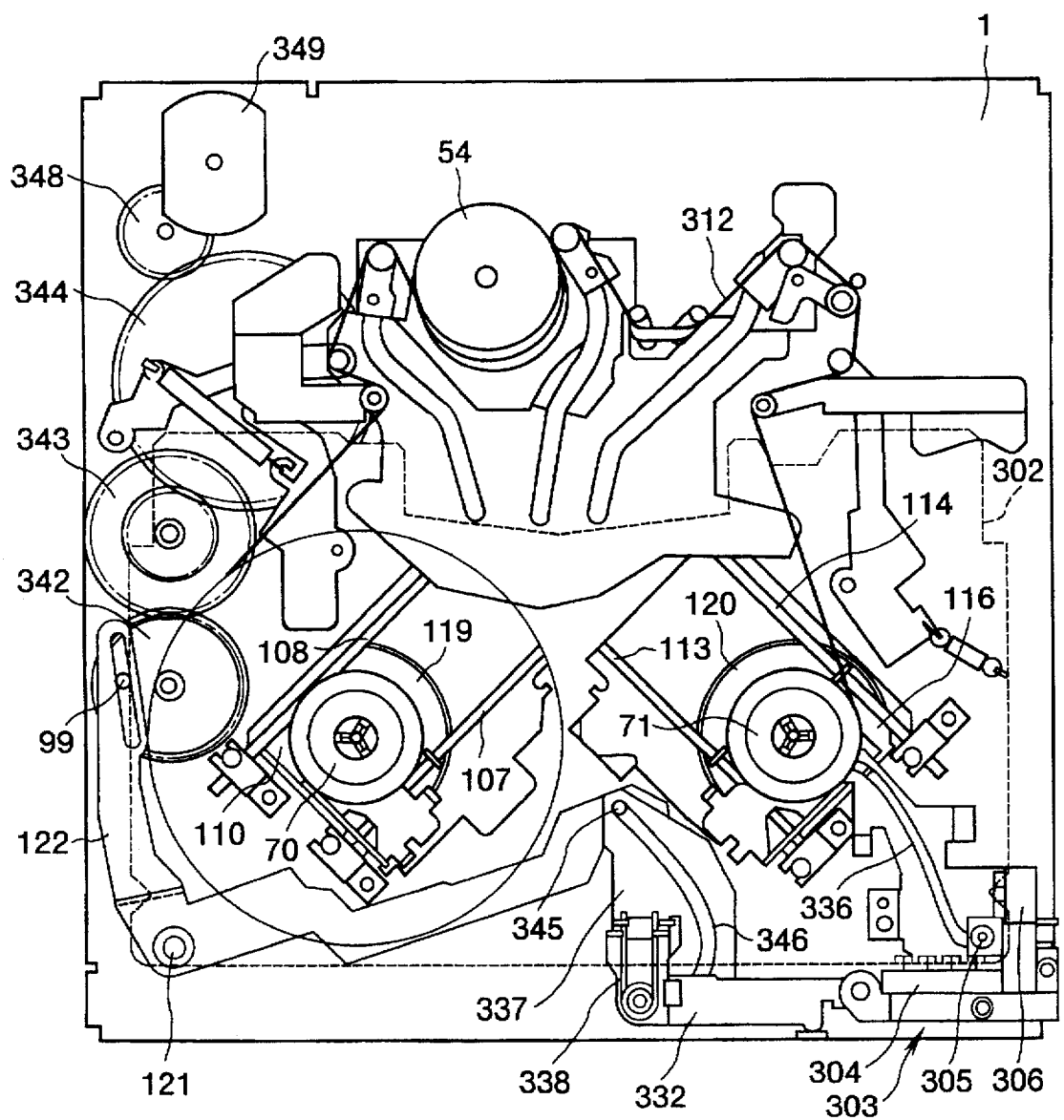
Figure 46:
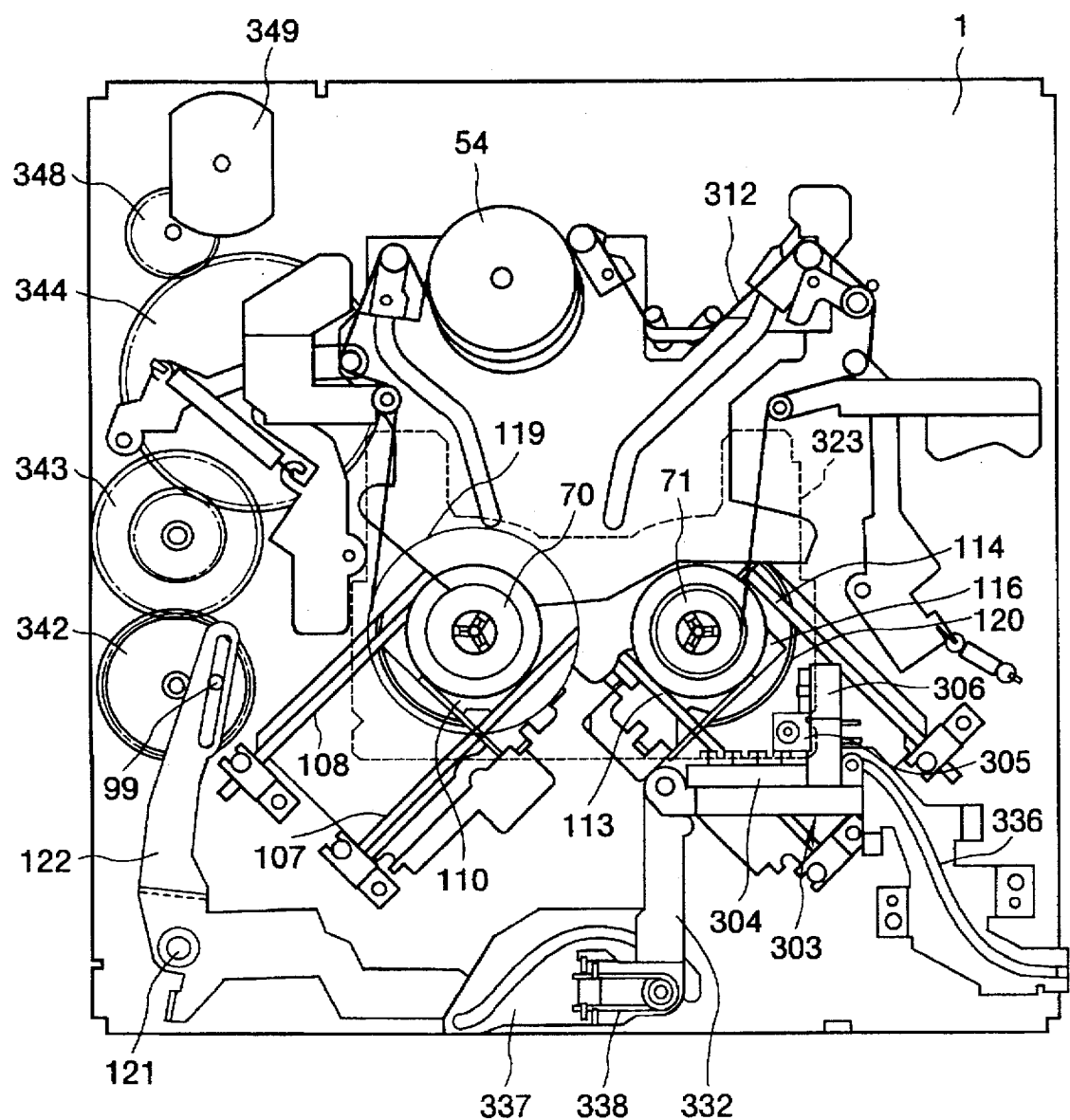

FIG. 7A is a side view showing an intermittent drive mechanism 82 and one-way transmission mechanism 90 forming a part of the reel stand displacing mechanism 1b of FIG. 5 and FIG. 6;

FIG. 7B is a plan view of the intermittent drive mechanism 82 and the one-way transmission mechanism 90 when FIG. 7A is viewed from the right side;

FIG. 8 is an exploded perspective view of the component elements of a one-way transmission mechanism 90 forming a part of the intermittent drive mechanism 1b of FIGS. 7A and 7B;

FIGS. 9A–9C are diagrams showing the action of the rotating member on the supply side forming a part or the reel stand displacement mechanism 1b of FIG. 5 and FIG. 6;

FIG. 10 is a diagram showing the rotating member on the take-up side forming a part of the reel stand displacement mechanism 1b of FIG. 5 and FIG. 6;

FIG. 11A shows the state of the drive lever 122 and the turntable 98 when the supply reel stand and the take-up reel stand are in the first position for the normal-sized cassette;

FIG. 11B shows the state of the drive lever 122 and the turntable 98 when the supply reel stand and the take-up reel stand are between the first position and the second position;

FIG. 11C shows the state of the drive lever 122 and the turntable 98 when the supply reel stand and the take-up reel stand are at the second position for the small-sized cassette;

FIG. 12 shows the output of the detecting switches 103 and 125 of the first embodiment;

FIG. 13 shows the relation between the rotation angle of the drive lever 122 and the rotation angle of the turntable 98;

FIG. 14 is a plan view showing the construction of a reel stand brake mechanism 1c of a magnetic recording/reproducing apparatus according to a second embodiment of this invention, when a normal-sized cassette is inserted;

FIG. 15 is a plan view showing the construction of a reel stand brake mechanism 1c of a magnetic recording/reproducing apparatus according to a second embodiment of this invention, when a small-sized cassette is inserted;

FIG. 16 is an enlarged side view of the essential features of a reel stand brake mechanism 1c of the second embodiment;

FIG. 17 is a diagram of the essential features of the reel stand brake mechanism 1c of the second embodiment;

FIG. 18 to FIG. 20 are diagrams showing the action of the reel stand brake mechanism 1c of the second embodiment when the reel stand bases are set in a first position for the normal-sized cassette;

FIG. 21 to FIG. 23 arc diagrams showing the action of the reel stand brake mechanism 1c of the second embodiment when the reel stand bases are set in a second position for the small-sized cassette;

FIG. 24 is a diagram showing a reel stand brake mechanism 1d according to a third embodiment of this invention, when the reel stand bases are set in a first position for the normal-sized cassette;

FIG. 25 is a diagram showing a reel stand brake mechanism 1d according to the third embodiment, when the reel stand bases are set in a second position for the small-sized cassette;

FIG. 26 is an enlarge side view showing the essential parts of the reel stand brake mechanism 1d of the third embodiment;

FIG. 27 is a schematic plan view of a magnetic recording/reproducing apparatus with a normal-sized cassette fitted according to the fourth embodiment of this invention;

FIG. 28 is a plan view of the magnetic recording/reproducing apparatus with a small-sized cassette fitted according to the fourth embodiment;

FIG. 29A is a perspective view of the normal-sized cassette of FIG. 27;

FIG. 29B is a plan view of the essential features of FIG. 29A;

FIG. 30A is a perspective view of the small-sized cassette of FIG. 28;

FIG. 30B is a plan view of the essential features or FIG. 30A;

FIG. 31 is a plan view showing the switch block displacing mechanism 1e provided in the apparatus of the fourth embodiment, when the normal-sized cassette is inserted;

FIG. 32 is a plan view showing the switch block displacing mechanism 1e provided in the apparatus of the fourth embodiment, when the small-sized cassette is inserted;

FIG. 33 is an enlarged perspective view of the switch block 303 provided in the apparatus of the fourth embodiment;

FIGS. 34A and 34B is a side view showing an action of the switch block 303 provided in the apparatus of the fourth embodiment, when the normal-sized cassette is inserted;

FIG. 35 is an enlarged plane view showing the switch block 303 provided in the apparatus of the fourth embodiment, when the normal-sized cassette is inserted;

FIG. 36 is an enlarged plan view showing the switch block 303 provided in the apparatus of the fourth embodiment, when the small-sized cassette is inserted;

FIGS. 37A–37C show an action of the cassette switch 351 of the switch block provided in the apparatus of the fourth embodiment, when the normal-sized cassette is inserted;

FIGS. 38A–38C show an action of the cassette switch 351 of the switch block provided in the apparatus of the fourth embodiment, when the small-sized cassette is inserted;

FIG. 39 to FIG. 41 show an action of the switch block displacing mechanism 1e provided in the apparatus of the fourth embodiment;

FIG. 42 is an enlarged plan view of the rotating lever of the switch block displacing mechanism 1e provided in the apparatus of the fourth embodiment;

FIG. 43 is an enlarged plan view of the rotating plate of the switch block displacing mechanism 1e provided in the apparatus of the fourth embodiment;

FIG. 44 is an enlarged side view showing the essential parts of the reel stand brake mechanism of the fourth embodiment;

FIG. 45 is a plan view showing the state of the fourth embodiment when the normal-sized cassette is inserted; and FIG. 46 is a plan view showing the state of the fourth embodiment when the small-sized cassette is inserted.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIRST EMBODIMENT

Figure 1:
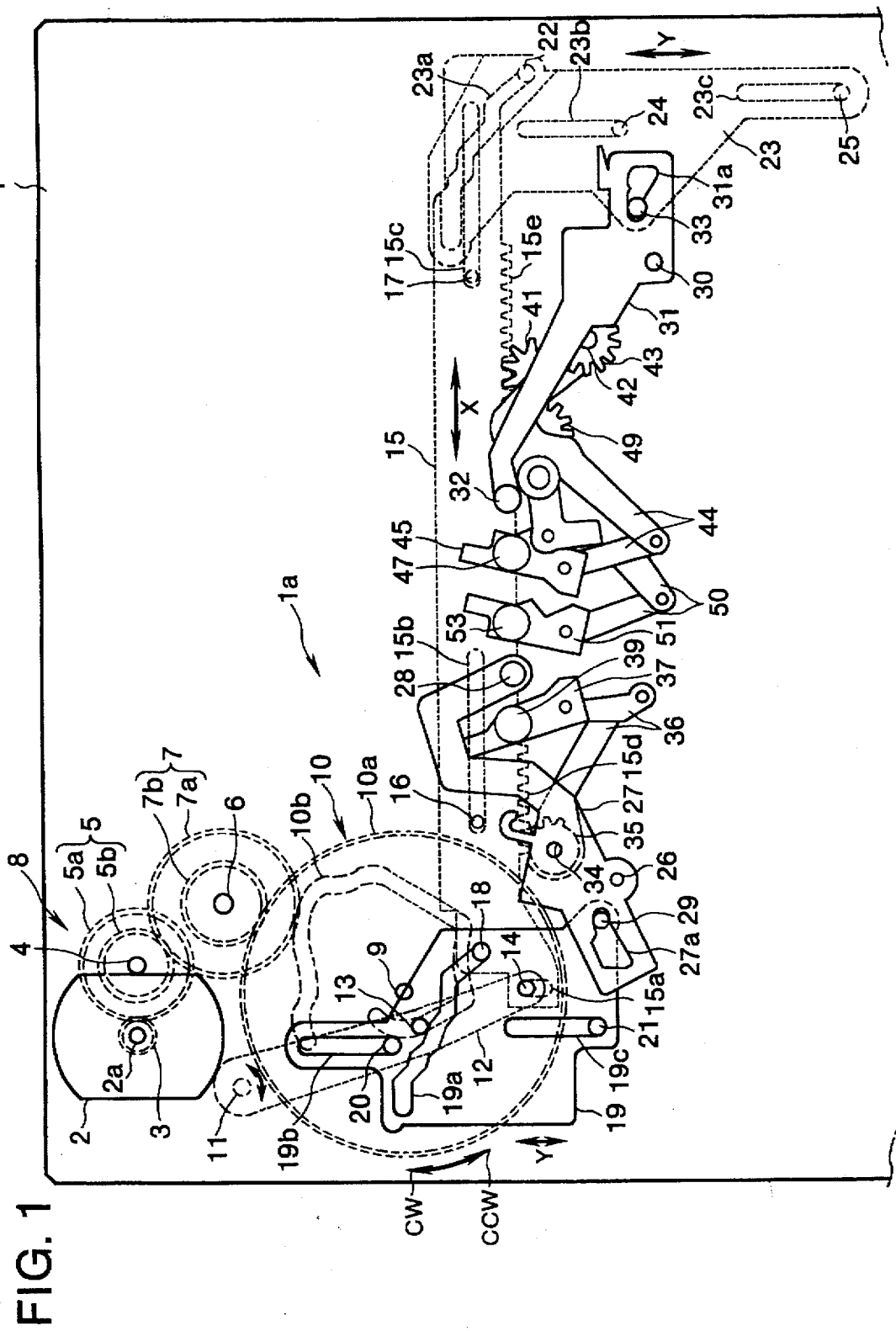
FIG. 1 is a plan view showing an tape unloaded state of a tape loading mechanism 1a of a magnetic recording/reproducing apparatus according to a first embodiment of this invention.
Figure 2:
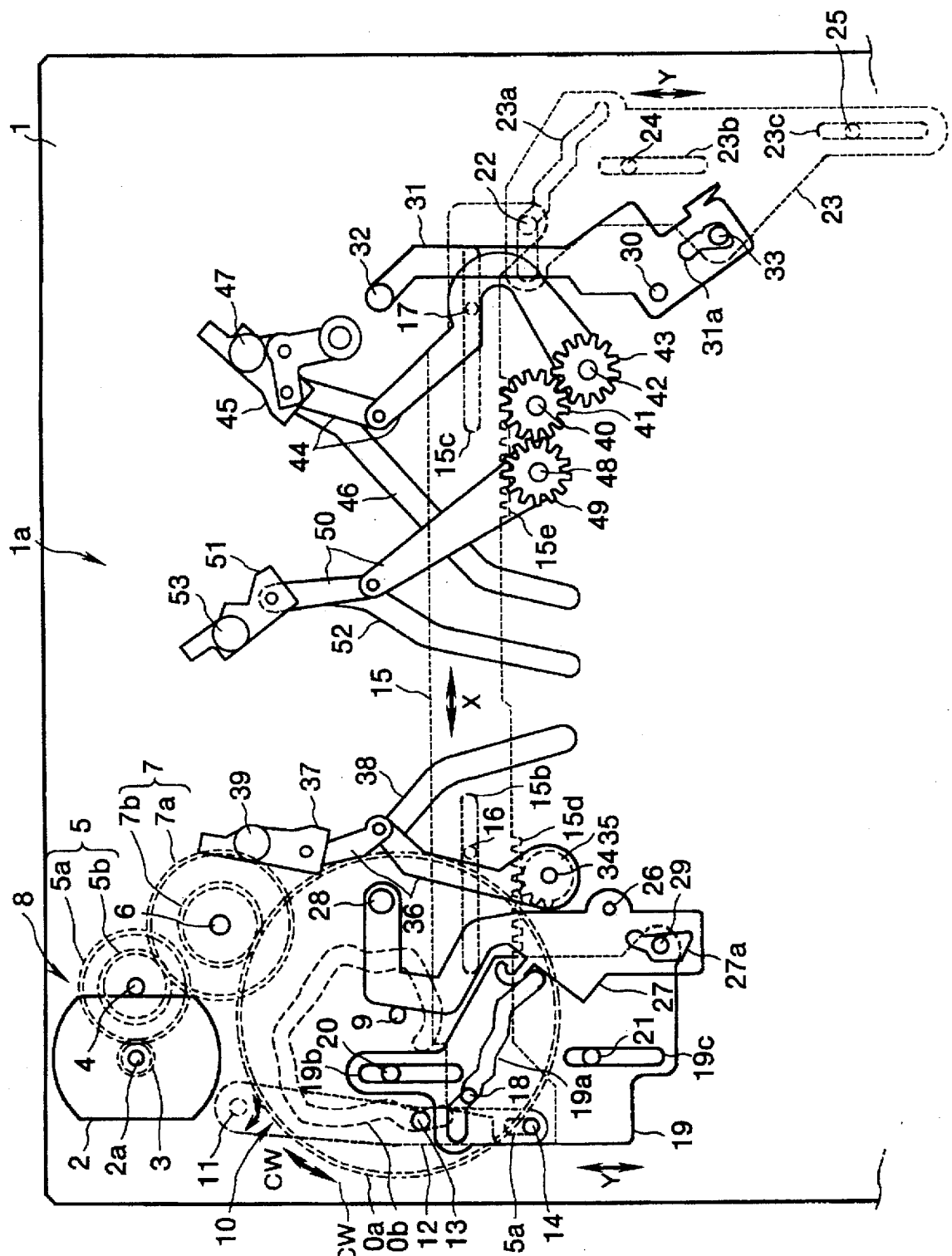
FIG. 2 is a plan view showing a tape loaded state of the tape loading mechanism 1a of the magnetic recording/reproducing apparatus according to the first embodiment.
Figure 3:
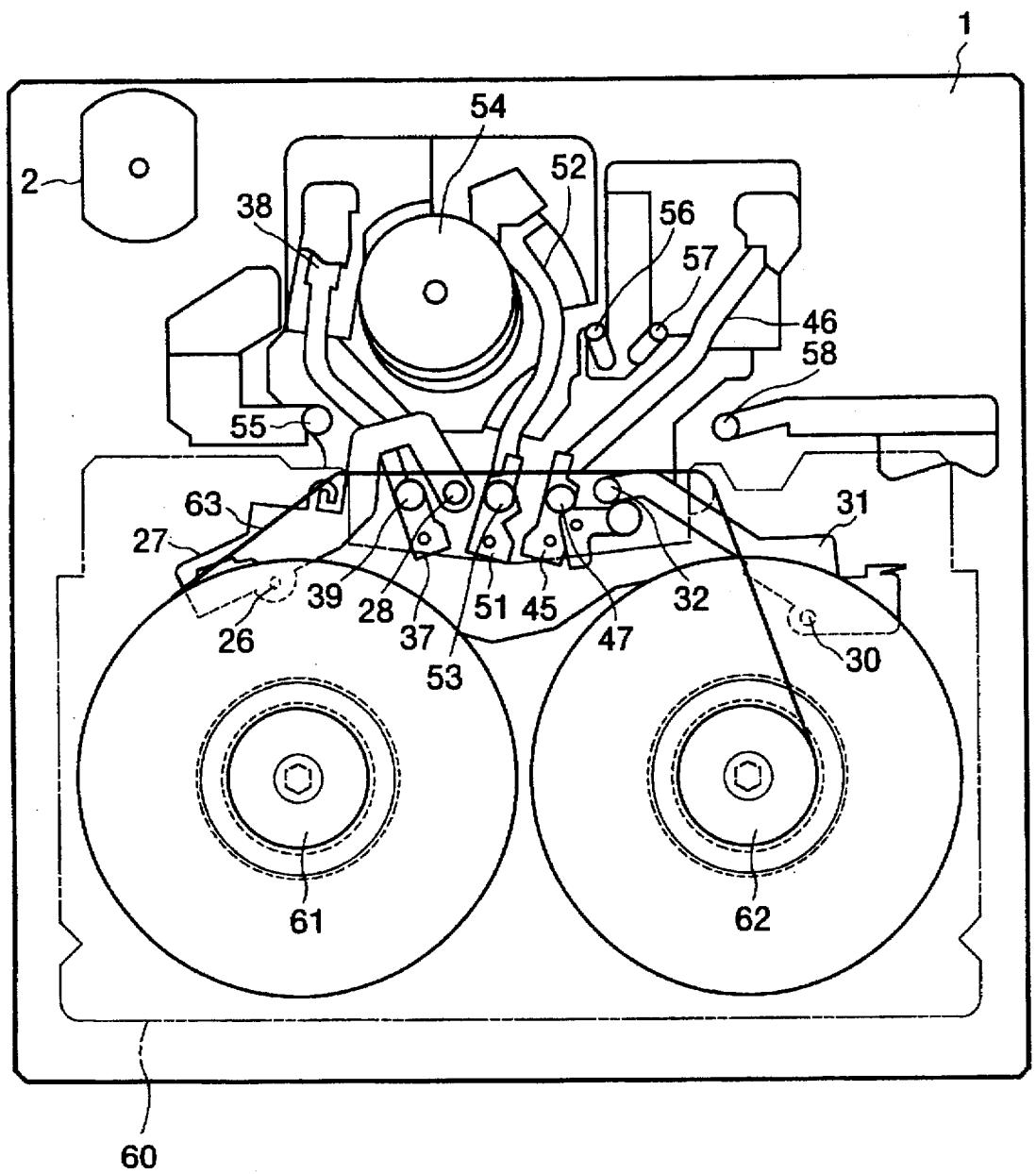
FIG. 3 is a plan view showing the magnetic tape in the tape unloaded state of FIG. 1.
Figure 4:
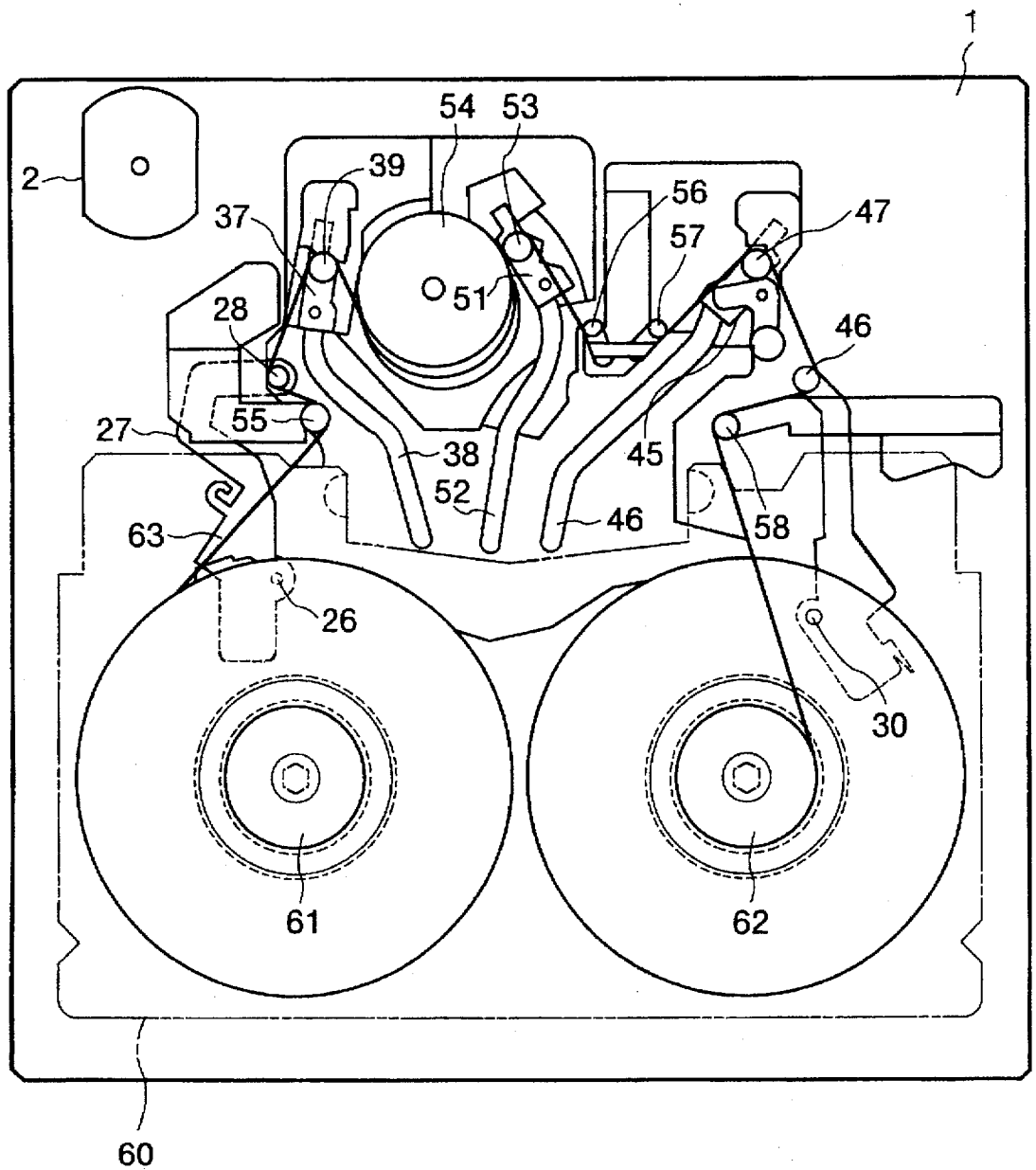
FIG. 4 is a plan view showing the magnetic tape in the tape loaded state of FIG. 2.

FIG. 1 is a plan view showing the tape unloaded state of a tape loading mechanism 1a of a magnetic recording/reproducing apparatus according to a first embodiment of this invention, and FIG. 2 is a plan view showing the tape loaded state of the tape loading mechanism 1a. FIG. 3 is a plan view showing the state of the magnetic tape in the tape unloaded state of FIG. 1, and FIG. 4 is a plan view showing the state of the magnetic tape in the tape loaded state of FIG. 2.

Referring to the figures, 1 is a deck base (or a base plate or a chassis), 2 is a loading motor that functions as a drive source and is installed on the deck base 1, and 3 is a pinion gear which is pressed into an output shaft 2a of the loading motor 2. Further, 4 is a shaft implanted in the underside of the deck base 1, and 5 is a gear which is supported on the shaft 4 such that it is free to rotate. The gear 5 comprises a large diameter portion 5a which engages with the pinion gear 3 and a small diameter portion 5b. Further, 6 is a shaft implanted on the underside of the deck base 1, and 7 is a gear which is supported on the shaft 6 such that it is free to rotate. The gear 7 comprises a large diameter portion 7a which engages with the small diameter portion 5b of the gear 5, and a small diameter portion 7b. As shown in FIG. 1 and FIG. 2, the pinion gear 3, the gear 5 and the gear 7 form a gear chain 8.

9 is a shaft implanted on the underside of the deck base 1, and 10 is a cam gear supported on the shaft 9 such that it is free to rotate. Teeth 10a are provided on the outer circumference of the cam gear 10 and engage with the teeth of the small diameter portion 7b of the gear 7. The cam gear 10 has a cam groove 10b. The rotation angle of the cam gear 10 is detected by a rotation angle detector (not shown in the figure).

11 is a shaft implanted on the underside of the deck base 1, and 12 is a oscillating lever supported on the shaft 11 such that it is free to turn. A follower pin 13 is implanted in the oscillating lever 12 and engages in the cam groove 10b of the cam gear 10. When the cam gear 10 rotates, the oscillating lever 12 swings about the shaft 11 as center due to the engaging of the cam groove 10b and the follower pin 13, as shown in FIG. 1 and FIG. 2. An engaging pin 14 is implanted at the end of the oscillating lever 12. The engaging pin 14 engages with an elongated hole 15a oriented in the direction Y provided in a sliding plate 15. The sliding plate 15 also has elongated holes 15b and 15c, which engage respectively with pins 16 and 17 fixed in the deck base 1. The sliding plate 15 can therefore slide along a straight line (in the direction X) joining the pins 16 and 17. When the cam gear 10 rotates and the oscillating lever 12 swings, the sliding plate 15 slides in the direction X due to the engaging of the pin 14 at the end of the oscillating lever 12 and the elongated hole 15a, as shown in FIG. 1 and FIG. 2.

18 is a drive pin implanted in the sliding plate 15, 19 is a plate cam supported such that it can slide in the direction Y, and 19a is a cam groove which engages with a drive pin 18. 19b and 19c are long cam grooves which are formed in the plate cam 19 and extend in the direction Y. 20 and 21 are pins fixed in the deck base 1 which engage respectively with the cam grooves 19b and 19c. The plate cam 19 displaces in the direction Y when the sliding plate 15 moves in the direction X as shown in FIG. 1 and FIG. 2.

22 is a drive pin implanted in the sliding plate 15, 23 is a plate cam supported free to move in the direction Y, and 23a is a cam groove which engages with the drive pin 22. 23b and 23c are long cam grooves which are formed in the plate cam 23 and extend in the direction Y. 24 and 25 are pins fixed in the deck base 1. The pins 24 and 25 engage respectively with the cam grooves 23b and 23c. The plate cam 23 moves in the direction Y when the sliding plate 15 moves in the direction X as shown in FIG. 1 and FIG. 2.

26 is a shaft implanted in the deck base 1, 27 is an arm supported free to turn about the shaft 26 as center, 28 is a tape guide implanted at one end of the arm 27, and 27a is a cam groove formed in the arm 27. A drive pin 29 fixed in the plate cam 19 engages with the cam groove 27a. When the plate cam 19 moves in the direction Y, the arm 27 turns about the shaft 26 as center, as shown in FIG. 1 and FIG. 2.

30 is a shaft implanted in the deck base 1, 31 is an arm supported free to turn about the shaft 30, 32 is a tape guide provided at one end of the arm 31, and 31a is a cam groove formed in the arm 31. A drive pin 33 fixed in the plate cam 23 engages with the cam groove 31a. When the plate cam 23 moves in the direction Y, the arm 31 turns about the shaft 30 as center, as shown in FIG. 1 and FIG. 2.

15d is a rack gear formed in the sliding plate 15, 34 is a shaft implanted in the deck base 1, 35 is a pinion gear supported free to turn about the shaft 34 and engaging with the rack gear 15d. 36 is a toggle link which is supported free to turn on the shaft 34 and rotates together with the pinion gear 35. 37 is a slider which is moved along a guide groove 38 (not shown in FIG. 1) by the toggle link 36. 39 is a guide roller which is provided in the slider 37. When the sliding plate 15 moves in the direction X, the toggle link 36 turns about the shaft 34 as center, and the slider 37 moves along the guide groove 38.

15e is a rack gear formed in the sliding plate 15, 40 (not shown in FIG. 1) is a shaft implanted in the deck base 1, 41 is a pinion gear which is supported free to turn on the shaft 40 and engages with the rack gear 15e, 42 is a shaft implanted in the deck base 1, 43 is a pinion gear which is supported free to turn on the shaft 42 and engages with the pinion gear 41, 44 is a toggle link which turns together with the pinion gear 43, 45 is a slider which is displaced along a guide groove 46 (not shown in FIG. 1) by the toggle link 44, and 47 is a guide roller provided in the slider 45. When the sliding plate 15 moves in the direction X, the toggle link 44 turns about the shaft 42 as center, and the slider 45 moves along the guide groove 46 as shown in FIG. 1 and FIG. 2.

48 (not shown in FIG. 1) is a shaft implanted in the deck base 1, 49 is a pinion gear which is supported free to turn about the shaft 48 and engages with the pinion gear 41, 50 is a toggle link which rotates together with the pinion gear 49, 51 is a slider that is moved along a guide groove 52 (not shown in FIG. 1) by the toggle link 50, and 53 is a guide roller which is provided in the slider 51. When the sliding plate 15 moves in the direction X, the toggle link 50 turns about the shaft 48 as center, and the slider 51 moves along the guide groove 52 as shown in FIG. 1 and FIG. 2. The sliders 37, 47, 51 and the guide rollers 39, 45, 53 form a mechanism for withdrawing a magnetic tape 63 wound on a supply reel 61 or a take-up reel 62 of a cassette (for example, a normal-sized cassette 60 shown in FIG. 3 and FIG. 4).

In FIG. 3 and FIG. 4, 54 is a rotating head drum wound by the magnetic tape 63, and 55–58 are tape guides for guiding the magnetic tape 63.

FIG. 5 and FIG. 6 are structural diagrams showing a reel stand displacement mechanism 1b of the magnetic recording/reproducing apparatus according to the first embodiment. In FIG. 5, the reel stands 70 and 71 are set in a first position (i.e., normal-sized cassette position) for inserting a normal-sized cassette 60, while in FIG. 6, the reel stands 70 and 71 are set in a second position (i.e., small-sized cassette position) for inserting a small-sized cassette 64. FIG. 7A is a side view showing a part of the reel stand displacement mechanism 1b including an intermittent drive mechanism 82 and one-way transmission mechanism 90, and FIG. 7B is a plan view when FIG. 7A is viewed from the right side and the deck base 1 is omitted. FIG. 8 is an exploded perspective view of the component elements of the one-way transmission mechanism 90.

In the figures, 80 is a shaft implanted on the underside of the deck base 1, and 81 is a gear which is free to rotate about the shaft 80 as center. The gear 81 is so formed as to engage intermittently with the cam gear 10, and the cam gear 10 and the gear 81 forms an intermittent transmission mechanism 82. In FIG. 7A and FIG. 7B, 83a is a part of the outer circumference of the cam gear to which has no teeth, 83b is a part of the outer circumference of the cam gear 10 which has teeth, and 84 is a peripheral rib of effectively the same diameter as that of an addendum circle of the cam gear 10. 85 is a missing tooth part with no tooth provided on the gear 81, and 86 is a tooth of narrower face width adjacent to the missing tooth part 85. 87 is a gear which is supported free to turn about the shaft 80 as center, and it turns together with the gear 81.

In FIG. 7A, FIG. 7B and FIG. 8, 91 is a support member that is fixed to the deck base 1 and forms a part of the one-way transmission mechanism 90, 92 is a shaft implanted in the support member 91, and 93 is a gear which is supported free to turn on the shaft 92 and engages with the gear 87. 95a and 95b are claws supported free to swing respectively about axial bosses 94a and 94b as center. 96a and 96b are torsion coil springs that push claws 95a and 95b respectively towards the shaft 92. 98 is a turntable which rotates about the shaft 92 as center, and comprises a small diameter part 97 having protruding step parts 97a and 97b. The protruding step parts 97a and 97b engage in one direction with the claws 95a and 95b. The claws 95a and 95b, the torsion coil springs 96a and 96b as pushing members, and the protruding step parts 97a and 97b form a ratchet mechanism. When the gear 93 rotates in a counter-clockwise direction, the ratchet mechanism rotates the turntable 98 in a counterclockwise direction. When the gear 93 rotates in a clockwise direction, the ratchet mechanism does not rotate the turntable 98. The ratchet mechanism therefore forms a one-way transmission mechanism 90.

98a is a first concave part formed on the outer circumferential surface of the turntable 98, 98b is a second concave part provided in a position facing the first concave part 98a with respect to the shaft 92 as center, and 99 is a drive pin implanted in the upper surface of turntable 98. 100 is a shaft implanted in the support member 91, and 101 is a lock arm supported free to turn about the shaft 100 which functions as a means of locking the turntable 98. The lock arm 101 may be in contact with the outer circumference of the turntable 98, or may comprise a projection 101a for engaging with the concave parts 98a or 98b. 102 is a torsion coil spring that pushes the projection 101a on the lock arm 101 toward the outer circumferential surface of the turntable 98. 103 is a detecting switch fixed to the support member 91 so that the detecting switch 103 switches ON or OFF in accordance with the rotation of the lock arm 101.

In FIG. 5 and FIG. 6, 70 is a supply reel stand, 107 and 108 are guide rails on the tape supply side, and 109 are fixing members which fix both ends of the guide rails 107 and 108 to the deck base 1 (in the figures, some of the fixing members 109 are omitted). 110 is a supply reel stand base on which the supply reel stand 70 is mounted. The supply reel stand base 110 is supported free to slide along the guide rails 107 and 108. 111 and 112 are projections provided on the deck base 1 in such positions that the projections 111 and 112 come into contact with the reel stand base 110.

71 is a take-up reel stand, 113 and 114 are guide rails on the tape take-up side, and 115 are fixing members which fix both ends of the guide rails 113 and 114 to the deck base 1 (in the figures, some of the fixing members 115 are omitted). 116 is a take-up reel stand base on which the take-up reel stand 71 is mounted. The take-up reel stand base 116 is supported free to slide along the guide rails 113 and 114. 117 and 118 are projections provided on the deck base 1 in such positions that the projections 117 and 118 come into contact with the reel stand base 116. 119 and 120 are reel motors which respectively rotate the supply reel stand 70 and the take-up reel stand 71.

In FIG. 5 and FIG. 6, 121 is a shaft implanted on the deck base 1, and 122 is a drive lever supported free to turn about the shaft 121 as center. An elongated hole 122a that engages with the drive pin 99 implanted in the turntable 98 is provided at one end of the drive lever 122. 122b is a projection provided in the drive lever 122, and 125 is a detecting switch fixed in the deck base 1. The detecting switch 125 is switched ON or OFF when the projection 122b of the arm 122 comes into contact with or moves away from it.

126 and 127 are drive pins implanted in the drive lever 122. 128 is a shaft implanted in the deck base 1, 129 is a rotating arm on the supply side supported free to rotate on the shaft 128, 130 is a long groove provided in the rotating arm 129 that engages with the drive pin 126, 131a is an arm supported on the shaft 128, and 131b is an arm attached so that one end is supported free to turn about a shaft 131c provided in the arm 131a. The other end of the arm 131b is connected to the supply reel stand base 110 so that it is free to turn about a shaft 110a fixed on the supply reel stand base 110. The arms 131a and 131b and the shaft 131c form a toggle link mechanism 131 on the supply side.

FIGS. 9A–9C are diagrams showing the action of the rotating arm 129 on the supply side. In the figures, 132 is a torsion coil spring, two arms of the torsion coil spring 132 being respectively attached to hooks 133 provided at two positions on the rotating arm 129 and hooks 134 provided at two positions on the arm 131a. The torsion coil spring 132, hooks 133 and hooks 134 form a press-in mechanism on the supply side.

FIG. 10 are diagrams showing the action of the rotating arm 136 on the take-up side. Referring to FIG. 5, FIG. 6 and FIG. 10, 135 is a shaft implanted in the deck base 1, 136 is a rotating arm on the take-up side free to turn about the shaft 135, 137 is a long groove provided in the rotating arm 136 so as to engage with the drive pin 127, 138a is an arm supported on the shaft 135, and 138b is an arm attached so that one end is free to turn about a shaft 138c provided in the arm 138a. The other end of the arm 138b is connected to the reel stand base 116 so that it is free to turn about a shaft 116a fixed to the take-up reel stand base 116. The arms 138a and 138b and a shaft 138c form a toggle link mechanism 138 on the take-up side. 139 is a torsion (oil spring, the two arms of the torsion coil spring 139 being respectively attached simultaneously to hooks 140 provided at two positions on the rotating arm 136 and hooks 141 provided at two positions on the arm 138a. The torsion coil spring 139, hooks 140 and hooks 141 form a press-in mechanism on the take-up side.

Next, the action of magnetic recording/reproducing apparatus according to the first embodiment will be described. First, in the tape unloaded state shown in FIG. 1, FIG. 3 and FIG. 7B, the loading motor 2 is started and the cam gear 10 is rotated in a clockwise (CW) direction. When this occurs, the gear 81 (shown in FIG. 5) is not rotated by the intermittent transmission mechanism 82, drive force is not transmitted to the reel stand drive mechanism, and the supply reel stand 70 and the take-up reel stand 71 are held in the first position shown in FIG. 5.

When the oscillating lever 12 turns in a clockwise direction about the shaft 11 along the cam groove 10b on the cam gear 10, the sliding plate 15 is made to slide in the direction X from right to left of the FIG. 1 by the drive pin 14. Driven by the sliding action of the sliding plate 15, the plate cams 19 and 23 are made to slide from the top to the bottom of the FIG. 1 in the Y direction due to the drive pins 18 and 22, and then the drive pins 29 and 33 implanted in the plate cams 19 and 23 come into contact with the ends of the grooves 27a and 31a of the arms 27 and 31 respectively so that the arm 27 rotates in an counterclockwise direction and the arm 28 rotates in a clockwise direction. The tape guides 28 and 32 then perform a tape loading action and then the magnetic tape 63 is withdrawn from the cassette 60.

Further, due to the sliding action from right to left in FIG. 1 of the sliding plate 15, the rack gears 15d and 15e formed in the sliding plate 15 rotate the pinion gears 35 and 41 in an counterclockwise direction, and the toggle link 36 is also rotated in a counterclockwise direction. When the pinion gear 41 rotates in a counterclockwise direction, the gears 49 and 43 that engage with the pinion gear 41 rotate in a clockwise direction, and the toggle links 50 and 44 are rotated in a clockwise direction. These toggle links 36, 50 and 44 move the sliders 37, 51 and 45 along the guide grooves 38, 52 and 46 as shown in FIG. 2 and FIG. 4 so as to perform the tape loading action, wherein the magnetic tape 63 is withdrawn from the cassette 60.

Next, the action of moving the supply reel stand 70 and the take-up reel stand 71 from the first position shown in FIG. 5 to the second position shown in FIG. 6, will be described. From the state shown in FIG. 5 and FIG. 7B, the loading motor 2 is started so that the cam gear 10 rotates in a counterclockwise direction. At this time, the follower pin 13 of the oscillating lever 12 engages with a part 10c of the cam groove 10b having a shape of identical radius, so even when the cam gear 10 rotates counterclockwise, the oscillating lever 12 does not turn, and the components for withdrawing the magnetic tape are held in the tape unloaded state shown in FIG. 1.

The counterclockwise rotation of the cam gear 10 from the state shown in FIG. 5 and FIG. 7B is transmitted to the gear 93 via the intermittent drive mechanism 82 comprising the gear 81 and the gear part 83 of the cam gear 10, and via the gear 87, so that the gear 93 rotates in a counterclockwise (CCW) direction. As shown in FIGS. 7A and 7B and FIG. 8, when the gear 93 rotates in a counterclockwise direction, the claws 95a and 95b of the one-way transmission mechanism 90 engage with the step parts 97a and 97b of the small diameter part 97, and the turntable 98 is rotated counterclockwise by the gear 93.

The drive pin 99 implanted in the turntable 98 rotates in a counterclockwise direction together with the turntable 98, and the drive lever 122 is made to swing in a clockwise direction about the shaft 121 via the elongated hole 122a as shown in FIGS. 11A–11C. The drive pin 126 installed in the drive lever 122 causes the rotating arm 129 on the supply side to rotate clockwise via the long groove 130, and the drive pin 127 causes the rotating arm 136 on the take-up side to rotate counterclockwise via the long groove 137 in the same way.

The rotating arm 129 on the supply side rotates the arm 131a of the toggle link mechanism 131 on the supply side in a clockwise direction via the torsion coil spring 132 and the hooks 133 and 134, and the toggle link mechanism 131 slides the supply reel stand base 110 obliquely toward the upper right along the guide rails 107 and 108. Similarly, the rotating arm 136 on the take-up side rotates the arm 138a of the toggle link mechanism 138 on the take-up side in a counterclockwise direction via the torsion coil spring 139 and the hooks 140 and 141, and the toggle link mechanism 138 slides the take-up reel stand base 116 obliquely toward the upper left along the guide rails 113 and 114.

After the drive lever 122 has rotated a predetermined angle, the supply reel stand base 110 comes into contact with the projection 112 installed in the deck base 1 and stops moving. In the toggle link mechanism 131 on the supply side, when the supply reel stand base 110 stops, the rotation of the arm 131a stops, and the drive lever 122 rotates a little further so as to cause the rotating arm 129 to perform an overstroke relative to the rotation angle of the arm 131a. The torsion coil spring 132 is twisted by the relative angular displacement of the hook 133 of the rotating arm 129 and the hook 134 of the arm 131a as shown in FIG. 9C, and the supply reel stand base 110 is pressed against the projection 112 by the toggle link mechanism 131. Likewise, the rotating arm 136 on the take-up side performs an overstroke, the torsion coil spring 139 twists, the take-up reel stand base 116 is pressed against the projection 117 in the deck base 1 by the toggle link mechanism 138, and the supply reel stand 70 and the take-up reel stand 71 are fixed in the second position as shown in FIG. 6.

Next, the angular detection performed to stop the rotation of the turntable 98 will be described. FIG. 11A shows the state of the rotating arm 122 and turntable 98 when the supply reel stand 70 and the take-up reel stand 71 are at the first position. The lock arm 101 engages with the first concave part 98a of the turntable 98, the detecting contact 103a of the detecting switch 103 does not come into contact with the lock arm 101, and the detecting switch 103 is OFF. The detecting switch 125 (shown in FIG. 5) also does not come into contact with the projection 122b of the drive lever 122 and is OFF.

When the turntable 98 rotates in a counterclockwise direction from the state of FIG. 11A, the situation is then as shown in FIG. 11B. The lock arm 101 is pushed out toward the outer circumference of the turntable 98 from the first concave part 98a, and the lock arm 101 rotates through a predetermined angle to push the contact of the detecting switch 103 so that the switch is ON.

When the turntable 98 rotates further in a counterclockwise and the lock arm 101 reaches a position where it engages with a second concave part 98b as shown in FIG. 11C, the lock arm 101 is rotated toward the second concave part 98b by the torsion coil spring 102, the detecting contact 103a of the detecting switch 103 does not come into contact with the lock arm 101, and the detecting switch 103 is OFF. The detecting switch 125 (shown in FIG. 6) also does not come into contact with the projection 122b of the drive lever 122 and is ON.

The output of the detecting switches 103 and 125 are then as shown in FIG. 12. When the edge from ON to OFF or the detecting switch 103 is detected, the loading motor 2 may be stopped to stop the turntable 98. Further, due to the swing of the drive lever 122, the detecting switch 125 changes from OFF to ON while the turntable 98 is still rotating, hence the ON state is maintained when the turntable 98 has stopped, and it can be determined that the supply reel stand 70 and the take-up reel stand 71 are at the second position for the small-sized cassette as shown in FIG. 6.

The timing when the lock arm 101 engages with the first concave part 98a is set to be a predetermined angle $\theta_1$ in front of the position of the turntable 98 where the rotation angle of the drive lever 122 is a maximum (i.e., an angle $\delta_1$ in front of the position where the rotation angle of the drive lever is a maximum), as shown in FIG. 13. It is then easy to arrange that the turntable 98 cannot easily rotate in a counterclockwise direction due to the load of the torsion coil springs 132 and 139. Further, even if overrun occurs when the loading motor 2 stops, the press-in force of the supply reel stand 110 and the take-up reel stand 116 is not relaxed within the rotation angle $\theta_1$ of the turntable 98.

Further, the shape of the first concave part 98a is such that the turntable 98 cannot rotate in a clockwise direction due to the engaging of the lock arm 101. Hence, after the supply reel stand 70 and the take-up reel stand 71 are pressed into the first position, the turntable 98 does not rotate, the press-in force is not relaxed and there is no positional shift due to external factors such as vibration, etc.

Next, after the supply reel stand 70 and the take-up reel stand 71 are fixed in the second position and the turntable 98 has stopped as described above, the loading motor 2 reverses. At this time, the cam gear 10 and the gear 86 reverse, and the gear 93 reverses so as to rotate in a clockwise direction. Since the claws 95a and 95b then moves along an outer surface of the small diameter part 97 of the turntable 98 without engaging with the small diameter part 97, the gear 93 does not drive the turntable 98 and the gear 93 continues rotating in a clockwise direction, while the supply reel stand 70 and the take-up reel stand 71 retains the second position.

After the cam gear 10 has rotated at a predetermined angle, transmission of rotation from the cam gear 10 to the gear 81 by the intermittent drive mechanism 82 (shown in FIG. 7B) is interrupted, the gears 81 and 93 stop, and displacement of the supply reel stand 70 and the take-up reel stand 71 from the first position to the second position is complete. It is then detected by an angular detector that the cam gear 10 has reached a predetermined rotation angle, and the loading motor 2 stops.

After the aforesaid action is complete, the small-sized cassette 64 is inserted in the apparatus so that the supply reel hub and the take-up reel hub of the small-sized cassette 64 can respectively engage with the supply reel stand 70 and the take-up reel stand which are respectively fixed in their second positions. Subsequently, the cam gear 10 rotates in a clockwise direction so as to drive the tape loading mechanism 1a, and the magnetic tape 63 can then be wound on the head drum 54.

Next, the similar action described hereinabove is performed when the supply reel stand 70 and the take-up reel stand 71 shift from the second position to the first position. At this time, the loading motor 2 starts so that the cam gear 10 rotates counterclockwise from the position of the cam gear 10 in the tape unloaded state. Even if the cam gear 10 rotates counterclockwise, the oscillating lever 12 that drives the slide cam 15 does not turn, and the motion is transmitted by the intermittent drive mechanism 82 including the gear 81 and cam gear 10 to the gear 93 so that the gear 93 rotates counterclockwise. When the gear 93 rotates counterclockwise, the claws 95a and 95b of the one-way transmission mechanism engage with the small diameter part 97, and the turntable 98 is driven in an counterclockwise direction by the gear 93.

The drive pin 99 implanted in the turntable 98 rotates counterclockwise together with the turntable 98, and the drive lever 122 is turned counterclockwise about the shaft 121 as center via the elongated hole 122a. The drive pin 126 provided on the drive lever 122 rotates the rotating arm 129 on the supply side counterclockwise via the long groove 130, and the drive pin 127 rotates the rotating arm 136 on the take-up side clockwise via the long groove 137.

The rotating arm 129 on the supply side rotates the arm 131a of the toggle link mechanism 131 on the supply side counterclockwise via the torsion coil spring 132 and the hooks 133 and 134, then the arm 131a slides the supply reel stand base 110 obliquely towards the lower left of the figure along the guide rails 107 and 108 on the supply side. Likewise, the rotating arm 136 on the take-up side rotates the arm 138a of the toggle link mechanism 138 on the take-up side clockwise via the torsion coil spring 139 and hooks 140 and 141, then the arm 138a slides the take-up reel stand base 116 obliquely towards the lower right of the figure along the guide rails 113 and 114 on the take-up side.

After the drive lever 122 has rotated a predetermined amount, the supply reel stand base 70 comes into contact with the projection 111 installed in the deck base 1 and stops. In the toggle link mechanism 131 on the supply side, when the supply reel stand base 70 stops, the rotation of the arm 131a stops, and the drive lever 122 rotates further so as to cause the rotating arm 129 on the supply side to perform an overstroke relative to the rotation angle of the arm 131a. The supply reel stand base 110 is pressed against the projection 111 by the torsion coil spring 132. Likewise, the rotating arm 136 on the take-up side performs an overstroke, and the take-up reel stand base 116 is pressed against the projection 118 in the deck base 1 by the torsion coil spring 139. As the turntable 98 rotates, the lock arm engages with the first concave part 98a of the turntable 98, and the detecting switch 103 switches from ON to OFF. When this edge from ON to OFF is detected, the loading motor 2 stops to stop the turntable 98. The detecting switch 125 also switches from ON to OFF while the turntable 98 is rotating due to the swing of the drive lever 122, the OFF state is retained after the turntable 98 has stopped, and it can then be seen that the supply reel stand 70 and the take-up reel stand 71 are at the second position.

The timing when the lock arm 101 engages with the second concave part 98b is set to be a predetermined angle $\theta_2$ in front of the position of the turntable 98 where the swing angle of the drive lever 122 is a maximum (i.e., an angle $\delta_1$ in front of the position where the rotation angle of the drive lever is a maximum), as described above. The shape of the second concave part 98b is such that the turntable 98 cannot rotate in a clockwise direction due to the lock arm 101. Hence, after the supply reel stand 70 and the take-up reel stand 71 are fixed into the second position, the turntable 98 does not rotate, the press-in force is not relaxed and there is no positional shift due to external factors such as vibration, etc.

Next, after the supply reel stand 70 and take-up reel 71 are fixed into the first position and the turntable 98 has stopped as described hereinabove, the loading motor 2 reverses. At this time, the cam gear 10 and third gear 86 reverse, and the gear 93 also reverses so as to rotate in the clockwise direction in the figure. However, as the turntable 98 is not driven by the one-way transmission mechanism 82, the gear 93 continues rotating clockwise while the supply reel stand 4 and the take-up reel stand 5 are held at the first position.

After the cam gear 10 has rotated at a predetermined angle, transmission of rotation from the cam gear 10 to the gear 86 by the intermittent drive mechanism is interrupted, the gear 86 and the gear 93 stop, and displacement of the supply reel stand 70 and the take-up reel stand 71 from the second to first position, is complete. It is then detected by an angular detector that the cam gear 10 has reached a predetermined rotation angle, and the loading motor 2 stops.

After the aforesaid action is complete, the normal-sized cassette is inserted in the apparatus so that the supply reel hub and take-up reel hub of the normal-sized cassette can respectively engage with the supply reel stand 70 and take-up reel stand 71 which are respectively fixed in the first position.

According to the above-described first embodiment, therefore, the supply reel stand 70 and the take-up reel stand 71 can be moved from the second position to first position by rotating the cam mechanism in the tape unloading direction, and then from the first position to second position, without providing a special groove cam to drive the reel stand displacing means on the cam mechanism. Moreover, when the positions of the cassette to be inserted and reel stands are the same, the cassette can be inserted and tape loading performed without making any further adjustments.

According to the first embodiment, the pushing member of the lock arm 101 was used, but the elastic force of the detecting contacts of the detecting switch 103 may also be used to apply a pushing force to the lock arm 101 in which case the pushing member 105 may be omitted.

According to the first embodiment, an ON-OFF switch of a detector was used as detecting means, however optical and magnetic means may also be used.

According to the above description, the cam mechanism rotates in an counterclockwise direction so as to drive the reel stand displacing mechanism, and subsequently reverses in the clockwise direction. However, this reversing action can be omitted. In this case, the cassette may be inserted after it is detected that displacement of the reel stands is complete.

According to the first embodiment, an economical apparatus can be obtained by using the drive for the reel stand displacing mechanism as the drive for the tape loading mechanism without providing a special groove cam in the cam mechanism. This is achieved by using an intermittent transmission mechanism that transmits drive force only within a predetermined section of a cam mechanism wherein the tape loading mechanism is non-active, and a one-way transmission mechanism that converts the two-way motion of the cam mechanism into a one-way rotation.

The reel stand position changes from first to second position and vice versa each time the cam mechanism executes a back-and-forth motion within a predetermined section of the mechanism, so a complex control device is not required, and the reel stands can also be fixed securely and accurately in their respective positions by the press-in mechanism.

As the concave part of the turntable 98 engages with the lock arm 101 at a point before a driven member executing a back-and-forth motion returns, the stroke of the driven member tends to increase even if overrun occurs due to the inertia of the loading motor 2, and the reel stands can be securely pressed in.

Further, it is constantly detected by the position detecting means of the driven member whether the reel stands are in the first or second position, hence there is no need to perform unnecessary actions in the event of a reset due to a power failure, etc., and the apparatus is consequently easier to operate.

SECOND EMBODIMENT

FIG. 14 is a plan view showing the construction of a reel stand brake mechanism 1c of the magnetic recording/reproducing apparatus according to the second embodiment of this invention when the normal-sized cassette 60 is inserted in the apparatus, FIG. 15 is a plan view showing the construction of the reel stand brake mechanism 1c when the small-sized cassette 64 is inserted in the apparatus, FIG. 16 is a side view of the essential features of the reel stand brake mechanism 1c, FIG. 17 is a diagram of the essential features of the reel stand brake mechanism 1c, FIG. 18 to FIG. 20 are diagrams showing the action of brake arms 208a and 208b when the supply reel stand 70 and the take-up reel stand 71 are at the first position for the normal-sized cassette 60, and FIG. 21 to FIG. 23 are diagrams showing the action of brake arms 208a and 208b when the supply reel stand 70 and the take-up reel stand 71 are at the second position for the small-sized cassette 64.

In FIG. 14 and FIG. 15, 107 and 108 are the guide rails fixed to the deck base 1 by the fixing members 109, 113 and 114 are the guide rails fixed to the deck base 1 by the fixing members 115, 110 is the supply reel stand base guided along the guide rails 107 and 108, and 116 is the take-up reel stand base guided along the guide rails 113 and 114. The supply reel stand base 110 can move in a direction $A_1$ or the reverse direction along the guide rails 107 and 108, as shown in FIG. 14 and FIG. 15. Likewise, the take-up reel stand base 116 can move in a direction $A_2$ or the reverse direction along the guide rails 113 and 114, as shown in FIG. 15 and FIG. 14.

In FIG. 14 to FIG. 16, 119 is the reel motor fixed to the supply reel stand base 110, and 70 is the supply reel stand attached to the rotation shaft of the reel motor 119. When the reel motor 119 is driven, the supply reel stand 70 rotates. 207a is a shaft implanted in the reel stand base 110, and 208a is a brake arm that functions as a link member supported free to turn on the shaft 207a. 210a is a brake pad stuck to one end of the brake arm 208a, the brake pad 210a functioning as a contact member that comes into contact with the supply reel stand 70 so as to generate a braking force. 209a is a tensile spring stretched between one end of the brake arm 208a and a spring attachment 211a provided on the supply reel stand base 110. 212a is a slide cam supported such that it can be made to slide effectively parallel to the displacement direction of the supply reel stand base 110 by elongated holes 204a provided on the slide cam 212a and guide pins 213a which is implanted in the deck base 1 and engages with the elongated holes 204a.

In FIG. 14 and FIG. 15, 120 is the reel motor fixed to the take-up reel stand base 116, and 71 is the take-up reel stand attached to the rotation shaft of the reel motor 120. When the reel motor 120 is driven, the take-up reel stand 71 rotates. 207b is a shaft implanted in the take-up reel stand base 116, and 208b is a brake arm that functions as a link member supported free to turn on the shaft 207b. 210b is a brake pad stuck to one end of the brake arm 208b, the brake pad 210b functioning as a contact member that comes into contact with the take-up reel stand 71 so as to generate a braking force. 209b is a tensile spring stretched between one end of the brake arm 208b and a spring attachment 211b provided on the take-up reel stand base 116. 212b is a slide cam supported such that it can be made to slide effectively parallel to the displacement direction of the take-up reel stand base 116 by elongated holes 204b and guide pins 213b which is implanted in the deck base 1 and engages with the elongated holes 204b.

In FIG. 14, the normal-sized cassette 60 is shown by the double dotted line. A pair of reel hubs (not shown) provided in the normal-sized cassette 60 engage with the reel stands 70 and 71. Also in FIG. 14, the magnetic tape 63 is wound on the supply reel hub in the normal-sized cassette 60 and is withdrawn from the normal-sized cassette 60.

In FIG. 17, 218 is a cam gear supported free to turn about a shaft 218a provided in the deck base 1. 220 is a cam groove provided on the cam gear 218. 223 is a shaft supported by the deck base 1, and 217 is a drive lever supported free to turn about the shaft 223. 225 is a guide pin fixed to the deck base 1. 216 is a lever, one end of which is supported on the drive lever 217 so as to free to turn about a shaft 216a. 216b is an elongated hole formed in the lever 216. The guide pin 225 engages with the elongated hole 216b in the lever 216. A follower pin 219 is fixed to one end of the drive lever 217, and engages with a cam groove 220 of the cam gear 218.

214a is a shaft fixed to the deck base 1, 214 is a lever supported free to turn on the shaft 214a, 214b is a first oblong hole formed in the lever 214, and 214c is a second oblong hole formed in the lever 214. 212c is a pin fixed to the slide cam 212a. The pin 212c engages with the second oblong hole 214c in the lever 214. Also, the pin 216c fixed to the lever 216 engages with the first oblong hole 214b in the lever 214.

215a is a shaft fixed to the deck base 1, 215 is a lever supported free to turn on the shaft 215a, 215b is a first oblong hole formed in the lever 215, and 215c is a second oblong hole formed in the lever 215. 212d is a pin fixed to the slide cam 212b. The pin 212d engages with the second oblong hole 215c in the lever 215. Also, the pin 216d of the lever 216 engages with the first oblong hole 215b in the lever 215. The levers 214 and 215 engage respectively with the slide cams 212a, 212b and the lever 216.

Next, the action of the brake arms 208a and 208b will be described. FIG. 18 to FIG. 20 describe the action of the brake arms 208a and 208b when the normal-sized cassette 60 is inserted in the apparatus. In the state shown in FIG. 18, a pin 251a fixed to the brake arm 208a comes into contact with a stationary area 262 on one side of the slide cam 212a. Due to the clockwise rotation of the brake arm 208a about the shaft 207a that supports the brake arm 208a on the supply reel stand base 110, the tension spring 209a is pulled out and the brake pad 210a separates from the reel stand 70, so no braking force acts on the supply reel stand 70. At this time, the pin 251b provided on the brake arm 208b separates from the slide cam 212b, the brake pad 210b is pushed against the reel stand 71 due to the tensile force of the tension spring 209b, and a braking force is therefore applied to the take-up reel stand 71. In the state of FIG. 18, the braking force acts on only one reel stand 71, and this state corresponds to the case when the magnetic tape 63 is pulled out from the normal-sized cassette 60.

As the cam gear 218 (shown in FIG. 17) rotates by a drive force transmitted from a loading motor (for example, loading motor 2 in FIG. 1) in the state shown in FIG. 18, the drive lever 217 rotates clockwise about the shaft 223 and the lever 216 is displaced in the direction B. When this occurs, the lever 214 rotates clockwise about the shaft 214a, and the lever 215 rotates counterclockwise about the shaft 215a. The slide cams 212a and 212b are caused to engage with the lever 216 respectively by the levers 214 and 215, so the state shown in FIG. 18 changes to the state shown in FIG. 19. In the state shown in FIG. 19, the pins 251a and 251b respectively come into contact with the stationary areas 262 and 263 of the slide cams 212a and 212b, so the tension springs 209a and 209b are pulled out. The brake pads 210a and 210b therefore separate from the reel stands 70 and 71, and no braking force is applied to the reel stands 70 and 71. In this state, a braking force does not act on either of the reel stands, which corresponds to the case when recording is performed on or playback is performed from the magnetic tape 63.

As the cam gear 218 shown in FIG. 17 rotates further, the drive lever 217 is rotated further, and the lever 216 is displaced in the direction B from the state of FIG. 19 to the state of FIG. 20. When this occurs, the slide cams 212a and 212b are displaced from the state shown in FIG. 19 to the state shown in FIG. 20. In the state shown in FIG. 20, the pins 251a and 251b are respectively separated from the slide cams 212a and 212b, so the brake pads 210a and 210b are pushed against the reel stands 70 and 71 by the tensile force of the tension springs 209a and 209b. A braking force therefore acts on both of the reel stands 70 and 71. This state corresponds to the state when the traveling of the magnetic tape 63 has stopped by the reel stand brake mechanism.

Hence, by moving the slide cams 212a and 212b in synchronism with the cam gear 218 (shown in FIG. 17), a change-over is effected between applying and not applying a braking force to the reel stands 70 and 71.

FIG. 21 to FIG. 23 show the case where the reel stand bases 110 and 116 are set in the second position suitable for the small-sized cassette 64. The mechanism for sliding the reel stand bases 110 and 116 along the guide rails 107 and 108 and the guide rails 113 and 114 is the same as that of the above-described first embodiment. When the reel stand bases 110 and 116 slide along the guide rails 107 and 108 and the guide rails 113 and 114, the brake arms 208a and 208b also move together with the reel stand bases 110 and 116, respectively. Stationary areas 264 and 265 are provided on the slide cams 212a and 212b in positions corresponding to the stationary areas 262 and 263. Even in this case where the reel stands 70 and 71 have been displaced to positions corresponding to the small-sized cassette, therefore, by moving the slide cams 212a and 212b in synchronism with the cam gear 218 as described hereinbefore, a change-over is effected between applying and not applying a braking force to the reel stands 70 and 71.

FIG. 21 to FIG. 23 describe the action of the brake arms 208a and 208b when the small-sized cassette 64 is inserted in the apparatus. In the state shown in FIG. 21, the pin 251a fixed to the brake arm 208a comes into contact with a stationary area 264 on one side of the slide cam 212a. Due to the rotation of the brake arm 208a about the shaft 207a, the tension spring 209a is pulled out and the brake pad 210a separates from the reel stand 70, so no braking force acts on the reel stand 70. At this time, the pin 251b provided on the brake arm 208b separates from the slide cam 212b, the brake pad 210b is pushed against the reel stand 71 due to the tensile force of the tension spring 209b, and a braking force is therefore applied to the reel stand 71. In this state, a braking force acts on only one reel stand 71, and this state corresponds to the case when the magnetic tape 63 is pulled out from the small-sized cassette 64.

As the cam gear 218 (shown in FIG. 17) rotates from the state shown in FIG. 21 due to the loading motor, the drive lever 217 is rotated about the shaft 223 and the lever 216 is displaced in the direction B. When this occurs, the slide cams 212a and 212b are caused to engage with the lever 216 (shown in FIG. 17) respectively by the levers 214 and 215, so the state shown in FIG. 21 changes to the state shown in FIG. 22. In the state shown in FIG. 22, the pins 251a and 251b respectively come into contact with the stationary areas 264 and 265 of the slide cams 212a and 212b, so the tension springs 209a and 209b are pulled out. The brake pads 210a and 210b therefore separate from the reel stands 70 and 71, and no braking force is applied to the reel stands 70 and 71. In this state, a braking force does not act on either of the reel stands, which corresponds to the case when recording is performed on or playback is performed from the magnetic tape 63.

As the cam gear 218 (shown in FIG. 17) rotates further, the drive lever 217 is rotated further, and the lever 216 is displaced in the direction B. When this occurs, the slide cams 212a and 212b are displaced from the state shown in FIG. 22 to the state shown in FIG. 23. In the state shown in FIG. 23, the pins 251a and 251b are respectively separated from the slide cams 212a and 212b, so the brake pads 210a and 210b are pushed against the reel stands 70 and 71 by the tensile force of the tension springs 209a and 209b. A braking force therefore acts on both of the reel stands 70 and 71. This state corresponds to the state when the traveling of the magnetic tape 63 has stopped by the brake mechanism.

As described hereinbefore, according to the second embodiment, there are provided a pair of reel stand bases 110 and 116 moving on the deck base 1 so as to move the reel stands 70 and 71 to positions corresponding to the reel interval for the normal-sized cassette and to the reel interval for the small-sized cassette. Also, even if the reel stands 70 and 71 are displaced according to cassettes with different reel intervals, a direct braking force can be applied to the reel stands 70 and 71, and the magnetic tape 63 can be definitively stopped.

Further, the second embodiment was described in the case of two cassette sizes, but if the number of stationary areas on the slide cams is increased, it is possible to accommodate three or more cassette sizes. This invention is therefore not necessarily limited to two cassette sizes, nor is the disposition of stationary areas on the slide cams limited to that of the aforesaid embodiment.

THIRD EMBODIMENT

FIG. 24 is a plane view of a reel stand brake mechanism 1d according to a third embodiment of this invention when the reel stands 70 and 71 are at the first position for the normal-sized cassette, FIG. 25 is a plane view of the reel stand brake mechanism 1d when the reel stands 70 and 71 are at the second position for the small-sized cassette, and FIG. 26 is a side view showing the essential parts of the reel stand brake mechanism 1d.

In FIG. 24, 272a and 272b are spring suspension members provided on the deck base 1, and 271a and 271b are respectively spring suspension members provided on the reel stand bases 110 and 116. As shown in FIG. 25, 272a is a torsion coil spring suspended between the brake arm 273a and spring suspension member 270a. A torsion coil spring 272b is suspended between the brake arm 208b and spring suspension member 270b in a similar construction to the torsion coil spring 272a. The remaining features of the construction of the reel stand brake mechanism 1d of the third embodiment are identical to those of the reel stand brake mechanism 1c of the aforesaid second embodiment.

Next, the action of the third embodiment will be described. FIG. 24 shows the case where the normal-sized cassette is inserted, and the reel stands 70 and 71 are set in the first position corresponding to the normal-sized cassette. One end of the torsion coil spring 272a is then attached to the spring suspension member 270a, and applies a pushing force to the brake arm 273a. The brake arm 273b also receives a predetermined pushing force from the torsion coil spring 272b in the same way. Hence, when the slide cams 212a and 212b are made to slide, the brake pads 210a and 210b are pushed against the reel stands 70 and 71 so as to apply a predetermined braking force to the reel stands as in the case of the second embodiment.

Next, when the small-sized cassette 64 is inserted in the apparatus, the reel stand bases 110 and 116 move along the guide rails 107 and 108 and the guide rails 113 and 114 so as to reach the state shown in FIG. 25. One end of the torsion coil spring 272a then separates from the spring suspension member 270a due to the motion of the reel stand base 110, and engages with the spring suspension member 271a provided on the reel stand base 110. In this state, the angle of the arms of the torsion coil spring 272a is larger and the pushing force applied to the brake arm 273a is less than in the case of FIG. 24. The braking force when the slide cam 212a is made to slide and the brake pad 210a is brought into contact with the reel stand 70, is also less than in the case of FIG. 24.

Further, as an appropriate braking torque can be selected for cassettes of different sizes, the magnetic tape 63 can be stopped by a suitable braking force.

FOURTH EMBODIMENT

FIG. 27 is a schematic plan view of a magnetic recording/reproducing apparatus with a normal-sized cassette 302 according to a fourth embodiment of this invention. In the figure, 302 is a normal-sized cassette inserted in the apparatus, 302a and 302b are respectively a supply reel and a take-up reel of the normal-sized cassette 302, and 303 is a switch block supported free to move on the deck base 1. The switch block 303 comprises a memory switch 304, an accidental erasure prevention switch 305 for preventing an accidental erasure of data recorded on the magnetic tape, and a cassette switch 306 for detecting the presence or absence of the cassette. The memory switch 304, the accidental erasure prevention switch 305 and the cassette switch 306 are formed in an one-piece construction.

In FIG. 27, 312 is a magnetic tape wound around the rotating head drum 54, 313–319 are tape guides supported such that they are provided on the deck base 1, 320 is a tension pin supported free to rotate on the deck base 1, 321 is a capstan provided on the deck base 1, and 322 is a pinch roller supported free to rotate on the deck base 1. The magnetic tape 312 pulled out from the supply reel 302a by the tape guides 313, 314 and 318, follows a tape path formed by the tape guides 313–319, the rotating head drum 54 and the tension pin 320. The magnetic tape 312 is gripped between the capstan 321 and the pinch roller 322, and the magnetic tape 321 advances as the capstan 321 rotates.

FIG. 28 is a schematic plan view of the magnetic recording/reproducing apparatus with a small-sized cassette 323 according to the fourth embodiment. In FIG. 28, 323 is a small-sized cassette inserted in the apparatus, and 323a and 323b are respectively a supply reel and a take-up reel housed in the small-sized cassette 323.

FIG. 29A is a perspective view of the normal-sized cassette 302, and FIG. 29B is a plan view of the essential features of FIG. 29A. In FIGS. 29A and 29B, 307 is a built-in memory terminal provided on one side (rear surface) 331 of the normal-sized cassette 302, 308 are concave changer grips formed on both lateral surfaces of the normal-sized cassette 302, 309 is an accidental erasure prevention indicator provided on the rear surface 331 of the normal-sized cassette 302, and 310 is an accidental erasure prevention hole formed on the lower surface of the normal-sized cassette 302 such that it may be opened or closed by moving the accidental erasure prevention indicator 309.

FIG. 30A is a perspective view of the small-sized cassette 323, and FIG. 30B is a plan view of the essential features of FIG. 30A. In the figures, 324 is a built-in memory terminal provided on a rear surface 329 of the small-sized cassette 323, 325 are concave changer grips formed on both lateral surfaces of the small-sized cassette 323, 326 is an accidental erasure prevention indicator provided on the rear surface 329 of the small-sized cassette 323, and 327 is an accidental erasure prevention hole formed on the lower surface 323a of the small-sized cassette 323 such that it may be opened or closed by moving the accidental erasure prevention indicator 326.

A distance F of the built-in memory terminal 324 from a lateral surface 328 of the small-sized cassette 323 is equal to a distance B of the built-in memory terminal 307 from a lateral surface 330 of the normal-sized cassette 302. Further, a distance Y between the terminals of the small-sized cassette 323 is arranged to be equal to a distance X between the terminals of the normal-sized cassette 302. Still further, distances G and H of the accidental erasure prevention hole 327 of the small-sized cassette 323 from the lateral surface 328 and the rear surface 329 of the small-sized cassette 323 are arranged to be respectively equal to the distances C and D of the accidental erasure prevention hole 310 of the normal-sized cassette 302 from the lateral surface 330 and the rear surface 331 of the normal-sized cassette 302. In contrast, a distance L of the changer grip 325 from the rear surface 329 of the small-sized cassette 323 is arranged to be different from a distance K of the changer grip 308 from a rear surface 331 of the normal-sized cassette 302.

FIG. 31 is a plan view showing the switch block displacing mechanism 1e when the normal-sized cassette 302 is inserted, and FIG. 32 is a plan view showing the switch block displacing mechanism 1e when the small-sized cassette 323 is inserted. 333 is a shaft fixed on the deck base 1, and 332 is a rotating lever supported free to rotate about the shaft 333. FIG. 42 is an enlarged plan view of the rotating lever 332. In FIG. 31 and FIG. 32, 334 is a shaft provided at one end of the rotating lever 332 and supporting the switch block 303 so as to permit the rotation, 335 is a guide pin provided at one end of the switch block 303, 336 is a guide groove which is provided in the plate member 336a fixed to the deck base 1 and engages with the guide pin 335, and 337 is a rotating plate supported on the shaft 333 in the same way as the rotating lever 332. FIG. 43 is an enlarged plan view of the rotating plate 337. 338 is a torsion coil spring suspended between the rotating lever 332 and the rotating plate 337.

In FIG. 31 and FIG. 32, 122 is a drive lever supported free to rotate on the shaft 121, and 345 is a pin implanted at one end of the drive lever 122. The pin 345 engages with the rotating plate 337 by being inserted in a cam groove 346 provided in the rotating plate 337. 122a is an elongated hole provided at one end of the drive lever 122. 342–344 and 348 are gears supported free to rotate on the deck base 1, and 349 is a drive motor, shaft gear (not shown in FIG. 31 and FIG. 32) of which engages with the gear 348. Further, 99 is a drive pin provided on the gear 342. The drive pin 99 engages with the elongated hole 47 of the drive lever 122.

FIG. 33 is a perspective view of the switch block 303. In FIG. 33, 401 are memory terminals having flexibility which are fixed to the memory switch 304. 350 is an identifying terminal held free to slide into the accidental erasure prevention switch 305. 351 is a contact terminal of the cassette switch 306 supported free to rotate in the direction G.

Next, the operation of the switch block 303 will be described. When the normal-sized cassette 302 is inserted, the drive lever 122 is held in the state shown in FIG. 31, and the reel stand bases 110 and 116 are held in the first position shown in FIG. 45. At this time, the pin 345 implanted in the drive lever 122 engages with the groove 346 provided in the rotating plate 337, so the rotating plate 337 is held as shown in FIG. 31. A torsion coil spring 338 is suspended between the rotating plate 337 and the rotating lever 332, so the rotating lever 332 is also held as shown in FIG. 31 due to the pushing force of the torsion coil spring 338. A projection 390 provided on the rotating lever 332 comes into contact with a stopper 391 provided on the deck base 1 so as to limit the position of the rotating lever 332. When the rotating plate 337 is positioned as shown in FIG. 31 and FIG. 39, the torsion coil spring 338 twists and the rotating lever 332 is pushed in a clockwise direction.

As one end of the switch block 303 is engaged with the rotating lever 332 by the pin 334, and the position of the guide shaft 335 provided at the other end of the switch block 303 engages with the guide groove 336, the switch block 303 is held in the position shown in FIG. 31.

When the normal-sized cassette 302 is inserted in this state, the normal-sized cassette 302 moves down in the direction of the arrow from the state of FIG. 34A to the state of FIG. 34B. The memory terminal 401 of the memory switch 304 is then pressed in contact with the built-in memory terminal 307 so that information stored in the built-in memory 392 provided in the normal-sized cassette 302 can be transmitted.

When the accidental erasure prevention hole 310 is open, the identifying terminal 350 is not pressed in as shown by the broken line of FIG. 34B, the accidental erasure prevention switch 305 is ON and recording cannot be performed. When the accidental erasure prevention hole 310 is closed, the identifying terminal 350 is pressed in as shown by the solid line of FIG. 34B, the accidental erasure prevention switch 305 is OFF and recording can be performed.

When the normal-sized cassette 302 is inserted, the state is as shown in FIG. 35. An upper step 351a of a stepped contact terminal 351 of the cassette switch 306 is then situated inside the cassette grip 308 of the normal-sized cassette 302, and a lower step 351b is pushed on, as shown in FIGS. 37A–37C, by the under surface 302a of the normal-sized cassette 302. The insertion of the normal-sized cassette 302 is thereby detected.

Next, when the small-sized cassette 323 is inserted as shown in FIG. 32, the gear 344 is rotated from the state shown in FIG. 31 in the direction M by the loading motor 349, the drive lever 122 is rotated in the direction S due to the displacement of the drive pin 99 via the gears 343 and 342, and the apparatus reaches the state shown in FIG. 32 and FIG. 41. As the pin 345 is then engaged with the groove 346 of the rotating plate 337, the rotating lever 332 is pushed in a counterclockwise direction, and the rotating lever 332 is also pushed in a counterclockwise direction by the pushing force of the torsion coil spring 338.

The switch block 303 engages with the rotating lever 332 due to the pin 334, and due to the displacement of the guide shaft 335 installed at one end guided by the guide groove 336, the built-in memory contact 401 is displaced effectively along the guide groove 336 as shown in FIG. 39 to FIG. 41 so as to reach the state shown in FIG. 32.

When the small-sized cassette 323 is inserted in this state, the memory contact 401 of the memory switch 304 is pressed in contact with the built-in memory contact 324, and the information stored in the built-in memory provided in the small-sized cassette 323 can be transmitted. Further, as described in the case of the normal-sized cassette 302 shown in FIG. 34A and FIG. 34B, when the accidental erasure prevention hole 327 is open, the identifying terminal 350 is not pushed in, the accidental erasure prevention switch 305 is ON, and recording cannot be performed. Conversely, when the accidental erasure prevention hole 310 is closed, the identifying terminal 350 is pushed and made to slide, the accidental erasure prevention switch 305 is OFF, and recording can be performed.

When the small-sized cassette 323 is inserted, the state is as shown in FIG. 36. The upper step 351a of the stepped contact terminal 351 of the cassette switch 306 is then pushed on by the under surface 323a of the small-sized cassette 323 as shown in FIG. 38A to FIG. 38C, and the insertion of the small-sized cassette 323 is thereby detected.

By the same mechanism as that of the first embodiment, a pair of reel stand bases 110 and 116 moves on the deck base 1 that displace reel stands 70 and 71 between a normal-sized cassette reel interval when the normal-sized cassette 302 is used and a small-sized cassette reel interval when the small-sized cassette 323 is used. The switch block 303 including the memory switch 304, the accidental erasure prevention switch 305 and the cassette switch 306 also moves in synchronism with the operation of the pair of reel stand bases 110 and 116. The switch block 303 moves according to the positions of a normal-sized cassette 302 and a small-sized cassette 323 so that all switches 401, 305 and 306 can function properly.

It is however not essential for the memory switch 304, accidental erasure prevention switch 305 and cassette switch 306 to be formed in a one-piece construction.

Further, even when the reel stands 70 and 71 move corresponding to cassettes of different sizes, the memory switch 304 also moves according to the cassette size, information in memories built into the cassettes of different sizes can be transmitted by one memory switch, and the apparatus can therefore be manufactured cheaply.

Even when the reel stands 70 and 71 move corresponding to cassettes of different sizes, either the accidental erasure prevention switch 305 or the cassette switch 306 move together with the memory switch 304 corresponding to the cassette, hence information can be detected while easily maintaining the relative positions of the switches. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording/reproducing apparatus wherein a first tape cassette and a second tape cassette smaller in size than said first tape cassette can be inserted selectively according to a user's selection, said magnetic recording/reproducing apparatus comprising:

a deck base;

a head drum provided on said deck base;

a supply reel stand for engaging with a supply reel of said first tape cassette or said second tape cassette;

a supply reel stand base for supporting said supply reel stand, said supply reel stand base being provided on said deck base such that said supply reel stand base is free to move on said deck base;

a take-up reel stand for engaging with a take-up reel of said first tape cassette or said second tape cassette;

a take-up reel stand base for supporting said take-up reel stand, said take-up reel stand base being provided on said deck base such that said take-up reel stand base is free to move on said deck base;

a reel stand displacing mechanism for displacing said supply reel stand base and said take-up reel stand base according to a size of said first tape cassette and a size of said second tape cassette; and a tape loading mechanism for withdrawing a magnetic tape from said first tape cassette or said second tape cassette placed on said deck base and winding said magnetic tape around said head drum, said tape loading mechanism including;

a loading motor for providing a drive force, tape loading members, and a cam gear having a single cam groove which enables said cam gear to operate in two modes, said cam gear transmitting the drive force from said loading motor to said tape loading members in a first operating mode and not transmitting the drive force from said loading motor to said tape loading members in a second operating mode, wherein, said reel stand displacing mechanism includes;

an intermittent transmission mechanism for transmitting the drive force from said loading motor of said tape loading mechanism when said cam gear is in the second operating mode, and a one way transmission mechanism for receiving the drive force from said intermittent transmission mechanism, said one way transmission mechanism including a turntable and a member for causing said turntable to rotate only in a predetermined one-way direction by said drive force.

2. A magnetic recording/reproducing apparatus of claim 1, wherein the single cam groove of said cam gear guides an engaging pin which, in the first operating mode, transmits the drive force from said loading motor to said tape loading members for withdrawing the magnetic tape from said first tape cassette or said second tape cassette;

said single cam groove including a first groove part and a second groove part, said cam gear transmitting the drive force from said loading motor to said tape loading members when said engaging pin engages with said first groove part, and not transmitting the drive force from said loading motor to said tape loading members when said engaging pin engages with said second groove part.

3. A magnetic recording/reproducing apparatus of claim 2, wherein said reel stand displacing mechanism includes:

an intermittent transmission mechanism for transmitting the drive force from said loading motor only when said engaging pin engages with said second groove part; and a one-way transmission mechanism including a second gear being able to rotate in both directions by receiving the drive force from said loading motor via said intermittent transmission mechanism, a turntable, a member for causing said turntable to rotate only in a predetermined one-way direction by the drive force from said loading motor via said second gear.

4. A magnetic recording/reproducing apparatus of claim 3, further comprising a first detecting switch for detecting a rotation angle of said turntable.

5. A magnetic recording/reproducing apparatus of claim 3, wherein said reel stand displacing mechanism further includes:

a drive pin implanted in said turntable;

a drive lever provided on said deck base so as to be free to rotate about a shaft, said drive lever including an elongated hole engaging with said drive pin and rotating when said turntable rotates;

a supply side toggle link means for transmitting the drive force from said loading motor via said drive lever to said supply reel stand base and causing said supply reel stand base to move on said deck base; and a take-up side toggle link means for transmitting the drive force from said loading motor via said drive lever to said take-up reel stand base and causing said take-up reel stand base to move on said deck base.

6. A magnetic recording/reproducing apparatus of claim 5, further comprising a detecting switch for detecting a position of said drive lever.

7. A magnetic recording/reproducing apparatus of claim 1, further comprising a reel stand brake mechanism, wherein said reel stand brake mechanism includes:

a supply side brake mechanism for coming into contact with said supply reel stand so as to stop rotation of said supply reel stand, said supply side brake mechanism displacing together with said supply reel stand base;

a take-up side brake mechanism for coming into contact with said take-up reel stand so as to stop rotation of said take-up reel stand, said take-up side brake mechanism displacing together with said take-up reel stand base;

a supply side slide cam for sliding in a predetermined direction on said deck base, said supply side slide cam including a first contact area for operating said supply side brake mechanism when said supply reel stand base is at a position for said first tape cassette and a second contact area for operating said supply side brake mechanism when said supply reel stand base is at a position for said second tape cassette;

a take-up side slide cam for sliding in a predetermined direction on said deck base, said take-up side slide cam including a third contact area for operating said take-up side brake mechanism when said take-up reel stand base is at a position for said first tape cassette and a fourth contact area for operating said take-up side brake mechanism when said take-up reel stand base is at a position for said second tape cassette; and a slide cam displacing mechanism for displacing said supply side slide cam and said take-up side slide cam in said predetermined directions.

8. A magnetic recording/reproducing apparatus of claim 7, wherein said supply side brake mechanism comes into contact with said supply reel stand when said first contact area and said second contact area do not come into contact with said supply side brake mechanism, and said supply side brake mechanism separates from said supply reel stand when said first contact area or said second contact area comes into contact with said supply side brake mechanism; and wherein said take-up side brake mechanism comes into contact with said take-up reel stand when said third contact area and said fourth contact area do not come into contact with said take-up side brake mechanism, and said take-up side brake mechanism separates from said take-up reel stand when said third contact area or said fourth contact area comes into contact with said take-up side brake mechanism.

9. A magnetic recording/reproducing apparatus of claim 8, wherein said supply side brake mechanism includes:
a supply side shaft provided on said supply reel stand base;
a supply side arm provided on said supply side shaft so as to be free to rotate about said supply side shaft:
a supply side brake pad provided on one end of said supply side arm;
a supply side pin for coming into contact with said first contact area and said second contact area; and
a supply side spring for applying a force to said supply side arm such that said supply side brake pad pushes said supply reel stand;
said supply side brake pad coming into contact with said supply reel stand when said first contact area and said second contact area do not come into contact with said supply side pin, and said supply side brake pad separating from said supply reel stand when said first contact area or said second contact area comes into contact with said supply side pin; and wherein said take-up side brake mechanism includes:
a take-up side shaft provided on said take-up reel stand base;
a take-up side arm provided on said take-up side shaft so as to be free to rotate about said take-up side shaft;
a take-up side brake pad provided on one end of said take-up side arm;
a take-up side pin for coming into contact with said third contact area and said fourth contact area; and
a take-up side spring for applying a force to said take-up side arm such that said take-up side brake pad pushes said take-up reel stand;
said take-up side brake pad coming into contact with said take-up reel stand when said third contact area and said fourth contact area do not come into contact with said take-up side pin, and said take-up side brake pad separating from said take-up reel stand when said third contact area or said fourth contact area comes into contact with said take-up side pin.

10. A magnetic recording/reproducing apparatus of claim 9,
wherein said supply side spring is a torsion coil spring, one arm end of which engages with said supply side arm, and said take-up side spring is a torsion coil spring, one arm end of which engages with said take-up side arm;
said magnetic recording/reproducing apparatus further comprising:
a first spring suspension member provided on said deck base and engaging with the other arm end of said supply side spring when said supply reel stand base is at the position for said first tape cassette;
a second spring suspension member provided on said supply reel stand base and engaging with the other arm end of said supply side spring when said supply reel stand base is at the position for said second tape cassette;
a third spring suspension member provided on said deck base and engaging with the other arm end of said take-up side spring when said take-up reel stand base is at the first position; and
a fourth spring suspension member provided on said take-up reel stand base and engaging with the other arm end of said take-up side spring when said take-up reel stand base is at the position for said second tape cassette.

11. A magnetic recording/reproducing apparatus of claim 7,
wherein said reel stand brake mechanism has at least first, second and third states for each of said first tape cassette and said second tape cassette;
said first state appearing when said supply side brake mechanism separates from said supply reel stand and said take-up side brake mechanism comes into contact with said take-up reel stand;
said second state appearing when said supply side brake mechanism separates from said supply reel stand and said take-up side brake mechanism separates from said take-up reel stand; and
said third state appearing when said supply side brake mechanism comes into contact with said supply reel stand and said take-up side brake mechanism comes into contact with said take-up reel stand.

12. A magnetic recording/reproducing apparatus wherein a first tape cassette and a second tape cassette smaller in size than said first tape cassette can be inserted selectively according to a user's selection, said magnetic recording/reproducing apparatus comprising:
a deck base;
a head drum provided on said deck base;
a supply reel stand for engaging with a supply reel of said first tape cassette or said second tape cassette;
a supply reel stand base for supporting said supply reel stand, said supply reel stand base being provided on said deck base such that said supply reel stand base is free to move on said deck base;
a take-up reel stand for engaging with a take-up reel of said first tape cassette or said second tape cassette;
a take-up reel stand base for supporting said take-up reel stand, said take-up reel stand base being provided on said deck base such that said take-up reel stand base is free to move on said deck base;
a reel stand displacing mechanism including members for displacing said supply reel stand base and said take-up reel stand base according to a size of said first tape cassette and a size of said second tape cassette; and
a tape loading mechanism for withdrawing a magnetic tape from said first tape cassette or said second tape cassette placed on said deck base and winding said magnetic tape around said head drum, wherein a drive force used by said tape loading mechanism is transmitted to the members of said reel stand displacing mechanism;
a moveable switch block provided on said deck base, said switch block including a contact terminal that comes into contact with a detected point of said first tape cassette or with a detected point of said second tape cassette; and
a switch block displacing mechanism for displacing said switch block according to said detected point of said first tape cassette or said detected point of said second tape cassette, said switch block displacing mechanism including a support member, rotatable between a first tape cassette position and a second tape cassette position, contacting said switch block;

wherein said support member of said switch block displacing mechanism is coupled with a driven member of said reel stand displacing mechanism, and is rotated to either the first tape cassette position or the second tape cassette position by said driven member of said reel stand displacing mechanism to displace said switch block to the detected point of the first cassette or the detected point of the second tape cassette.

13. A magnetic recording/reproducing apparatus of claim 12, wherein said switch block includes at least one of:
- a memory switch having a contact terminal that comes into contact with a memory terminal for a built-in memory provided in said first tape cassette or said second tape cassette;
- an accidental erasure prevention switch for preventing an accidental erasure of data recorded on the magnetic tape by detecting the presence or absence of a hole provided in said first tape cassette or said second tape cassette; and
- a cassette switch for detecting whether said first tape cassette or said second tape cassette is inserted in the apparatus.

14. A magnetic recording/reproducing apparatus wherein a first tape cassette and a second tape cassette smaller in size than said first tape cassette can be inserted selectively according to a user's selection, said magnetic recording/reproducing apparatus comprising:

a deck base;

a head drum provided on said deck base;

a supply reel stand for engaging with a supply reel of said first tape cassette or said second tape cassette;

a supply reel stand base for supporting said supply reel stand, said supply reel stand base being provided on said deck base such that said supply reel stand base is free to move on said deck base;

a take-up reel stand for engaging with a take-up reel of said first tape cassette or said second tape cassette;

a take-up reel stand base for supporting said take-up reel stand, said take-up reel stand base being provided on said deck base such that said take-up reel stand base is free to move on said deck base;

a reel stand displacing mechanism for displacing said supply reel stand base and said take-up reel stand base according to a size of said first tape cassette and a size of said second tape cassette;

a tape loading mechanism for withdrawing a magnetic tape from said first tape cassette or said second tape cassette placed on said deck base and winding said magnetic tape around said head drum; and a reel stand brake mechanism;

wherein said reel stand brake mechanism includes:
- a supply side brake mechanism for coming into contact with said supply reel stand so as to stop rotation of said supply reel stand, said supply side brake mechanism displacing together with said supply reel stand base;
- a take-up side brake mechanism for coming into contact with said take-up reel stand so as to stop rotation of said take-up reel stand, said take-up side brake mechanism displacing together with said take-up reel stand base;
- a supply side slide cam for sliding in a predetermined direction on said deck base, said supply side slide cam including a first contact area for operating said supply side brake mechanism when said supply reel stand base is at a position for said first tape cassette and a second contact area for operating said supply side brake mechanism when said supply reel stand base is at a position for said second tape cassette;
- a take-up side slide cam for sliding in a predetermined direction on said deck base, said take-up side slide cam including a third contact area for operating said take-up side brake mechanism when said take-up reel stand base is at a position for said first tape cassette and a fourth contact area for operating said take-up side brake mechanism when said take-up reel stand base is at a position for said second tape cassette; and
- a slide cam displacing mechanism for displacing said supply side slide cam and said take-up side slide cam in said predetermined directions.

15. A magnetic recording/reproducing apparatus of claim 14, wherein said supply side brake mechanism comes into contact with said supply reel stand when said first contact area and said second contact area do not come into contact with said supply side brake mechanism, and said supply side brake mechanism separates from said supply reel stand when said first contact area or said second contact area comes into contact with said supply side brake mechanism; and wherein said take-up side brake mechanism comes into contact with said take-up reel stand when said third contact area and said fourth contact area do not come into contact with said take-up side brake mechanism, and said take-up side brake mechanism separates from said take-up reel stand when said third contact area or said fourth contact area comes into contact with said take-up side brake mechanism.

16. A magnetic recording/reproducing apparatus of claim 15, wherein said supply side brake mechanism includes:
- a supply side shaft provided on said supply reel stand base;
- a supply side arm provided on said supply side shaft so as to be free to rotate about said supply side shaft;
- a supply side brake pad provided on one end of said supply side arm;
- a supply side pin for coming into contact with said first contact area and said second contact area; and
- a supply side spring for applying a force to said supply side arm such that said supply side brake pad pushes said supply reel stand;

said supply side brake pad coming into contact with said supply reel stand when said first contact area and said second contact area do not come into contact with said supply side pin, and said supply side brake pad separating from said supply reel stand when said first contact area or said second contact area comes into contact with said supply side pin; and wherein said take-up side brake mechanism includes:
- a take-up side shaft provided on said take-up reel stand base;
- a take-up side arm provided on said take-up side shaft so as to be free to rotate about said take-up side shaft;
- a take-up side brake pad provided on one end of said take-up side arm;

a take-up side pin for coming into contact with said third contact area and said fourth contact area; and a take-up side spring for applying a force to said take-up side arm such that said take-up side brake pad pushes said take-up reel stand;

said take-up side brake pad coming into contact with said take-up reel stand when said third contact area and said fourth contact area do not come into contact with said take-up side pin, and said take-up side brake pad separating from said take-up reel stand when said third contact area or said fourth contact area comes into contact with said take-up side pin.

17. A magnetic recording/reproducing apparatus of claim 16, wherein said supply side spring is a torsion coil spring, one arm end of which engages with said supply side arm, and said take-up side spring is a torsion coil spring, one arm end of which engages with said take-up side arm;

said magnetic recording/reproducing apparatus further comprising:

a first spring suspension member provided on said deck base and engaging with the other arm end of said supply side spring when said supply reel stand base is at the position for said first tape cassette;

a second spring suspension member provided on said supply reel stand base and engaging with the other arm end of said supply side spring when said supply reel stand base is at the position for said second tape cassette;

a third spring suspension member provided on said deck base and engaging with the other arm end of said take-up side spring when said take-up reel stand base is at the first position; and a fourth spring suspension member provided on said take-up reel stand base and engaging with the other arm end of said take-up side spring when said take-up reel stand base is at the position for said second tape cassette.

18. A magnetic recording/reproducing apparatus of claim 15, wherein said reel stand brake mechanism has at least first, second and third states for each of said first tape cassette and said second tape cassette;

said first state appearing when said supply side brake mechanism separates from said supply reel stand and said take-up side brake mechanism comes into contact with said take-up reel stand;

said second state appearing when said supply side brake mechanism separates from said supply reel stand and said take-up side brake mechanism separates from said take-up reel stand; and said third state appearing when said supply side brake mechanism comes into contact with said supply reel stand and said take-up side brake mechanism comes into contact with said take-up reel stand.

* * * * *